(12) United States Patent
Boothby et al.

(10) Patent No.: US 11,507,871 B2
(45) Date of Patent: Nov. 22, 2022

(54) SYSTEMS AND METHODS FOR QUANTUM PROCESSOR TOPOLOGY

(71) Applicant: D-WAVE SYSTEMS INC., Burnaby (CA)

(72) Inventors: Kelly T. R. Boothby, Coquitlam (CA); Paul I. Bunyk, New Westminster (CA)

(73) Assignee: D-WAVE SYSTEMS INC., Burnaby (CA)

(*) Notice: Subject to any disclaimer, the term of this patent is extended or adjusted under 35 U.S.C. 154(b) by 933 days.

(21) Appl. No.: 16/307,382

(22) PCT Filed: Jun. 7, 2017

(86) PCT No.: PCT/US2017/036437
§ 371 (c)(1),
(2) Date: Dec. 5, 2018

(87) PCT Pub. No.: WO2017/214331
PCT Pub. Date: Dec. 14, 2017

(65) Prior Publication Data
US 2019/0220771 A1    Jul. 18, 2019

Related U.S. Application Data

(60) Provisional application No. 62/346,917, filed on Jun. 7, 2016, provisional application No. 62/400,990, filed on Sep. 28, 2016.

(51) Int. Cl.
*G06N 10/00* (2022.01)
*G06F 15/80* (2006.01)
(Continued)

(52) U.S. Cl.
CPC ............. *G06N 10/00* (2019.01); *G06F 15/80* (2013.01); *B82Y 10/00* (2013.01); *G06F 9/3885* (2013.01); *G06F 15/82* (2013.01)

(58) Field of Classification Search
CPC ....... G06N 10/00; G06F 15/80; G06F 9/3885; G06F 15/82; B82Y 10/00
See application file for complete search history.

(56) References Cited

U.S. PATENT DOCUMENTS 3,343,979 A   9/1967   Hamrin
4,280,095 A   7/1981   Hinton
(Continued)

FOREIGN PATENT DOCUMENTS

CA   2386426 A1   5/2001
WO   0227653 A2   4/2002
(Continued)

OTHER PUBLICATIONS

"A High-Level Look at Optimization: Past, Present and Future," e-Optimization.Community, May 2000, pp. 1-5.
(Continued)

*Primary Examiner* — Brian T O Connor
(74) *Attorney, Agent, or Firm* — Cozen O'Connor

(57) ABSTRACT

Topologies for analog computing systems may include cells of qubits which may implement a tripartite graph and cross substantially orthogonally. Qubits may have an H-shape or an 1-shape, qubits may change direction within a cell. Topologies may be comprised of two or more different sub-topologies. Qubits may be communicatively coupled to non-adjacent cells by long-range couplers. Long-range couplers may change direction within a cell. A cell may have two or more different type of long-range couplers. A cell may have shifted qubits, more than one type of inter-cell couplers, more than one type of intra-cell couplers and long-range couplers.

6 Claims, 28 Drawing Sheets

(51) Int. Cl.
    *B82Y 10/00*        (2011.01)
    *G06F 9/38*         (2018.01)
    *G06F 15/82*        (2006.01)

(56)         References Cited

U.S. PATENT DOCUMENTS

| | | | |
|---|---|---|---|
| 4,496,854 | A | 1/1985 | Chi et al. |
| 4,660,061 | A | 4/1987 | Sweeny et al. |
| 4,937,525 | A | 6/1990 | Daalmans |
| 5,128,675 | A | 7/1992 | Harada |
| 5,430,012 | A | 7/1995 | Nakamura et al. |
| 6,437,413 | B1 | 8/2002 | Yamaguchi et al. |
| 6,627,915 | B1 | 9/2003 | Ustinov et al. |
| 6,627,916 | B2 | 9/2003 | Amin et al. |
| 6,670,630 | B2 | 12/2003 | Blais et al. |
| 6,784,451 | B2 | 8/2004 | Amin et al. |
| 6,822,255 | B2 | 11/2004 | Tzalenchuk et al. |
| 6,838,694 | B2 | 1/2005 | Esteve et al. |
| 6,885,325 | B2 | 4/2005 | Omelyanchouk et al. |
| 6,897,468 | B2 | 5/2005 | Blais et al. |
| 6,960,780 | B2 | 11/2005 | Blais et al. |
| 6,984,846 | B2 | 1/2006 | Newns et al. |
| 7,018,852 | B2 * | 3/2006 | Wu ................. G06N 10/00 |
| | | | 977/933 |
| 7,133,888 | B2 | 11/2006 | Kohn et al. |
| 7,135,701 | B2 | 11/2006 | Amin et al. |
| 7,335,909 | B2 | 2/2008 | Amin et al. |
| 7,418,283 | B2 | 8/2008 | Amin |
| 7,453,162 | B2 | 11/2008 | Freedman et al. |
| 7,533,068 | B2 | 5/2009 | Maassen et al. |
| 7,566,896 | B2 | 7/2009 | Freedman et al. |
| 7,605,600 | B2 | 10/2009 | Harris |
| 7,619,437 | B2 | 11/2009 | Thom et al. |
| 7,639,035 | B2 | 12/2009 | Berkley |
| 7,687,938 | B2 | 3/2010 | Bunyk et al. |
| 7,756,485 | B2 | 7/2010 | Paas et al. |
| 7,800,395 | B2 | 9/2010 | Johnson et al. |
| 7,843,209 | B2 | 11/2010 | Berkley |
| 7,876,248 | B2 | 1/2011 | Berkley et al. |
| 7,880,529 | B2 | 2/2011 | Amin |
| 7,898,282 | B2 | 3/2011 | Harris et al. |
| 7,930,152 | B2 | 4/2011 | Coffey et al. |
| 7,969,805 | B2 | 6/2011 | Thom et al. |
| 7,984,012 | B2 | 7/2011 | Coury et al. |
| 8,008,942 | B2 | 8/2011 | Van et al. |
| 8,018,244 | B2 | 9/2011 | Berkley |
| 8,035,540 | B2 | 10/2011 | Berkley et al. |
| 8,063,657 | B2 | 11/2011 | Rose |
| 8,098,179 | B2 | 1/2012 | Bunyk et al. |
| 8,102,185 | B2 | 1/2012 | Johansson et al. |
| 8,159,313 | B2 | 4/2012 | Uchaykin |
| 8,169,231 | B2 | 5/2012 | Berkley |
| 8,174,305 | B2 | 5/2012 | Harris |
| 8,190,548 | B2 | 5/2012 | Choi |
| 8,195,596 | B2 | 6/2012 | Rose et al. |
| 8,421,053 | B2 | 4/2013 | Bunyk et al. |
| 8,441,329 | B2 | 5/2013 | Thom et al. |
| 8,536,566 | B2 | 9/2013 | Johansson et al. |
| 8,772,759 | B2 * | 7/2014 | Bunyk ............... G06F 30/20 |
| | | | 257/E29.071 |
| 8,786,476 | B2 | 7/2014 | Bunyk et al. |
| 8,854,074 | B2 | 10/2014 | Berkley |
| 9,015,215 | B2 | 4/2015 | Berkley et al. |
| 9,170,278 | B2 | 10/2015 | Neufeld |
| 9,178,154 | B2 | 11/2015 | Bunyk |
| 9,524,470 | B1 * | 12/2016 | Chow ................. H01L 25/04 |
| 9,710,758 | B2 | 7/2017 | Bunyk et al. |
| 10,013,657 | B2 * | 7/2018 | Bourassa ............. G06N 10/00 |
| 10,262,276 | B2 * | 4/2019 | Puri ................... G06N 5/003 |
| 10,832,155 | B2 * | 11/2020 | Lechner .............. G06N 10/00 |
| 2014/0097405 | A1 | 4/2014 | Bunyk |
| 2015/0046681 | A1 | 2/2015 | King |
| 2016/0148112 | A1 | 5/2016 | Kwon |
| 2017/0206461 | A1 * | 7/2017 | Friesen ............... G06F 15/82 |
| 2018/0341874 | A1 * | 11/2018 | Puri ................... H03B 17/00 |
| 2021/0272008 | A1 * | 9/2021 | Oliver ................. G06N 10/40 |

FOREIGN PATENT DOCUMENTS

| | | | |
|---|---|---|---|
| WO | 2012064974 | A2 | 5/2012 |
| WO | 2012/074752 | A1 | 6/2012 |
| WO | 2012074752 | A1 | 6/2012 |
| WO | 2015/178990 | A2 | 11/2015 |
| WO | 2015178990 | A2 | 11/2015 |

OTHER PUBLICATIONS

Allen et al., "Blue Gene: A vision for protein science using a petaflop supercomputer," IBM Systems Journal 40(2):310-327, 2001.

Amin et al., "Decoherence in adiabatic quantum computation", arXiv:0708.0384, Aug. 2, 2007. https://arxiv.org/abs/0708.0384.

Amin et al., "Role of Single Qubit Decoherence Time in Adiabatic Quantum Computation", arXiv:0803.1196 [cond-mat.mes-hall], Sep. 17, 2009.

Amin et al., "Thermally assisted adiabatic quantum computation," arXiv:cond-mat/0609332v2, pp. 1-5, Mar. 2, 2007.

Ardavan et al., "Nanoscale solid-state quantum computing", Philosophical Transactions of the Royal Society of London, Jun. 11, 2003.

Averin et al., "Variable Electrostatic Transformer: Controllable Coupling of Two Charge Qubits," Physical Review Letters 91(5): 057003-1-057003-4, Aug. 1, 2003.

Barenco et al., "Elementary gates for quantum computation," Physical Review A 52(5):3457-3467, Nov. 1995.

Barends R. et al., "Coherent Josephson qubit suitable for scalable quantum integrated circuits," arXiv:1304.2322v1 [quant-ph], Apr. 8, 2013, 10 pages.

Berggren, "Quantum Computing With Superconductors", Proceedings of the IEEE, Oct. 1, 2004. https://www.researchgate.net/publication/2986358_Quantum_Computing_with_Superconductors.

Blatter et al., "Design aspects of superconducting-phase quantum bits," Physical Review B 63: 174511-1-174511-9, 2001.

Blaugher et al., "The Superconductivity of Some Intermetallic Compounds", IBM jJurnal, Jan. 1962. https://ieeexplore.ieee.org/document/5392424.

Bocko et al., "Prospects for Quantum Coherent Computation Using Superconducting Electronics," IEEE Transactions on Applied Superconductivity 7(2):3638-3641, Jun. 1997.

Boyer et al., "On the Cutting Edge: Simplified O(n) Planarity by Edge Addition", Journal of Graph Algorithms and Applications, Jan. 2004.

Brennen et al., "Why should anyone care about computing with anyons?," arXiv:0704.2241v1 [quant-ph], pp. 1-12, Apr. 18, 2007.

Bryant et al., "Introduction to Electronic Analogue Computing", Argonne National Laboratory AEC Rearch and Development, Jul. 1, 1960.

Bunyk et al., "Architectural Considerations in the Design of a Superconducting Quantum Annealing Processor," IEEE Trans. Appl. Supercond., 24, arXiv:1401.5504v1 [quant-ph] Jan. 21, 2014, 9 pages.

Butcher, J.R., "Advances in Persistent-Current Qubit Research: Inductively Coupled Qubits and Novel Biasing Methods," Final Report, Delft University of Technology, Jan. 14, 2002, 52 pages.

Carelli et al., "SQUID Systems for Macroscopic Quantum Coherence and Quantum Computing", IEEE trans. Apple. Supercond., Mar. 1, 2001. https://ieeexplore.ieee.org/document/919321.

Chancellor et al., "Circuit design for multi-body interactions in superconducting quantum annealing systems with applications to a scalable architecture", Nature Magazine, Aug. 1, 2016. https://www.nature.com/articles/s41534-017-0022-6.

Chen et al., "Qubit architecture with high coherences and fast tunable coupling", Physical Review Letters, Feb. 28, 2014. https://arxiv.org/abs/1402.7367.

Childs et al., "Robustness of adiabatic quantum computation", Physical Review A, vol. 65, Oct. 14, 2001.

(56) References Cited

OTHER PUBLICATIONS

Choudhury, "Handbook of Microlithography, Micromachining and Microfabrication vol. 1: Microlithography", The International Society for Optical Engineering, Bellingham, WA, 1999. (book details provided).
Clarke et al., "Quiet Readout of Superconducting Flux States," Physica Scripta. T102: 173-177, 2002.
Clarke et al., "Superconducting quantum bits," Nature 453:1031-1042, Jun. 19, 2008.
Cosmelli, C., "Controllable Flux Coupling for the Integration of Flux Qubits," arXiv:cond-mat/0403690v1 [cond-mat.supr-con]. Mar. 29, 2004, 10 pages.
Coury, "Embedding Graphs into Extended Grid", arXiv:cs/0703001 [cs.DM] Feb. 28, 2007. https://arxiv.org/abs/cs/0703001.
Deutsch, "Quantum theory, the Church-Turing principle and the universal quantum computer," Appeared in Proceedings of the Royal Society of London A 400: 97-117, 1985.
Devoret et al., "Superconducting Circuits for Quantum Information: An Outlook," Science 339:1169-1174, Mar. 8, 2013.
Devoret et al., "Superconducting Qubits: A Short Review," arXiv:cond-mat/0411174v1, Nov. 7, 2004, 41 pages.
DiVincenzo, "The Physical Implementation of Quantum Computation," Fortschr. Phys. 48:771-783, 2000.
Dolan et al., "Optimization on the NEOS Server," from SIAM News 35(6): 1-5, Jul./Aug. 2002.
Farhi et al., "Quantum Adiabatic Evolution Algorithms versus Simulated Annealing," MIT-CTP #3228, arXiv:quant-ph/0201031 v1, pp. 1-16, Jan. 8, 2002.
Feynman, "Simulating Physics with Computers," International Journal of Theoretical Physics 21(6/7): 467-488, 1982.
Filippov et al., "Tunable Transformer for Qubits Based on Flux States," IEEE Transactions on Applied Superconductivity 13(2): 1-4, Jun. 2003.
Fourer et al., "Optimization as an Internet Resource," Interfaces 31(2): 130-150, Mar.-Apr. 2001.
Friedman et al., "Detection of a Schrodinger's Cat State in an rf-SQUID," arXiv:cond-mat/0004293 2:1-7, Apr. 19, 2000.
Friedman et al., "Quantum superposition of distinct macroscopic states," Nature 406:43-46, Jul. 6, 2000.
Fritzsch et al., "SNS and SIS Josephson junctions with dimensions down to the sub-µm region prepared by an unified technology," Supercond. Sci. Tech. 12: 880-882, 1999.
Ghiu et al., "Asymmetric two-output quantum processor in any dimension," arXiv:quant-ph/0610138v1, pp. 1-8, Oct. 17, 2006.
Grajcar et al., "Four-Qubit Device with Mixed Couplings", Physical Review Letters, Oct. 2, 2006. https://journals.aps.org/prl/abstract/10.1103/PhysRevLett.96.047006.
Gutwenger et al., "Graph Drawing Algorithm Engineering with AGD", Software Visualization, 2001.
Han et al., "Time-Resolved Measurement of Dissipation-Induced Decoherence in a Josephson Junction," Science 293:1457-1459, Aug. 24, 2001.
Harris et al., "Sign and Magnitude Tunable Coupler for Superconducting Flux Qubits," arXiv:cond-mat/0608253v1 [cond-mat.supr-con], Aug. 11, 2006. 5 pages.
Harris et al., "Experimental Demonstration of a Robust and Scalable Flux Qubit," arXiv:0909.4321v1, Sep. 24, 2009, 20 pages.
Harris et al., "Experimental Investigation of an Eight-Qubit Unit Cell in a Superconducting Optimization Processor," arXiv:1004.1628v2, Jun. 28, 2010, 16 pages.
Heckmann et al., "Optimal Embedding of Complete Binary Trees into Lines and Grids", Lecture Notes in in Computer Science 2269, 1991.
Hillery et al., "Approximate programmable quantum processors," arXiv:quant-ph/0510161v1, pp. 1-7, Oct. 20, 2005.
Hosoya et al., "Quantum Flux Parametron—A Single Quantum Flux Superconducting Logic Device", IEEE Transactions on Applied Superconductivity, 1991.
Extended European Search Report for EP 17810979.9, dated Feb. 10, 2020, 11 pages.

Office Action for Korean Application No. 10-2019-7000422, dated Jun. 11, 2021, 10 pages.
Il'ichev et al., "Continuous Monitoring of Rabi Oscillations in a Josephson Flux Qubit," Physical Review Letters 91(9):097906-1-097906-4, week ending Aug. 29, 2003.
Istrail, "Statistical Mechanics, Three-Dimensionality and NP-completeness—I. Universality of Intractability for the Partition Function of the Ising Model Across Non-Planar Lattices", Brown University. 2000.
Kaiser et al., "Coherent Atomic Matter Waves: Proceedings of the Les Houches Summer School, Session LXXII in 1999," Springer-Verlag, New York, ISBN 286883499X, pp. 184-188, 294-295, 302-303.
Kaminsky et al., "Scalable Architecture for Adiabatic Quantum Computing of NP-Hard Problems", arXiv:quant-ph/0211152, Nov. 23, 2002.
Katzgraber et al., "Glassy Chimeras Could Be Blind to Quantum Speedup: Designing Better Benchmarks for Quantum Annealing Machines," Physical Review X(4):021008, 2014. (8 pages).
Knysh et al., "Adiabatic Quantum Computing in systems with constant inter-qubit couplings", arXiv:quant-ph/0511131, Nov. 15, 2005.
Koch et al., "Model for 1/f Flux Noise in SQUIDs and Qubits," pp. 1-14, May 5, 2007.
Krenner et al., "Recent advances in exciton-based quantum information processing in quantum dot nanostructures", New Journal of Physics, Aug. 26, 2005.
Lang, "Analog was not a Computer Trademark!," Sound & Vibration:Aug. 16-24, 2000.
Levinson, "Principles of Lithography", The International Society for Optical Engineering, Bellingham, WA, 2001. (book details provided).
Levitov, et al., "Quantum Spin Chains and Majorana States in Arrays of Coupled Qubits," arXiv:cond-mat/0108266v2 [cond-mat.mes-hall]. Aug. 19, 2001, 7 pages.
Lidar, "On the quantum computational complexity of the Ising spin glass partition function and of knot invariants," New Journal of Physics 6(167): 1-15, 2004.
Maasen van den Brink et al., "Mediated Tunable Coupling of Flux Qubits," New Journal of Physics 7(230) 2005, 19 pages.
Madou, Fundamentals of Microfabrication: The Science of Miniaturization, CRC Press, 2002, pp. 1-14.
Makhlin et al., "Quantum-state engineering with Josephson-junction devices," Reviews of Modern Physics 73(2):357-400, Apr. 2001.
Martinis et al., "Rabi Oscillations in a Large Josephson-junction Qubit," Physical Review Letters 89(11):117901-1-117901-4, Sep. 9, 2002.
Martinis, "Superconducting phase qubits," Quantum Inf Process 8:81-103, 2009.
McHugh et al., "A quantum computer using a trapped-ion spin molecule and microwave radiation," arXiv:quant-ph/0310015v2, pp. 1-9, Apr. 13, 2004.
Mizel et al., "Energy barrier to decoherence", Physical Review A, vol. 63, Mar. 19, 2001.
Mooij et al., "Josephson Persistent-Current Qubit," Science 285:1036-1039, Aug. 13, 1999.
Mutzel, "Optimization in graph drawing", Technische Universitat Wien, 2002.
Nakamura et al., "Coherent control of macroscopic quantum states in a single-Cooper-pair-box," Nature 398:786-788, Apr. 29, 1999.
Nielsen et al., Quantum Computation and Quantum Information, Cambridge University Press, Cambridge, 2000, "7.8 Other implementation schemes," pp. 343-345.
Nielsen, "Cluster-State Quantum Computation," arXiv:quant-ph/0504097v2, pp. 1-15, Jul. 1, 2005.
Niskanen et al., "Quantum Coherent Tunable Coupling of Superconducting Qubits," Science 316:723-726, May 4, 2007.
Orlando et al., "Superconducting persistent-current qubit," Physical Review B 60(22):15398-15413, Dec. 1, 1999.
Plourde et al., "Entangling Flux Qubits with a Bipolar Dynamic Inductance," Physical Review B 70, arXiv:quant-ph/0406049v1, Jun. 8, 2004, 4 pages.

(56) References Cited

OTHER PUBLICATIONS

Ramos et al., "Design for Effective Thermalization of Junctions for Quantum Coherence," IEEE Transactions on Applied Superconductivity 11(1):998-1001, Mar. 2001.
Rocchetto et al., "Stabilisers as a design tool for new forms of Lechner-Hauke-Zoller Annealer", arXiv:1603.08554 [quant-ph], May 2, 2016. https://arxiv.org/abs/1603.08554.
Ryan et al., "Characterization of complex quantum dynamics with a scalable NMR information processor," arXiv:quant-ph/0506085v2, pp. 1-4, Feb. 13, 2006.
Shields et al., "Area efficient layouts of binary trees in grids", ACM Digital Library, 2001.
Shin et al., "How "Quantum" is the D-Wave Machine?", arXiv:1401.7087v2, May 2, 2014.
Shirts et al., "Computing: Screen Savers of the Word Unite!," Science Online 290(5498): 1903-1904, Dec. 8, 2000.
Shnirman et al., "Quantum Manipulations of Small Josephson Junctions," Physical Review Letters 79(12):2371-2374, Sep. 22, 1997.
Shoji et al., "New fabrication process for Josephson tunnel junctions with (niobium nitride, niobium) double-layered electrodes," Appl. Phys. Lett. 41(11): 1097-1099, Dec. 1, 1982.
Shor, "Introduction to Quantum Algorithms," AT&T Labs—Research, arXiv:quant-ph/0005003 v2, pp. 1-17, Jul. 6, 2001.
Steffen et al., "Quantum computing: An IBM perspective", IBM Journal of Research and Development, Sep./Oct. 2011.
T. P. Spiller, I. D'Amico & B. W. Lovett, "Entanglement distribution for a practical quantum-dot-based quantum processor architecture", New Journal of Physics, Jan. 29, 2007.
Thaker et al., "Quantum Memory Hierarchies: Efficient Designs to Match Available Parallelism in Quantum Computing," arXiv:quant-ph/0604070v1, 12 pages, Apr. 10, 2006.
Van Dam, "Quantum Computing: In the 'Death Zone'?," Nature Physics 3:220-221, Apr. 2007.
Van Zant, "Microchip Fabrication", Fourth Edition, McGraw-Hill, New York, 2000. (book details provided).
Vlasov, "Von Neumann Quantum Processors," arXiv:quant-ph/0311196v1, pp. 1-8, Nov. 27, 2003.
Wendin et al., "Superconducting Quantum Circuits, Qubits and Computing," arXiv:cond-mat/0508729v1 [cond-mat.supr-con], Aug. 30, 2005, 60 pages.
Williams, "Explorations in Quantum Computing", Springer, New York, Dec. 12, 1997, Chapter 11, "How to Make a Quantum Computer," pp. 241-265.
Wocjan et al., "Treating the Independent Set Problem by 2D Ising Interactions with Adiabatic Quantum Computing," arXiv:quant-ph/0302027v1, pp. 1-13, Feb. 4, 2003.
You et al., "Fast Two-Bit Operations in Inductively Coupled Flux Qubits," arXiv:cond-mat/0309491 v1, pp. 1-5, Sep. 22, 2003.
Zagoskin et al., "Superconducting Qubits", arXiv:0805.0164 [cond-mat.supr-con], 2007. [0805.0164] Superconducting qubits (arxiv.org).
International Search Report for PCT Application No. PCT/US2017/036437 dated Sep. 12, 2017, 3 pages.
Written Opinion for PCT Application No. PCT/US2017/036437 dated Sep. 12, 2017, 8 pages.

\* cited by examiner

SYSTEMS AND METHODS FOR QUANTUM PROCESSOR TOPOLOGY

FIELD

This disclosure generally relates to designs, layouts, and topologies for quantum processors comprising qubits.

BACKGROUND

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are not binary digits (bits) but typically are quantum binary digits or qubits.

There are several types of quantum computers. An adiabatic quantum computer is a type of quantum computer that can be used to solve various computational problems including optimization problems, for example. Further details on adiabatic quantum computing systems, methods, and apparatus are described in, for example, U.S. Pat. Nos. 7,135,701 and 7,418,283.

Quantum Devices

Quantum devices are structures in which quantum mechanical effects are observable. Quantum devices include circuits in which current transport is dominated by quantum mechanical effects such as electronic spin and superconductivity. Quantum devices can be used for measurement instruments, in computing machinery, and the like. An analog processor (e.g., a quantum processor) can provide a plurality of quantum devices (e.g., qubits) which are controllably coupled to each other. The design and selection of an analog processor's topology (also referred to herein as the architecture)—that is, the arrangement of qubits and couplers and/or other quantum devices—is an important aspect of an analog processor design. Particular topologies may be better suited to solving certain classes of problems than others. U.S. Pat. No. 8,772,759 provides various examples of analog processor topologies.

Quantum Annealing

Quantum annealing is a computation method that may be used to find a low-energy state of a system, for example the ground state of a system. Quantum annealing may use quantum effects, such as quantum tunneling to reach a global energy minimum. In quantum annealing, thermal effects and other noise may be present. The final low-energy state may not be the global energy minimum.

Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

BRIEF SUMMARY

A quantum processor may be summarized as including a first set of qubits, each qubit in the first set of qubits extending parallel to a first major axis along at least a majority of the qubit's length; a second set of qubits, each qubit in the second set of qubits extending parallel to a second major axis along at least a majority of the qubit's length, each qubit in the second set of qubits crossing at least one qubit in the first set of qubits; a third set of qubits, each qubit in the third set of qubits crossing at least one qubit in the first set of qubits and each qubit in the second set of qubits; and a set of intra-cell couplers, each coupler proximate a respective point where a first qubit in the first, second, or third set of qubits crosses a second qubit in a different one of the first, second, and third sets of qubits, each coupler providing communicative coupling between the first and second qubits.

In some implementations, each qubit in the second set of qubits extends parallel to a third major axis and the first, second, and third major axes are non-parallel with each other and non-orthogonal to each other so that the first and second axes meet at a first angle, the first and third axes meet and a second angle, and the second and third axes meet at a third angle. In some implementations, the first, second, and third angles are equal to each other.

In some implementations, the first major axis is orthogonal to the second major axis; each qubit in the third set of qubits comprises a first portion extending parallel to the first major axis and a second portion extending parallel to the second major axis; each qubit in the second set of qubits crosses each qubit in the first set of qubits orthogonally; and each qubit in the first and second sets of qubits crosses at least one qubit in the third set of qubits orthogonally.

In some implementations, at least one qubit of the third set of qubits comprises a third portion between the first and second portions of the at least one qubit, the third portion comprising at least one of: a bend and a curvature. In some implementations, the third portion comprises a first bend proximate to the first portion and a second bend proximate to the second portion. In some implementations, the at least one qubit of the third set of qubits comprises a fourth portion proximate to a crossing between the at least one qubit and at least one qubit of the first set of qubits, the fourth portion extending non-orthogonally to the first and second major axes and extending away from the first and second sets of qubits.

In some implementations, the qubits of the first and second sets of qubits each have a length less than or equal to a threshold length and the at least one qubit of the third set of qubits has a length greater than the threshold length. In some implementations, the qubits of the first and second sets of qubits cross each other in a central region and each qubit of the third set of qubits crosses each of the qubits of the first and second sets of qubits in a boundary region bounding the central region.

In some implementations, the first set of qubits comprises a first plurality of subsets and the second set of qubits comprises a second plurality of subsets, wherein each qubit of the third set of qubits crosses each qubit of at least one subset of the first plurality of subsets and at least one subset of the second plurality of subsets. In some implementations, for each pairing of a first subset of the first plurality of subsets and a second subset of the second plurality of subsets, there is a respective qubit of the third set of qubits crossing each qubit of the first and second subsets.

In some implementations, each qubit of the third set of qubits comprises a third portion between respective first and second portions of the qubit, the third portions of each qubit of the third set of qubits being arranged in a central region, each qubit of the third set of qubits crossing qubits of the first and second sets in a boundary region bounding the central region, each crossing of qubits in the first and second sets also being in the boundary region.

In some implementations, the quantum processor comprises one or more further intra-cell couplers, each coupler proximate third and fourth qubits of the third set of qubits and providing communicative coupling between the third and fourth qubits.

In some implementations, a total length of the at least one qubit of the third subset of qubits is equal to a total length of qubits of the first and second sets of qubits.

In some implementations, the first plurality of subsets comprises a first subset comprising half of the qubits of the first set of qubits and a second subset comprising the other half of the qubits of the first set of qubits and the second plurality of subsets comprises a third subset comprising half of the qubits of the second set of qubits and a fourth subset comprising the other half of the qubits of the second set of qubits; the first, second, third, and fourth subsets being disjoint; and for each qubit of the third set of qubits the first portion crosses each qubit in one of the first subset and the second subset and the second portion crosses each qubit in one of the third subset and the fourth subset.

In some implementations, the quantum processor comprises a plurality of cells tiled over an area such that each cell is positioned proximately adjacent at least one other cell, a first cell comprising the first, second, and third sets of qubits and each other cell of the plurality cells comprising like first, second, and third sets of qubits: a set of inter-cell couplers, each inter-cell coupler providing tunable communicative coupling between pairs of qubits in adjacent cells; wherein the set of inter-cell couplers provide tunable communicative coupling between at least one qubits in the first set of qubits of the first cell and at least one of the qubits in the first set of qubits of a second cell, tunable communicative coupling between at least one of the qubits in the second set of qubits of the first cell and at least one of the qubits in the second set of qubits of a third cell, and tunable communicative coupling between at least one of the qubits in the third set of qubits of the first cell and at least one of the qubits in the third set of qubits of a fourth cell.

In some implementations, the quantum processor comprises a plurality of superconducting qubits, at least a first qubit of the plurality comprising a loop of superconducting material comprising: a central portion extending along a central axis; a first distal portion, the first distal portion arranged at and integrally formed with a first end of the central portion, the first distal portion extending along a first distal axis non-parallel to the central axis; a second distal portion, the second distal portion arranged at and integrally formed with a second end of the central portion, the second end opposing the first end along the central axis, the second distal portion extending along a second distal axis non-parallel to the central axis.

In some implementations, the first and second distal axes are parallel to each other and orthogonal to the central axis. In some implementations, the first qubit has a shape comprising at least one of: an H-shape and an I-shape, wherein the first and second ends of the central portion are proximate central regions of the first and second distal portions along the first and second distal axes, respectively. In some implementations, the first qubit has a shape comprising a U-shape, wherein the first and second ends of the central portion are proximate ends of the first and second distal portions along the first and second distal axes, respectively.

In some implementations, the quantum processor comprises: a plurality of cells tiled over an area such that each cell is positioned proximately adjacent at least one other cell, a first cell comprising the at least one qubit and one or more like qubits; a set of intra-cell couplers for each cell, the intra-cell couplers providing tunable communicative coupling between qubits in the cell; a set of inter-cell couplers, each inter-cell coupler providing tunable communicative coupling between qubits in adjacent cells; wherein a first coupler subset comprising two or more inter-cell couplers communicatively couples the first qubit, via the first distal portion, to a first qubit subset comprising two or more qubits in one or more adjacent cells; and a second coupler subset comprising two or more inter-cell couplers communicatively couples the first qubit, via the second distal portion, to a second qubit subset comprising two or more qubits in one or more adjacent cells.

In some implementations, a first inter-cell coupler of the first coupler subset communicatively couples the first qubit, via the first distal portion, to a first adjacent qubit of the first qubit subset, the first adjacent qubit in a first adjacent cell like the first cell, the first adjacent qubit occupying a position in the first adjacent cell unlike a position of the first qubit in the first cell.

In some implementations, the first inter-cell coupler extends diagonally relative to the first qubit, thereby extending non-orthogonal and non-parallel to the central axis and the first and second distal axes.

In some implementations, the first inter-cell coupler crosses a second inter-cell coupler, the second inter-cell coupler coupling a second qubit in the first cell to a second adjacent qubit in the first adjacent cell, the second qubit proximate to the first qubit and the second adjacent qubit occupying a position in the first adjacent cell corresponding to a position of the first qubit.

In some implementations, the first inter-cell coupler extends substantially parallel to a second inter-cell coupler, the second inter-cell coupler coupling a second qubit in the first cell to a second adjacent qubit in the first adjacent cell, the second qubit proximate to the first qubit and the second adjacent qubit occupying a position in the first adjacent cell corresponding to a position of the first qubit.

In some implementations, the quantum processor comprises a first corner inter-cell coupler communicably coupling a first corner distal portion of a first corner qubit of the first cell to a first adjacent corner qubit of a second cell, the second cell neighbouring one or more cells adjacent to the first cell along at least one of the central axis and first and second distal axes; wherein the first corner inter-cell coupler couples to first end of a distal portion of the first corner qubit, the first end being proximate to an outer boundary of the first cell along the central axis and at least one of the first and second distal axes.

In some implementations, the quantum processor comprises a second corner inter-cell coupler communicably coupling a second corner distal portion of a second corner qubit of the first cell to a second adjacent corner qubit of the second cell, the second corner distal portion extending orthogonally to the first corner distal portion, the second corner inter-cell coupler crossing the first inter-cell coupler.

In some implementations, the quantum processor comprises a second corner inter-cell coupler communicably coupling a second corner distal portion of a second corner qubit of the first cell to a second adjacent corner qubit of a third cell, the second corner distal portion extending orthogonally to the first corner distal portion, the second corner inter-cell coupler extending orthogonal to and non-overlapping with the first inter-cell coupler.

In some implementations, the quantum processor comprises a plurality of superconducting qubits each comprising a loop of superconducting material, the plurality of qubits comprising a first set of qubits and a second set of qubits, the qubits of the first set of qubits extending parallel to a first axis and the qubits of the second set of qubits extending parallel to a second axis orthogonal to the first axis, one or more qubits of the first set of qubits crossing one or more qubits of the second set of qubits at one or more crossing regions; a first set of couplers communicably coupling the one or more qubits of the first set of qubits to the one or more qubits of the second set of qubits at the one or more crossing regions; a second set of couplers comprising at least a first coupler communicably coupling a first qubit of the first set of qubits to a second qubit of the first set of qubits, the first and second qubits non-overlapping, the first coupler comprising a first coupling portion coupling to the first qubit, a second coupling portion coupling to the second qubit, and an extension portion extending orthogonally to the first and second qubits and communicatively coupling the first and second coupling portions.

In some implementations, the first coupler non-communicatively crosses a third qubit of the first set of qubits, the third qubit disposed between the first and second qubits.

In some implementations, each qubit of the first set of qubits is coupled to each qubit of the second set of qubits by a respective coupler of the first set of couplers; each pair of qubits of the first set of qubits is communicatively coupled to each other by a respective coupler of the second set of couplers; and each pair of qubits of the second set of qubits is communicatively coupled to each other by a respective coupler of the second set of couplers.

In some implementations, the quantum processor comprises a plurality of cells tiled over an area such that each cell is positioned proximately adjacent at least one other cell, a first cell comprising the first qubit and one or more like qubits and a second cell comprising the second qubit and one or more like qubits; wherein the second set of couplers comprises: a first subset of inter-cell couplers providing tunable communicative coupling between qubits proximately adjacent to each other in adjacent cells over an inter-cell distance; and a second subset of long-range couplers providing tunable communicative coupling between non-proximately adjacent qubits of the first set of qubits in different cells, a first long-range coupler communicatively coupling the first and second qubits over a long-range distance, the long-range distance greater than the inter-cell distance.

In some implementations, each long-range coupler communicatively couples qubits having like positions in their respective cells.

In some implementations, the first occupies a first position in the first cell and the second qubit occupies a second position in the second cell unlike the first position.

In some implementations, the quantum processor comprises a plurality of cells tiled over an area such that each cell is positioned proximately adjacent at least one other cell, a first cell comprising the first qubit and one or more like qubits and a second cell comprising one or more like qubits including a third qubit; wherein the second set of couplers comprises: a first subset of inter-cell couplers providing tunable communicative coupling between qubits proximately adjacent to each other in adjacent cells over an inter-cell distance; and a second subset of long-range couplers providing tunable communicative coupling between non-proximately adjacent qubits of the first set of qubits in different cells, a first long-range coupler communicatively coupling the first and third qubits over a long-range distance, the long-range distance greater than the inter-cell distance; wherein the first and third qubits extend parallel to respective non-parallel axes.

In some implementations, long-range couplers of the second subset change direction about an axis of symmetry, each of the long-range couplers extending toward the axis of symmetry from a first end along a first portion parallel to a first extension axis, bending at a bent region proximate to the axis of symmetry, and extending toward a second end and away from the axis of symmetry along a second portion parallel to a second extension axis orthogonal to the first extension axis.

In some implementations, the axis of symmetry passes through a central tile, the bent regions of a plurality of long-range couplers disposed in the central cell, each of the long-range couplers disposed entirely on a respective side of the axis of symmetry.

In some implementations, the plurality of qubits comprises a first set of adjacent cells and a second set of long-range cells, the second set of long-range cells comprising the second cell, the first set of adjacent cells comprising a plurality of cells each proximately adjacent to the first cell and mutually non-proximately adjacent to each other.

In some implementations, long-range couplers of the second subset communicatively couple one or more qubits of the first set of qubits in a first adjacent cell to one or more corresponding qubits of the first set of qubits in a second adjacent cell, the one or more qubits of the first adjacent cell being coupled to one or more qubits of the first cell and the one or more qubits of the second adjacent cell indirectly coupled to the first cell at least by the one or more qubits of the first adjacent cell.

In some implementations, the adjacent cells are diagonally offset from each other in the tiled area.

In some implementations, the second set of couplers further comprises a third subset of couplers and, for one or more of the plurality of cells, each pair of qubits of the first set of qubits in the cell is communicatively coupled to each other by a respective coupler of the third set of couplers; and each pair of qubits of the second set of qubits in the cell is communicatively coupled to each other by a respective coupler of the third set of couplers.

In some implementations, the plurality of cells being tiled over the area comprises a subtopology comprising a first set of one or more cells comprising qubits coupled to each other within each cell by the third subset of couplers, the first set of one or more cells disposed adjacent a second set of one or more cells comprising qubits coupled to qubits in other cells by the second subset of long-range couplers, the subtopology tiled over the area.

In some implementations, the first and second sets of qubits each comprise the same number of cells.

In some implementations, the first subset of qubits comprises fewer cells than the second subset of qubits.

In some implementations, the quantum processor comprises: a plurality of superconducting qubits each comprising a loop of superconducting material, the plurality of qubits comprising first and second sets of qubits, the first and second sets of qubits respectively comprising first and second bent qubits, each of the first and second bent qubits respectively comprising a first portion extending parallel to a first axis, a second portion extending parallel to a second axis, and a bent region connecting and communicatively coupling the first and second portions, the first portion of the first bent qubit crossing a first qubit of the first set of qubits at a first crossing region; a first set of couplers comprising at least a first coupler proximate to the respective bent regions of the first and second bent qubits, the first coupler communicably coupling the first and second bent qubits via the respective bent regions; a second set of couplers comprising at least a second coupler proximate to the first crossing region, the second coupler communicatively coupling the first bent qubit and the first qubit.

In some implementations, each qubit of the first and second sets of qubits respectively comprises a first portion extending parallel to a first axis, a second portion extending parallel to a second axis, and a bent region connecting and communicatively coupling the first and second portions; each qubit of the first set of qubits being communicatively coupled to each other qubit of the first set of qubits at a respective crossing region where the qubit and the other qubit cross by a coupler of the second set of couplers.

In some implementations, for each qubit of the first set of qubits, a coupler of the first set of couplers communicatively couples the qubit to a further qubit of the second set of qubits, the coupler proximate to the bent regions of the qubit and the further qubit.

In some implementations, the first axes of the first and second sets of qubits are parallel to each other and the second axes of the first and second sets of qubits are parallel to each other and orthogonal to the first axes.

In some implementations, each qubit of the first set of qubits has a length substantially the same as a length of each other qubit of the first set of qubits.

In some implementations, each of the first and second sets of qubits respectively comprise one or more linear qubits, each linear qubit of the first set extending parallel to a first extension axis, the first extension axis parallel to one of the first axis and the second axis of the first bent qubit, and each linear qubit of the second set extending parallel to a second extension axis, the second extension axis parallel to one of the first axis and the second axis of the second bent qubit.

In some implementations, the first qubit comprises a first linear qubit of the one or more linear qubits, the first linear qubit crossing a number of qubits in both the first and second sets of qubits at a corresponding number of crossing regions, the first linear qubit being communicatively coupled to each of the number of qubits via couplers of the second set of couplers proximate to the corresponding number of crossing regions.

In some implementations, the one or more linear qubits and one or more bent qubits like the first bent qubit are disposed alternatingly between linear and bent qubits along an axis orthogonal to the first extension axis.

In some implementations, the quantum processor comprises a plurality of cells tiled over an area such that each cell is positioned proximately adjacent at least one other cell, each cell comprising: a first set of qubits; a second set of qubits, wherein a portion of at least one qubit in the first set of qubits crosses a portion of at least one qubit in the second set of qubits and wherein a portion of at least one qubits in the first set of qubits crosses a portion of at least one of the qubits in the second set of qubits in an adjacent cell; a first set of inter-cell couplers, wherein each of the inter-cell couplers is located proximate a first end of each of the qubits in the first set of qubits and a first end of each of the qubits in the second set of qubits and wherein each of the inter-cell couplers provides tunable communicative coupling between one of the qubit in the first set of qubits and one of the qubits in the first set of qubits in an adjacent cell or between one of the qubits in the second set of qubits and one of the qubits in the second set of qubits in an adjacent cell; a first set of intra-cell couplers, wherein each of the intra-cell couplers in the first set of intra-cell couplers is positioned proximate a region where one of the qubit in the first set of qubits crosses one of the qubit in the second set of qubits and provides tunable communicative coupling between one of the qubits in the first set of qubits and one of the qubits in the second set of qubits; and a second set of intra-set couplers, wherein each of the intra-cell couplers in the second set of intra-set couplers provides tunable communicative coupling between one qubit in the first set of qubits another one of the qubit in the first set of qubits or between one of the qubits in the second set of qubits and another one of the qubits in the second set of qubits.

In some implementations, each cell further comprises a second set of inter-cell couplers, each of the inter-cell couplers in the second set of inter-cell couplers providing tunable communicative coupling between one of the qubits in the first set of qubits and one of the qubits in the first set of qubits in an adjacent cell, wherein the adjacent cell is positioned along a first direction respective to the cell and the first direction is non-parallel to a longitudinal axis of the first set of qubits or between one of the qubits in the second set of qubits and one of the qubits in the second set of qubits in an adjacent cell, wherein the adjacent cell is positioned along a second direction respective to the cell and the second direction is non-parallel to a longitudinal axis of the second set of qubits.

In some implementations, each of the qubits in the first and the second set of qubits is comprised of a loop of superconductive material interrupted by at least one Josephson junction.

In some implementations, the longitudinal axis of each of the qubits in the first set of qubits is parallel to a third direction and the longitudinal axis of each qubit in the second set of qubits is parallel to a fourth direction.

In some implementations, the third direction is orthogonal to the fourth direction.

In some implementations, each cell comprises twelve qubits in the first set of qubits and twelve qubits in the second set of qubits. A quantum processor may comprise a plurality of cells tiled over an area such that each cell is positioned proximately adjacent at least one other cell, each cell comprises a first set of qubits, a second set of qubits, wherein a portion of at least one qubit in the first set of qubits crosses a portion of at least one qubit in the second set of qubits and wherein a portion of at least one qubits in the first set of qubits crosses a portion of at least one of the qubits in the second set of qubits in an adjacent cell, a first set of inter-cell couplers, wherein each of the inter-cell couplers is located proximate a first end of each of the qubits in the first set of qubits and a first end of each of the qubits in the second set of qubits and wherein each of the inter-cell couplers provides tunable communicative coupling between one of the qubit in the first set of qubits and one of the qubits in the first set of qubits in an adjacent cell or between one of the qubits in the second set of qubits and one of the qubits in the second set of qubits in an adjacent cell, a first set of intra-cell couplers, wherein each of the intra-cell couplers in the first set of intra-cell couplers is positioned proximate a region where one of the qubit in the first set of qubits crosses one of the qubit in the second set of qubits and provides tunable communicative coupling between one of the qubits in the first set of qubits and one of the qubits in the second set of qubits, and a second set of intra-set couplers, wherein each of the intra-cell couplers in the second set of intra-set couplers provides communicative coupling between one qubit in the first set of qubits another one of the qubit in the first set of qubits or between one of the qubits in the second set of qubits and another one of the qubits in the second set of qubits.

Each cell in a quantum processor may further comprise a second set of inter-cell couplers, each of the inter-cell coupler in the second set of inter-cell couplers providing tunable communicative coupling between one of the qubits in the first set of qubits and one of the qubits in the first set of qubits in an adjacent cell, wherein the adjacent cell is positioned along a first direction respective to the cell and the first direction is non-parallel to a longitudinal axis of the first set of qubits or between one of the qubits in the second set of qubits and one of the qubits in the second set of qubits in an adjacent cell, wherein the adjacent cell is positioned along a second direction respective to the cell and the second direction is non-parallel to a longitudinal axis of the second set of qubits.

Each of the qubits in the first and the second set of qubits may be comprised of a loop of superconductive material interrupted by at least one Josephson junction.

The longitudinal axis of each of the qubits in the first set of qubits is parallel to a third direction and the longitudinal axis of each qubit in the second set of qubits is parallel to a fourth direction. The third direction may be orthogonal to the fourth direction.

Each cell may comprise twelve qubits in the first set of qubits and twelve qubits in the second set of qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

DETAILED DESCRIPTION

Figure 1:
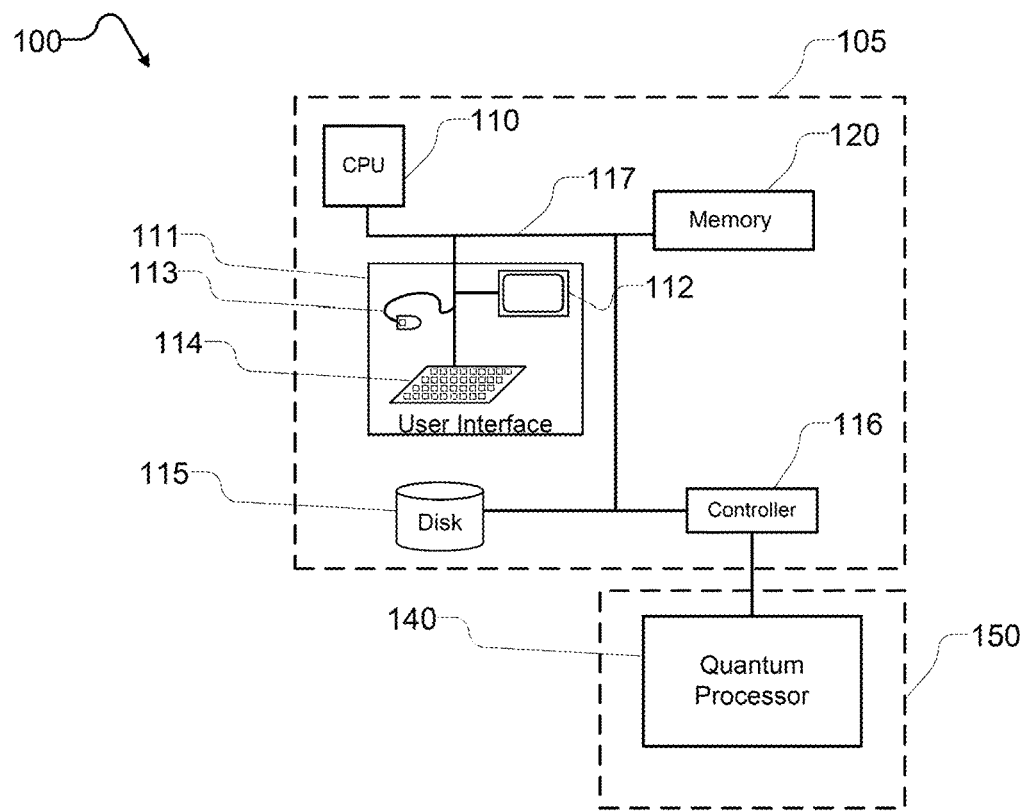
FIG. 1 is a schematic diagram that illustrates an exemplary hybrid computer including a digital processor and an analog processor in accordance with the present systems, devices, methods, and articles.

In the following description, some specific details are included to provide a thorough understanding of various disclosed embodiments. One skilled in the relevant art will recognize that embodiments may be practiced without one or more of these specific details, or with other methods, components, materials, etc. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and appended claims, the word "comprise" and variations thereof, such as, "comprises" and "comprising" are to be construed in an open, inclusive sense, that is, as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a system including "a quantum processor" includes a single quantum processor, or two or more quantum processors. It should also be noted that the term "or" is generally employed in its sense including "and/or" unless the content clearly dictates otherwise.

The term "connectivity" describes the number of possible or available communicative coupling paths that are available (e.g., whether active or not) to communicably couple directly between pairs of qubits in a quantum processor without the use of intervening qubits. As an example, a qubit with a connectivity of three is capable of directly communicably coupling to up to three other qubits without any intervening qubits due to the physical topology of the qubits and couplers as manufactured. In other words, there are direct communicative coupling paths available to a maximum of three other qubits, although in any particular application all or less than all of those direct communicative coupling paths may actually be employed depending on the particular problem being solved and/or mapping of that particular problem to the processor or hardware.

Typically, qubits on an outer perimeter (i.e., qubits positioned along the edges of an array) of the architecture or topology layout will have a smaller number of physically available direct connections than qubits located inwardly of the perimeter. The qubits on an outer perimeter of the array are denominated herein as perimeter, or edge, qubits. Where the qubits are arrayed in an array with a polygonal perimeter (e.g., square, rectangular, hexagonal), the qubits at the corners of the perimeter typically have the smallest number of physically available direct connections. These qubits at the corners of the perimeter are denominated herein as corner qubits. Thus, the edge or corner qubits may limit the measure of physical connectivity for any given architecture or topology.

These non-perimeter or non-edge qubits are referred to herein as inner qubits, per the processor design, whether those direct connections are ever used or not in solving any particular problem.

One or more quantum processors are fabricated or manufactured according to a given design. However, in some instances, one or more defects may prevent all of the qubits and/or all of the couplers of any given manufactured quantum processor from being operational or within tolerance of a design specification (i.e., within spec). Thus, the design processor or hardware graph for the design may not be an accurate portrayal of any given instance of the manufactured quantum processor. In fact, different instances of the quantum processors based on a given design may vary from one another due to these manufacturing defects or out of tolerance components.

FIG. 1 illustrates a hybrid computing system 100 including a digital computer 105 coupled to an analog computer 150. In some implementations the analog computer 150 is a quantum computer. The exemplary digital computer 105 includes a digital processor (CPU) 110 that may be used to perform classical digital processing tasks.

Digital computer 105 may include at least one digital processor (such as central processor unit 110 with one or more cores), at least one system memory 120, and at least one system bus 117 that couples various system components, including system memory 120 to central processor unit 110.

The digital processor may be any logic processing unit, such as one or more central processing units ("CPUs"), graphics processing units ("GPUs"), digital signal processors ("DSPs"), application-specific integrated circuits ("ASICs"), programmable gate arrays ("FPGAs"), programmable logic controllers (PLCs), etc.

Digital computer 105 may include a user input/output subsystem 111. In some implementations, the user input/output subsystem includes one or more user input/output components such as a display 112, mouse 113, and/or keyboard 114.

System bus 117 can employ any known bus structures or architectures, including a memory bus with a memory controller, a peripheral bus, and a local bus. System memory 120 may include non-volatile memory, such as read-only memory ("ROM"), static random access memory ("SRAM"), Flash NAND; and volatile memory such as random access memory ("RAM") (not shown).

Digital computer 105 may also include other non-transitory computer- or processor-readable storage media or non-volatile memory 115. Non-volatile memory 115 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 115 may communicate with digital processor via system bus 117 and may include appropriate interfaces or controllers 116 coupled to system bus 117. Non-volatile memory 115 may serve as long-term storage for processor- or computer-readable instructions, data structures, or other data (sometimes called program modules) for digital computer 105.

Although digital computer 105 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc. Those skilled in the relevant art will appreciate that some computer architectures employ volatile memory and non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 120. For example, system memory 120 may store instruction for communicating with remote clients and scheduling use of resources including resources on the digital computer 105 and analog computer 150.

In some implementations system memory 120 may store processor- or computer-readable calculation instructions to perform pre-processing, co-processing, and post-processing to analog computer 150. System memory 120 may store at set of analog computer interface instructions to interact with the analog computer 150.

Analog computer 150 may include an analog processor such as quantum processor 140. The analog computer 150 can be provided in an isolated environment, for example, in an isolated environment that shields the internal elements of the quantum computer from heat, magnetic field, and other external noise (not shown).

A quantum processor includes programmable elements such as qubits, couplers, and other devices. Examples of qubits and how they are arranged are shown in FIGS. 3-5 and FIGS. 7-23B.

In one implementation, the quantum processor is a superconducting quantum processor including a number of qubits and associated local bias devices. The superconducting quantum processor may also employ couplers providing communicative coupling between qubits. Further details and embodiments of exemplary quantum processors that may be used in conjunction with the present systems methods and apparatus are described in, for example, U.S. Pat. Nos. 7,533,068; 8,008,942; 8,195,596; 8,190,548; and 8,421,053.

Examples of superconducting qubits include superconducting flux qubits, superconducting charge qubits, and the like. In a superconducting flux qubit, the Josephson energy dominates or is equal to the charging energy. In a charge qubit, it is the reverse. Examples of flux qubits that may be used include rf-SQUIDs, which include a superconducting loop interrupted by one Josephson junction, persistent current qubits, which include a superconducting loop interrupted by three Josephson junctions, and the like. In some implementations, the qubits and couplers are controlled by on-chip circuitry. Examples of on-chip control circuitry can be found in U.S. Pat. Nos. 7,876,248; 7,843,209; 8,018,244; 8,098,179; 8,169,231; and 8,786,476.

Throughout this specification and the appended claims, the "architecture" or "topology" of a quantum processor is defined by the relative physical positions of the qubits and couplers in the quantum processor.

A connection is a direct communicative path between two elements (e.g., between two qubits via a single coupler without an intervening qubits). A coupling can be a direct communicative path between two elements (e.g., between two qubits via a single coupler without an intervening qubits) or an indirect communicative coupling between two elements (e.g., between two qubits via another intervening qubit and/or multiple couplers).

In some implementations, the qubits and couplers in a quantum processor are arranged in an architecture (or topology) such that a certain number of qubits are laid out into a number of sub-topologies, each sub-topology also referred to herein as a cell of qubits (hereinafter "cell"). A cell is a repeated sub-topology of a quantum processor topology comprising qubits and couplers. A plurality of cells tiled over an area produces a certain quantum processor architecture or topology. Each qubit in a cell may be included in only one cell such that no qubit may be included in multiple cells and no qubit may be shared among multiple cells.

A qubit within a cell can be communicatively coupled to another qubit within the same cell by a coupler referred to herein as an intra-cell coupler. A qubit in one cell can be communicatively coupled to another qubit in a different cell by a coupler referred to herein as an inter-cell coupler.

Any given coupling may be controllable (e.g., ON/OFF) as specified by a programming configuration of the quantum processor. The programming configuration of the quantum processor may be performed by a non-quantum processor, such as a digital processor. A quantum processor may interact with a digital processor to solve a particular problem.

Figure 2:
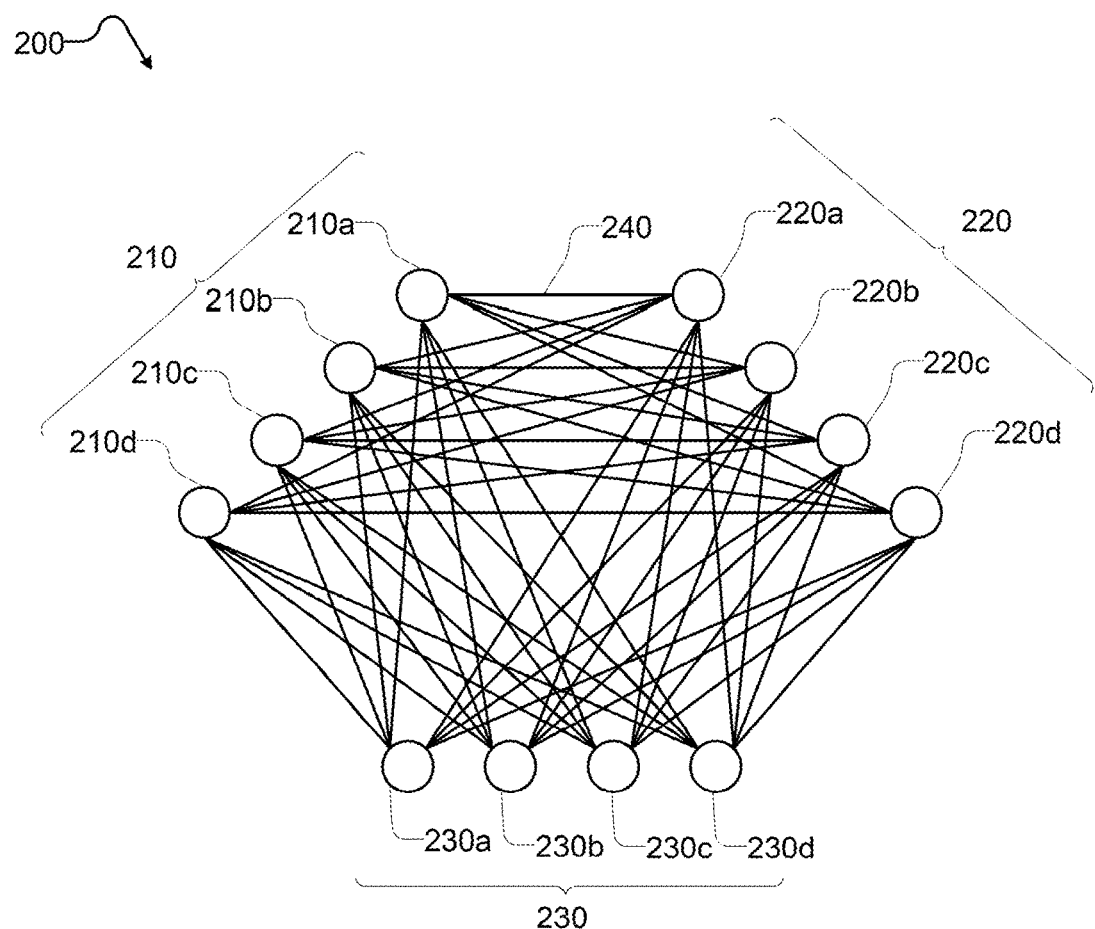
FIG. 2 is an example graph of a complete tripartite graph.

FIG. 2 shows an example graph 200 of a complete tripartite graph. Example graph 200 has twelve nodes (210a to 210d, 220a to 220d and 230a to 230d) or vertices, grouped in three sets 210, 220 and 230.

A person skilled in the art will recognize that the terms 'node' and 'vertex' can be used interchangeably in a graph. Therefore, for the purpose of this specification and the appended claims, the term 'node' can be substituted for 'vertex' and 'vertex' can substituted for 'node'.

Example graph 200 is a complete tripartite graph where all the nodes in a set (e.g., set 210) are connected to each of the nodes in the other two sets (e.g., sets 220 and 230), but there is no direct connection between nodes in the same set. For example, there is no physical connection between nodes 210a and 210b. Each node in example graph 200 is connected to eight other nodes in example graph 200, and, therefore, has a connectivity of eight. Physical connections in example graph 200 are shown as lines 240 (only one called out for clarity).

Example graph 200 may represent the connectivity of a tripartite cell in a quantum processor with twelve nodes in accordance with the present systems, methods and apparatus. Example graph 200 is shown as having four nodes in each set, however, this is not intended to be limiting. Other tripartite graphs may have a smaller or a larger number of nodes.

Figure 3:
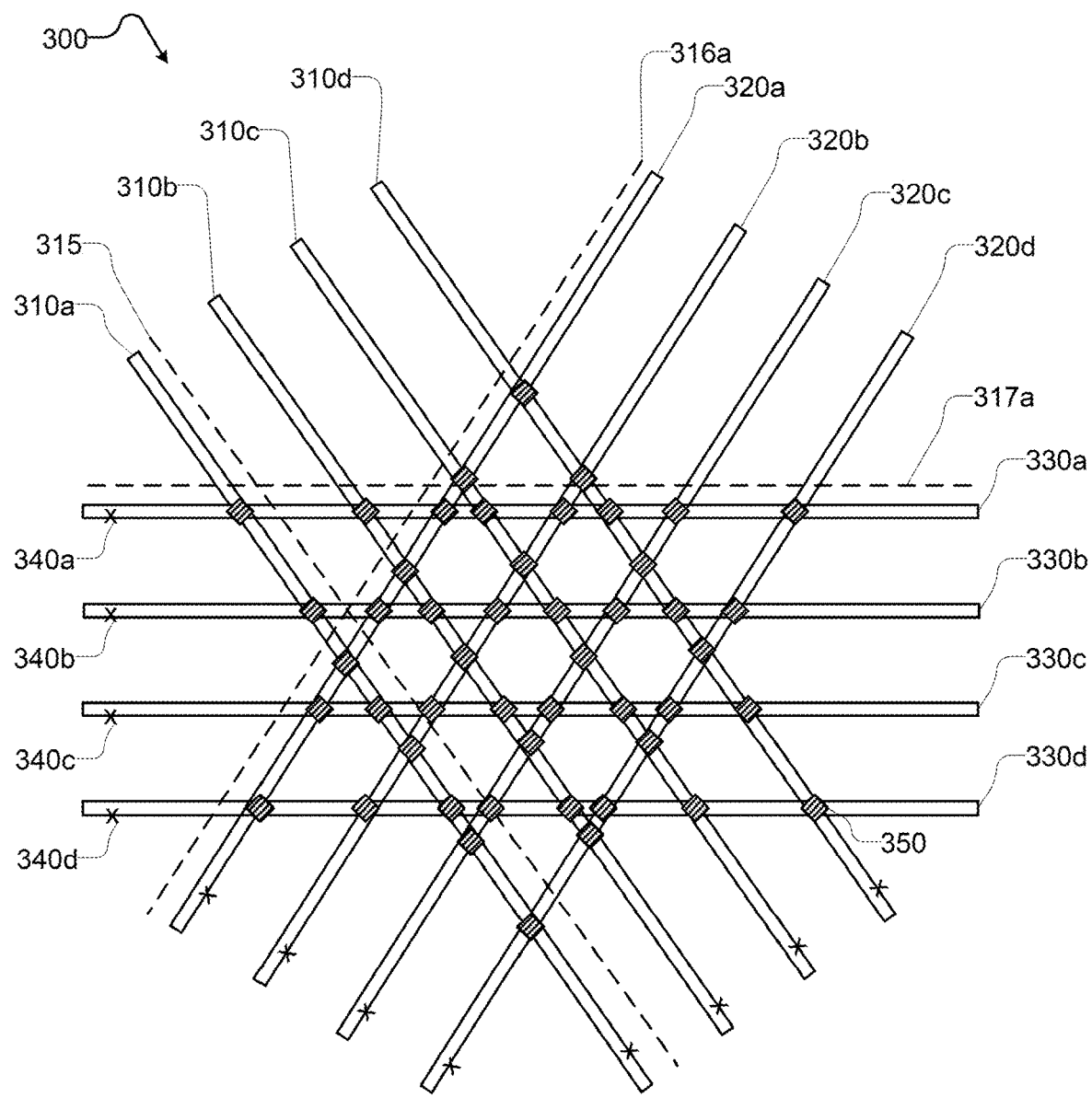
FIG. 3 is a schematic diagram of an exemplary cell in a quantum processor, implementing a tripartite graph with diagonal qubits.

FIG. 3 shows an example cell 300 forming the basis of a quantum processor topology in accordance with the present systems, devices, and methods. Example cell 300 includes a first set of qubits 310a-310d (collectively 310), a second set of qubits 320a-320d (collectively 320), and a third set of qubits 330a-330d (collectively 330) representing a complete tripartite graph, such as example graph 200. While each set is illustrated as having four qubits, such is not limiting. In other implementations, each set of qubits in a cell may have a larger or smaller number of qubits. In some implementations, the number of qubits in one set (e.g., the second set) does not equal the number of qubits in another set (e.g., the third set).

The qubits 310 of the first set each have a respective longitudinal or major axis 315a, (only one called out, collectively 315) along which the superconductive paths or loops of the respective qubits 310 of the first set extend in a lengthwise direction of the qubit. Likewise, the qubits 320 of the second set each have a respective longitudinal or major axis 316a (only one called out, collectively 316) along which the superconductive paths or loops of the qubits 320 of the second set extend in a lengthwise direction of the qubit. The qubits 330 of the third set each have a respective longitudinal or major axis 317a (only one called out, collectively 317) along which the superconductive paths or loops of the qubits 330 of the third set extend in a lengthwise direction of the qubit. In some implementations, each qubit of a given set shares a single major axis 316, rather than (or in addition to) each having an independently-defined major axis.

The qubits 310 of the first set have loops that are substantially parallel with one another, and with the respective longitudinal or major axes 315. The qubits 320 of the second set have loops that are substantially parallel with one another, and with the respective longitudinal or major axes 316. The qubits 330 of the third set have loops that are substantially parallel with one another, and with the respective longitudinal or major axes 317.

The longitudinal or major axis is the axis along which the longest dimension of the loop of a qubit generally extends, whether or not the qubit has one or more bends or changes in directions between ends.

Qubits 310, qubits 320, and qubits 330 each may have respective lateral or minor axes (not shown), respectively. The lateral axis may be perpendicular to the major axis.

While the qubits are illustrated as being substantially rectangular loops, such is not intended to be limiting, and the qubits may have any other form, such as, but not limiting to, oval or discorectangular loops. As used herein and in the claims the term substantially parallel means parallel, essentially parallel, or approximately parallel. For example, a longitudinal or major axis of a respective elongated loop of each of at least two qubits is parallel with one another, without reference to any relatively shorter legs or portions of the elongated loops. Another way to describe the geometric relationship between qubits in a set is that corresponding portions of the loops of the qubits are laterally spaced equally from one another.

The longitudinal or major axes 315 of the qubits 310 are nonparallel (e.g., meeting at approximately 60 degrees) to the longitudinal or major axes 316 of the qubits 320. The longitudinal or major axes 316 of the qubits 320 are nonparallel (e.g., meeting at approximately 60 degrees) to the longitudinal or major axes 317 of the qubits 330. The longitudinal or major axes 317 of the qubits 330 are nonparallel (e.g., meeting at approximately 60 degrees) to the longitudinal or major axes 315 of the qubits 310.

In some implementations, the qubits 310 meet the qubits 320 at a first angle. In some implementations, the qubits 320 meet the qubits 330 at a second angle. In some implementations, the qubits 330 meet the qubits 310 at a third angle. Optionally varied in implementation the first angle, the second angle, and the third angle are equal or unequal.

The qubits 310 may, for instance, be laid out generally left ascending in the plane of the drawing sheet of FIG. 3, and hence are denominated herein as left ascending qubits for ease of discussion. The qubits 320 may, for instance, be laid out generally right ascending in the plane of the drawing sheet of FIG. 3, and hence are denominated as right ascending qubits 320 for ease of discussion. The qubits 330 may, for instance, be laid out generally horizontally in the plane of the drawing sheet of FIG. 3, and hence are denominated as horizontal qubits for ease of discussion.

Example cell 300 represents a single cell in a quantum processor, whereas the corresponding quantum processor topology may comprise a plurality of example cells 300 tiled over an area. A complete processor topology may employ a plurality of example cells 300 where each individual example cell 300 is positioned adjacent (i.e., neighboring) at least one other example cell 300. For example, example cell 300 suggests a six-connected topology. Example cell 300 could be positioned next to six neighbors: left, right, upper left, upper right, lower left, and lower right.

A person of skill in the art will appreciate that while twelve qubits are illustrated in example cell 300, this number is arbitrary and example cell 300 may comprise more or fewer than twelve qubits (but must comprise at least three qubits). As well, the number of qubits in example cell 300 need not be a multiple of three.

Qubits 310, qubits 320, and qubits 330 may be superconducting flux qubits. Each qubit 330a-330d may be a respective loop of superconducting material where at least a first portion of each loop of superconducting material is elongated along a respective major or longitudinal axis. Each qubit 330a-330d is interrupted by at least one respective Josephson junction 340a-340d (only Josephson Junctions 340a-340d of respective qubits 330a-330d are called out in FIG. 3).

Couplers such as couplers 350 (only one called out in drawing) may provide pair-wise communicative coupling between respective pairs of qubits where one qubit of the pair is selected from one of qubits 310, qubits 320, or qubits 330; and the other qubit of the pair selected from a different one of qubits 310, qubits 320, or qubits 330.

Couplers 350 can provide tunable communicative coupling between qubits 310, qubits 320, and/or qubits 330. The couplers are located at regions proximate where the qubits 310 meet qubits 320, qubits 320 meet qubits 330, and/or qubits 330 meet qubits 310. As used herein and in the appended claims, the term "meet", and variants thereof such as meets or meeting, includes cross, overlie, underlie, overlap, come together or are proximate one another (i.e., two elements within an inductive coupling distance of one another, whether both elements reside with one another in a common plane or substrate of a wafer or die, or the elements reside in respective planes or substrates of a wafer or die, the inductive coupling distance being a distance at which inductive coupling occurs between the elements that exceeds a level of background noise, if any, in a circuit to which the elements belong).

Each intersecting pair of qubits may not have a proximate coupler but it is generally regarded as advantageous to have such in an implementation. Each coupler may be a respective loop of superconducting material interrupted by at least one respective Josephson junction. Couplers may be tunable as described in, for example U.S. Pat. Nos. 7,619,437, 7,969,805 and 7,898,282, etc. in that the coupling created between two respective qubits by the coupler may be adjusted during the operation of a quantum processor.

Example cell 300 may be laid out into an integrated circuit. The integrated circuit may be multi-layered. There may be at least two layers of metal in the integrated circuit. At least a first portion of each qubit in qubits 310, qubits 320, and qubits 330 may be laid out in a first metal layer of the integrated circuit. At least a second portion of each qubit in qubits 310, qubits 320, and qubits 330 may be laid out in a first metal layer of the integrated circuit. For example, portions of a horizontal qubit (e.g., a qubit in qubits 330) and a right ascending qubit (e.g. a qubit in qubits 320) may both be laid out in the first metal layer and portions of these qubits may briefly change layers (e.g., switch to the second metal layer) to tunnel under, or bridge over, another qubit. This change of metal layer for tunneling under, or bridging over, another qubit may occur at an approximate position where a first qubit crosses a second qubit.

At least a portion of each coupler 350 may be laid out in the first metal layer and/or the second metal layer and/or a third metal layer. The third metal layer may be interposed between the first metal layer and the second metal layer. For example, coupler 350 may exist in the first, second or third metal layer or in the first and second, second and third or first and third metal layers or the first, second and third metal layers. Interconnection between layers, also referred to herein as vias, may be used within qubits 310, qubits 320, and/or coupler 350 to electrically and/or superconductingly connect any or all of the first, second and third metal layers together.

Figure 4:
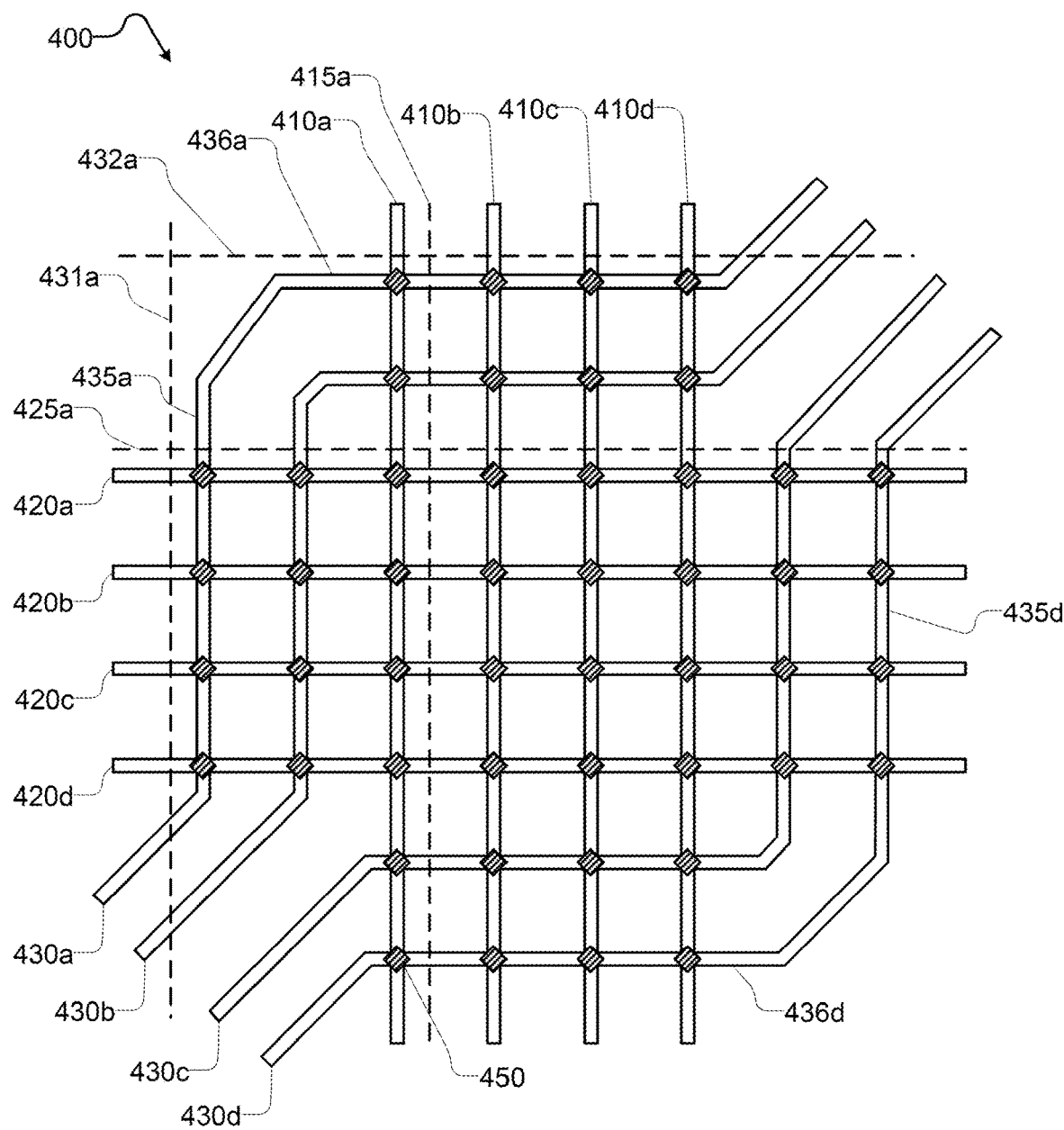
FIG. 4 is a schematic diagram of an exemplary cell in a quantum processor implementing a tripartite graph with rectilinear qubits.

FIG. 4 shows an example cell 400 forming the basis of a quantum processor topology in accordance with the present systems methods and apparatus. Example cell 400 comprises three sets of qubits and couplers between each of the three sets of qubits. Each qubit in one set in example cell 400 crosses all the other qubits in the other two sets substantially orthogonally, thereby allowing additional space in the region where two qubits cross each other for couplers and/or other electronic devices. Example cell 400 includes a first set of qubits 410a-410d (collectively 410), a second set of qubits 420a-420d (collectively 420), and a third set of qubits 430a-430d (collectively 430) representing a complete tripartite graph, such as example graph 200.

While each set is illustrated as having four qubits, such is not limiting. In other implementations, each set of qubits in a cell may have a larger or smaller number of qubits. In some implementations, the number of qubits in one set (e.g., the second set) does not equal the number of qubits in another set (e.g., the third set).

The qubits 410 of the first set each have a respective longitudinal or major axis 415a (only one called out in FIG. 4, collectively 415) along which the superconductive paths or loops of the respective qubits 410 of the first set extend in a lengthwise direction of the qubit. Likewise, the qubits 420 of the second set each have a respective longitudinal or major axis 425a (only one called out in FIG. 4, collectively 425) along which the superconductive paths or loops of the qubits 420 of the second set extend in a lengthwise direction of the qubit.

The qubits 430 of the third set have a first longitudinal axis 431a and a second longitudinal axis 432a (only two called out in FIG. 4, collectively 431 and 432) along which a first segment 435a and a second segment 436a (only two called out in FIG. 4, collectively 435 and 436) of the superconductive paths or loops of the respective qubits 430 of the third set extend in a lengthwise direction of the qubit, respectively. Axes 431 and 432 are substantially orthogonal to each other (i.e., they meet at approximately 90 degrees). Qubits 430 may bend one or more times between axis 431 and 432 and may bend in other areas of example cell 400 along lateral axes.

In some implementations, qubits 430 may bend between the edge of example cell 400 and first segment 435 and/or they may bend between second segment 436 and the edge of example cell 400. In some implementations, qubits 430 may bend at a 45 degree angle between the edge of example cell 400 and first segment 435 and/or they may bend at a 45 degree angle between second segment 436 and the edge of example cell 400.

The qubits 410 of the first set have loops that are substantially parallel with one another, and with the respective longitudinal or major axes 415. The qubits 420 of the second set have loops that are substantially parallel with one another, and with the respective longitudinal or major axes 425. The qubits 430 of the third set have first segment 435 of the superconductive loops that are substantially parallel to each other and with the respective first axis 431. Qubits 430 of the third set have second segment 436 of the superconductive loops that are substantially parallel to one another and to the respective second axis 432.

The longitudinal or major axes 415 of the qubits 410 are substantially orthogonal (i.e., meeting at approximately 90 degrees) to the major or longitudinal axes 425 of the qubits 420. The longitudinal or major axes 415 of the qubits 410 are orthogonal (i.e., meeting at 90 degree angle) to second axes 432 and parallel to first axes 431 of the qubits 430. The longitudinal or major axes 425 of the qubits 420 are orthogonal (i.e., meeting at 90 degree) to first axes 431 and parallel to second axis 432 of the qubits 430.

Qubits 410, qubits 420, and qubits 430 may be superconducting flux qubits. Each qubit 410-430 may be a respective loop of superconducting material where at least a first portion of each loop of superconducting material is elongated along a respective major or longitudinal axis. In one implementation, each qubit 410-430 is interrupted by at least one respective Josephson junction (not shown).

Qubits 410 of the first set and qubits 420 of the second set can have superconducting loops of equal or similar length. Qubits 430 of the third set can have superconductive loops that are substantially longer than the superconducting loops of the qubits 410 and 420 to allow for substantially orthogonal intersection with the first and the second set of qubits 410, 420.

Couplers 450 may provide pair-wise communicative coupling between respective pairs of qubits where one qubit of the pair is selected from one of qubits 410, qubits 420, or qubits 430; and the other qubit of the pair selected from a different one of qubits 410, qubits 420, or qubits 430.

Couplers 450 can provide tunable communicative coupling between qubits 410, qubits 420, and qubits 430. The couplers can be located at regions proximate where the qubits 410 meet qubits 420, qubits 420 meet qubits 430, and qubits 430 meet qubits 410. Each intersecting pair of qubits may not have a proximate coupler but it is generally regarded as advantageous to have such in an implementation. Each coupler may be a respective loop of superconducting material interrupted by at least one respective Josephson junction.

Each qubit 410 from the first set of qubits may be communicatively coupled to all the qubits 420 of the second set of qubits and all the qubits 430 of the second set of qubits. Each qubit 420 of the second set of qubits may be communicatively coupled to all the qubits 410 of the first set of qubits and to all the qubits 430 of the third set of qubits. Each qubit 430 of the third set of qubits may be communicatively coupled to all the qubits 410 of the first set and all the qubits 420 of the second set. Therefore, example cell 400 may represent a complete tripartite graph, such as example graph 200.

Similarly to example cell 300, example cell 400 may be laid out into an integrated multi-layered circuit as discussed above with reference to example cell 300.

Figure 5:
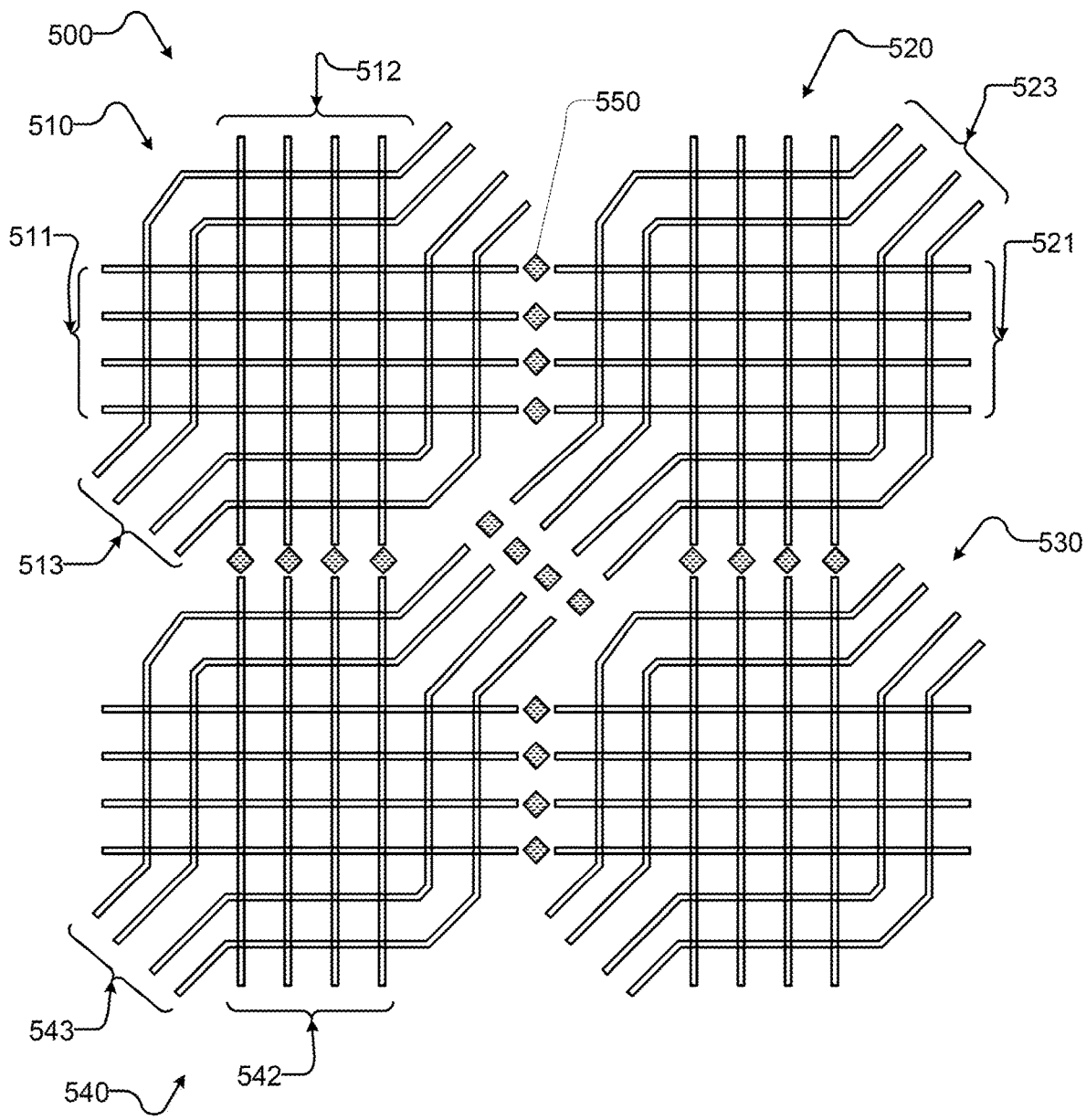
FIG. 5 is a schematic diagram of an exemplary topology of a quantum processor based on the cell of FIG. 4.

FIG. 5 shows a schematic diagram of an example topology 500 of a quantum processor according to the present systems, methods and apparatus. Example topology 500 comprises four cells and couplers between horizontally arranged cells, between vertically arranged cells and between two diagonally arranged cells. Example topology 500 shows four cells 510, 520, 530 and 540.

Each cell 510, 520, 530 and 540 is substantially identical to example cell 400 and may implement a tripartite graph. Each cell (e.g. cell 510) has twelve qubits distributed in three sets, where each qubit crosses qubits from the other sets substantially orthogonally (i.e. meeting at approximately 90 degrees). For example, cell 510 has a first set of qubits 511, a second set of qubits 512 and a third set of qubits 513.

Cells 510 to 540 are connected to each other by inter-cell couplers, such as couplers 550 (only one called out in FIG. 5). The cells in example topology 500 are arranged such that couplers may exist between the first set of a cell and the first set of an adjacent cell, between the second set of a cell and the second set of an adjacent cell and/or between the third set of a cell and the third set of an adjacent cell. For example, each qubit in the first set of qubits 511 in cell 510 is communicatively coupled to at least one qubit in the first set of qubits 521 of cell 520 (e.g., directly via a single coupler) and each qubit in the second set 512 of cell 510 is communicatively coupled to at least one qubit in the second set 542 of the fourth cell 540 (e.g., directly via a single coupler), where cells 510 and 520 are laid out adjacent to one another and generally horizontally in the plane of FIG. 5 and cells 510 and 540 are laid out adjacent to one another and generally vertically in the plane of FIG. 5. Each qubit in the third set of qubits 543 in cell 540 is communicatively coupled to at least one qubit in the third set of qubits 523 in cell 520 (e.g., directly via a single coupler), where cells 540 and 520 are laid out generally diagonally to each other in the plane of FIG. 5.

Cells 510 to 540 are shown with three groups of four qubits each, however such is not limiting and in a different implementation a larger or smaller number of qubits may be present.

Figure 6:
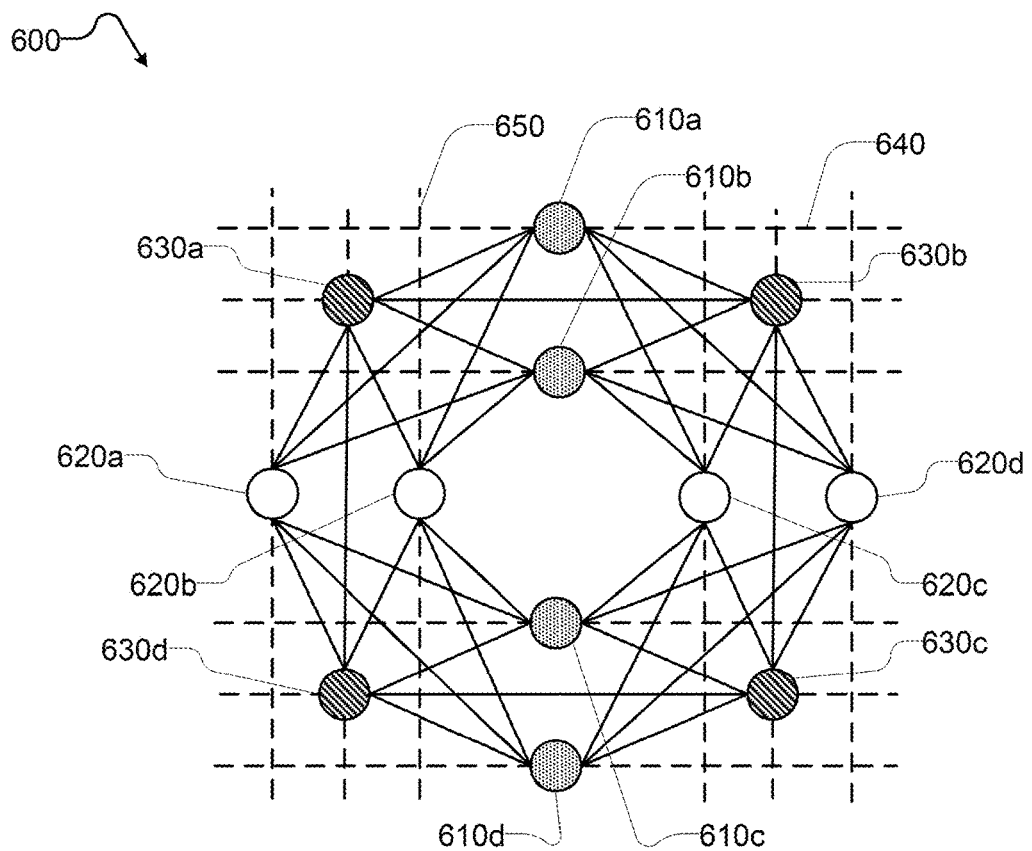
FIG. 6 is an example graph illustrating the connectivity of a cell implementing a non-complete tripartite graph.

FIG. 6 shows an example graph 600 illustrating the connectivity of a cell implementing a non-complete tripartite graph forming the basis of a quantum processor topology based on the present systems, methods and apparatus. Example graph 600 implements a non-complete tripartite graph with twelve nodes. The twelve nodes of example cell 600 are divided into three sets. While example graph 600 is shown with twelve nodes, such is not meant to be limiting and in a different implementation example graph 600 may have a smaller or a larger number of nodes while still representing a non-complete tripartite graph.

Example graph 600 has a first set of nodes 610a to 610d (collectively 610), a second set of nodes 620a to 620d (collectively 620) and a third set of nodes 630a to 630d (collectively 630) representing a tripartite graph. In some implementation the number of nodes in one set (e.g., the second set) does not equal the number of nodes in another sets (e.g., the third set).

Example graph 600 has a set of edges 650 (only one called out in FIG. 6) between nodes in example graph 600 and edges 640 (only one called out in FIG. 6) between a node in example graph 600 and a node in other graphs.

Edges 650 connect each node in the first set of nodes 610 and each node in the second set of nodes 620, each node in the first set of nodes 610 and at least one node in the third set of nodes 630, each node in the second set of nodes 620 and at least one node in the third set of nodes 630 and at least two nodes in the third set of nodes 630 (e.g., there is an edge between node 630a and 630b).

In at least one implementation, each node in the first set of nodes 610 is connected by an edge 650 to two nodes in the third set of nodes 630, each node in the second set of nodes 620 is connected by an edge 650 to two nodes in the third set of nodes 630, and nodes in the third set 630 are pairwise connected by an edge 650.

Edges 640 connect each node in example graph 600 and at least one node in another graph (not shown in FIG. 6). In some implementation, each node in example graph 600 is connected to two nodes that are not within example graph 600 by an edge 640. In some implementations, edges 640 connect each node in example graph 600 and one node in an adjacent graph and another node in a different adjacent graph. For example, node 610a is connected to a node in an adjacent graph laying on the right of example graph 600 in the plane of the page of FIG. 6 by an edge 640 and to another node in an adjacent graph laying on the left of example graph 600 by another one of edges 640.

Therefore example graph 600 has connectivity of eight (i.e., each node in example graph 600 is connected to six nodes in example graph 600 and to two nodes in another graph).

Figure 7:
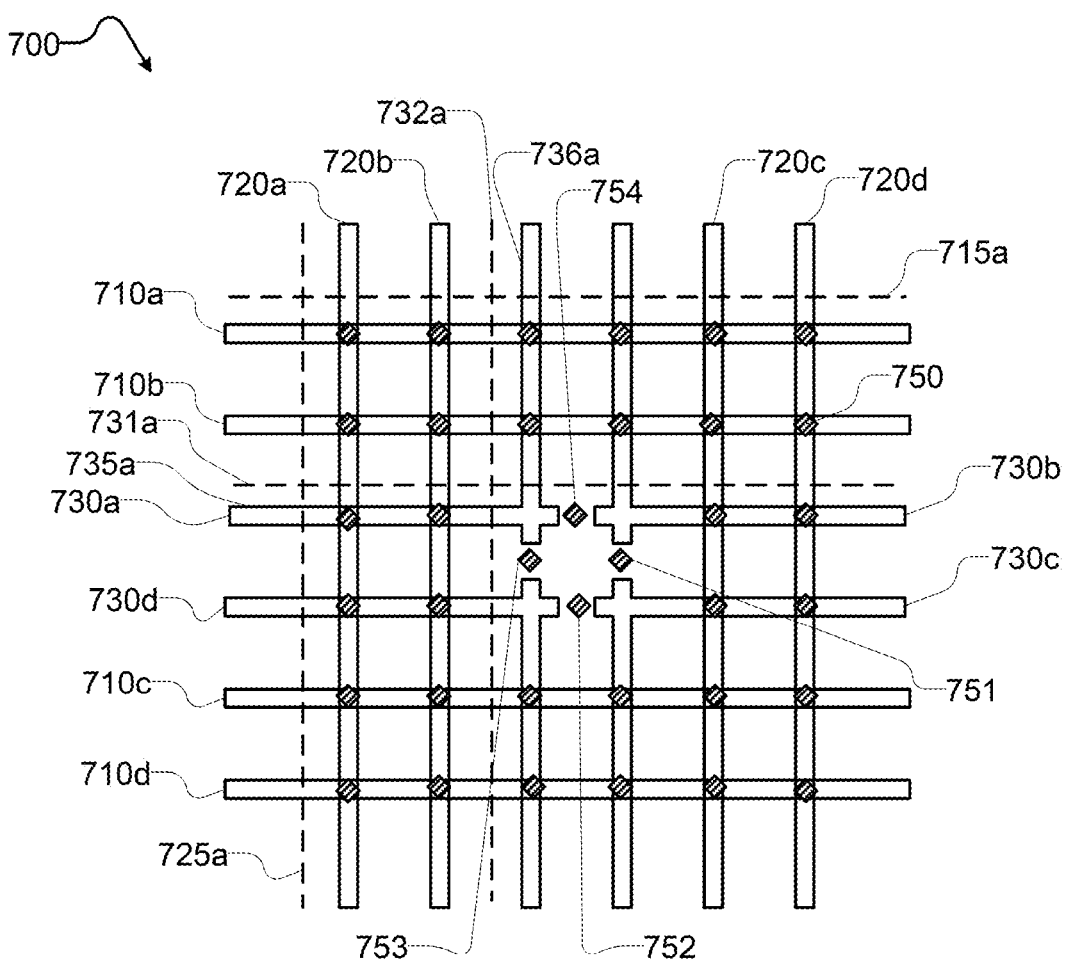
FIG. 7 is a schematic diagram of an exemplary cell in a quantum processor implementing a non-complete tripartite graph.

FIG. 7 shows a schematic diagram of an example cell 700 in a quantum processor according to the present systems, method and apparatus. Example cell 700 has three sets of qubits, where all qubits are substantially equal in length. Qubits in the first, second and third sets cross each other substantially orthogonally. Example cell 700 has a first set of qubits 710a to 710d (collectively 710), a second set of qubits 720a to 720d (collectively 720) and a third set of qubits 730a to 730d (collectively 730) implementing a non-complete tripartite graph according to the connectivity illustrated in FIG. 6.

While each set is illustrated as having four qubits, such is not limiting. In other implementations, each set of qubits in a cell may have a larger or smaller number of qubits. In some implementations, the number of qubits in one set (e.g., the second set) does not equal the number of qubits in another set (e.g., the third set). In one implementation, each qubit 710-730 may be interrupted by at least one respective Josephson junction (not shown).

The qubits 710 of the first set of qubits each have a respective longitudinal or major axis 715a (only one called out, collectively 715) along which the superconductive paths or loops of the respective qubits 710 of the first set extend in a lengthwise direction of the qubit. Likewise, the qubits 720 of the second set of qubits each have a respective longitudinal or major axis 725a (only one called out, collectively 725) along which the superconductive paths or loops of the qubits 720 of the second set extend in a lengthwise direction of the qubit.

The qubits 730 of the third set of qubits have a first axis 731a and a second axis 732a (only two called out, collectively 731 and 732) along which a first segment 735a and a second segment 736a (only two called out, collectively 735 and 736) of the superconductive paths or loops of the respective qubits 730 of the third set extend in a lengthwise direction of the qubit, respectively. Axis 731 and 732 are substantially orthogonal to each other (i.e., they meet at approximately 90 degrees). Each qubit 730 bend at a 90 degree angle between axis 731 and 732.

The qubits 710 of the first set of qubits have loops that are substantially parallel with one another, and with the respective longitudinal or major axis 715. The qubits 720 of the second set of qubits have loops that are substantially parallel with one another, and with the respective longitudinal or major axis 725. The qubits 730 of the third set of qubits have first segments 735 of the superconductive loops that are substantially parallel to each other and to the respective first axis 731. Qubits 730 of the third set of qubits have second segments 736 of the superconductive loops that are substantially parallel to one another and to the respective second axis 732.

The longitudinal or major axis 715 of the qubits 710 are orthogonal (i.e., meeting at 90 degree angle) to the major or longitudinal axis 725 of the qubits 720. The longitudinal or major axis 715 of the qubits 710 are orthogonal (i.e., meeting at 90 degree angle) to second axis 732 and parallel to first axis 731 of the qubits 730. The longitudinal or major axis 725 of the qubits 720 are orthogonal (i.e., meeting at 90 degree angle) to first axis 731 and parallel to second axis 732 of the qubits 730.

The length of a qubit in a cell can be defined as the longest distance measured between two points over the superconducting loop of a qubit, with one point at one of the borders of the cell and the other point at another one of the borders of the cell.

In one implementation, qubits 710 of the first set and qubits 720 of the second set have superconducting loops of equal or similar length. Qubits 730 of the third set have superconducting loops of equal or similar length to qubits 710 and 720.

Couplers 750 may provide pair-wise communicative coupling between respective pairs of qubits where one qubit of the pair is selected from one of qubits 710, qubits 720, or qubits 730; and the other qubit of the pair selected from a different one of qubits 710, qubits 720, or qubits 730

Couplers 750 can provide tunable communicative coupling between qubits 710, qubits 720, and qubits 730. The couplers are located at regions proximate where the qubits 710 meet qubits 720, qubits 720 meet qubits 730, and qubits 730 meet qubits 710. Each intersecting pair of qubits may not have a proximate coupler but it is generally regarded as advantageous to have such in an implementation. Each coupler may be a respective loop of superconducting material interrupted by at least one respective Josephson junction.

Each qubit 710 from the first set of qubits may be communicatively coupled to all the qubits 720 of the second set of qubits and at least one of the qubits 730 of the third set of qubits. Each qubit 720 of the second set of qubits may be communicatively coupled to all the qubits 710 of the first set of qubits and to at least one of the qubits 730 of the third set of qubits.

In some implementations, each qubit 710 in the first set is communicatively coupled to two qubits 730 in the third set (e.g. qubit 710a is communicatively coupled to qubits 730a and 730b) and each qubit 720 in the second set is communicatively coupled to two qubits 730 in the third set (e.g. qubit 720a is coupled to qubits 730a and 730d).

Couplers exist between at least two qubits 730 in the third set of qubits. For example there is a coupler 754 between qubit 730a and 730b.

In alternative implementations, qubits 730 in the third set are pairwise connected. Coupler 754 provides tunable communicative coupling between qubits 730a and 730b, coupler 751 provides tunable communicative coupling between qubits 730b and 730c, coupler 752 provides tunable communicative coupling between qubits 730c and 730d and coupler 753 provides tunable communicative coupling between qubits 730d and 730a.

Similarly to example cell 300 and example cell 400, example cell 700 may be laid out into an integrated multi-layered circuit as discussed above with reference to example cell 300.

Figure 8A:
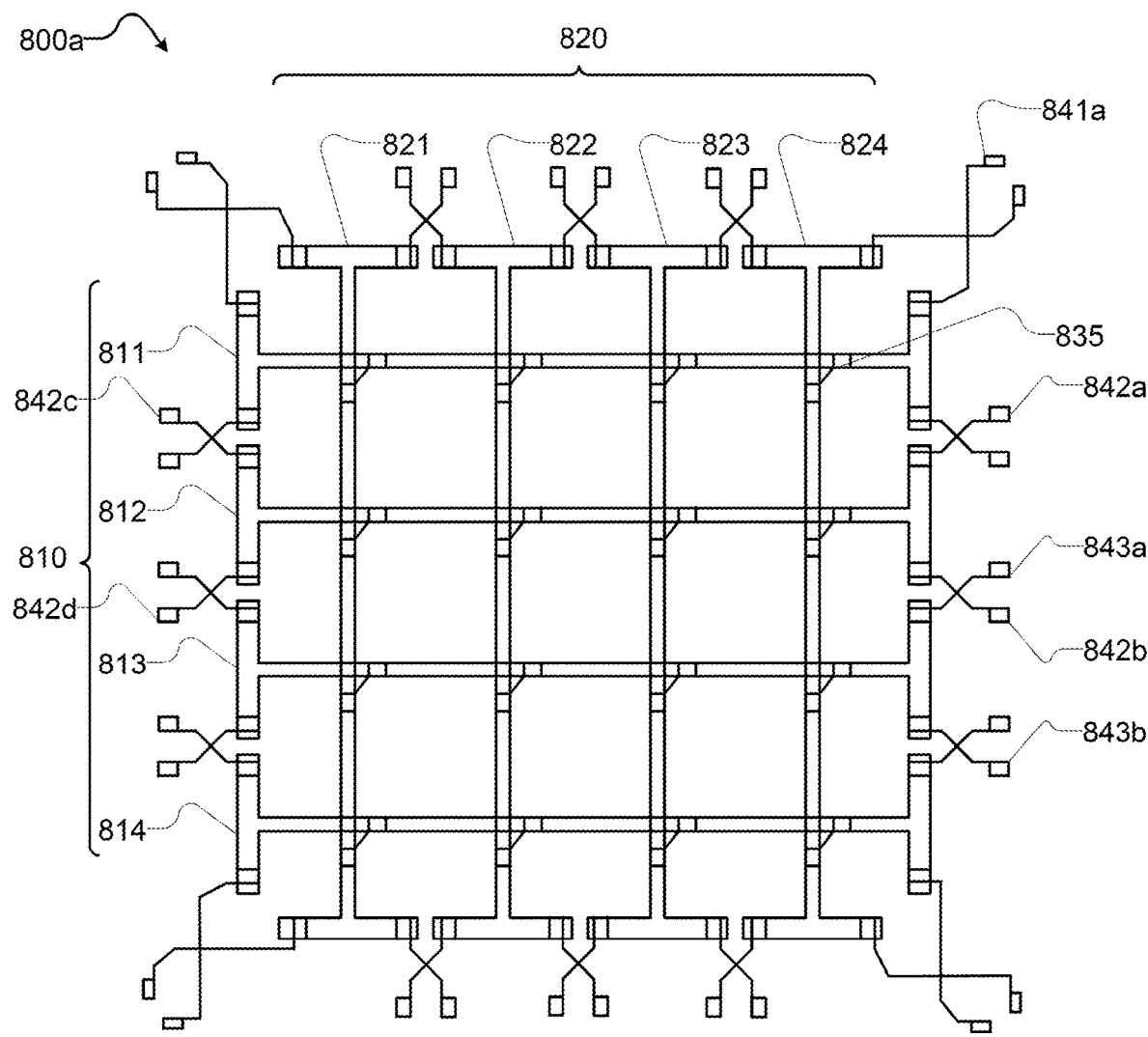
FIG. 8A is a schematic diagram of an exemplary cell in a quantum processor with H-shaped qubits and couplers to external qubits.

FIG. 8A shows a schematic diagram of an example cell 800a in a quantum processor according to the present systems, method and apparatus. Example cell 800a has two sets of qubits, where each qubits is a superconducting loop in an H-shape, or I-shape. Each qubit in example cell 800a can be communicatively coupled to two other qubits on each side. Example cell 800a has a first set of qubits 811 to 814 (collectively 810) and a second set of qubits 821 to 824 (collectively 820).

While each set is illustrated as having four qubits, such is not limiting. In other implementations, each set of qubits in a cell may have a larger or smaller number of qubits. In some implementations, the number of qubits in first set of qubits 810 does not equal the number of qubits in second set of qubits 820. While in FIG. 8A example cell 800a is illustrated as having two sets of qubits, such is not limiting and example cell 800a may have a larger (e.g. three) number of sets of qubits.

Qubits in example cell 800a are shown as having a superconducting loop forming an H-shape or I-shape, however, such is not limiting and qubits may have other form such as, but not limiting to, rectangular or discorectangular loops. In some implementations, each such qubit comprises distal ends connected by a central portion; the distal ends extend orthogonally to the central portion and thereby provide a greater area along a boundary of the cell along which to be coupled to qubits in other cells. In some implementations an H-shape or I-shape loop may represent a segment of a qubit. In one implementation, each qubit 810-820 is interrupted by at least one respective Josephson junction (not shown).

Qubits of first set of qubits 810 in example cell 800a are substantially parallel to one another and may be laid out generally horizontally in the plane of the page of FIG. 8A and may be referred in this specifications and appended claims as horizontal qubits. Qubits of second set of qubits 820 in example cell 800a are substantially parallel to one another and may be laid out generally vertically in the plane of the page of FIG. 8A and may be referred in this specifications and appended claims as vertical qubits. Qubits of the first set of qubits 810 and qubits of the second set of qubits 820 are substantially non-parallel (e.g. meet at 90 degree). While qubits of the first and the second sets of qubits 810 and 820 are illustrated in FIG. 8A as having one longitudinal or major axis (not shown), such is not limiting and in other implementations qubits of the first set 810 and/or qubits of the second set 820 may have two or more longitudinal or major axes.

Couplers such as couplers 835 (only one called out) may provide pair-wise communicative coupling between respective pairs of qubits where one qubit of the pair is selected from one of the first set of qubits 810 or one of the second sets of qubits 820, and the other qubit of the pair selected from a different one of first set of qubits 810 or second set of qubits 820.

Couplers 835 can provide tunable communicative coupling between qubits of the first set 810 and qubits of the second set 820. The couplers may be located at regions proximate where the qubits of the first set 810 meet qubits of the second set 820. In some implementations, couplers may be located at some distance from the regions where the qubits of the first set 810 meet qubits of the second set 820.

Each qubit in cell 800a presents at least 2 inter-cell couplers, such as couplers 842a and 842b (only six called out in FIG. 8A, collectively 840) connecting a qubit in example cell 800a with at least two qubits in neighboring cells. In some implementations, each end of a qubit has at least two couplers. For example, as shown in FIG. 8A, a qubit (such as qubit 821) may comprise distal ends which are each coupled to two couplers 840, resulting in four couplers 840 being coupled to the qubit.

In some implementations, horizontal qubits in a cell are communicatively coupled to horizontal qubits in a neighboring cell by couplers 840. Likewise, inter-cell couplers 840 can provide tunable communicative coupling between pairs of vertical qubits in adjacent cells. As shown in FIG. 8A, a qubit 812 has inter-cell couplers 842a, 842b, 842c and 842d. Qubit 812 is depicted as the second horizontal qubit, from the upper edge of example cell 800a. This numbering is arbitrary and for illustration purposes only and not limiting the scope of the present specification and appended claims. Similarly, qubit 813 may be referred to the third horizontal qubit.

Each inter-cell coupler 840 can provide tunable communicative coupling between a horizontal or a vertical qubit in example cell 800a and horizontal or vertical qubits in a different position in a neighboring cell, respectively. For example, inter-cell coupler 842a provides tunable communicative coupling between second horizontal qubit 812 and the first horizontal qubit in a neighboring cell, and inter-cell coupler 842b provides tunable communicative coupling between second horizontal qubit 812 and the third horizontal qubit in a neighboring cell. Likewise, inter-cell coupler 842c provides tunable communicative coupling between second horizontal qubit 812 and the first horizontal qubit in a neighboring cell and inter-cell coupler 842d provides tunable communicative coupling between second horizontal qubit 812 and the third horizontal qubit in a neighboring cell.

As illustrated in FIG. 8A, pairs of inter-cell couplers 840 of parallel and adjacent qubits may cross each other to provide coupling between qubits in a different order in adjacent cells, as described in the previous paragraph. For example, inter-cell coupler 842b of qubit 812 may cross inter-cell coupler 843a of qubit 813.

As used herein and in the appended claims the term cross, and variants thereof such as crosses or crossing, includes overlie, underlie, and overlap (e.g., where each resides in a respective plane or substrate of a wafer or die, and a normal projection (i.e., normal to the plane or substrate) of at least a portion of a first element in a first plane or first substrate intersects at least a portion a second element in a second plane or second substrate).

Figure 8B:
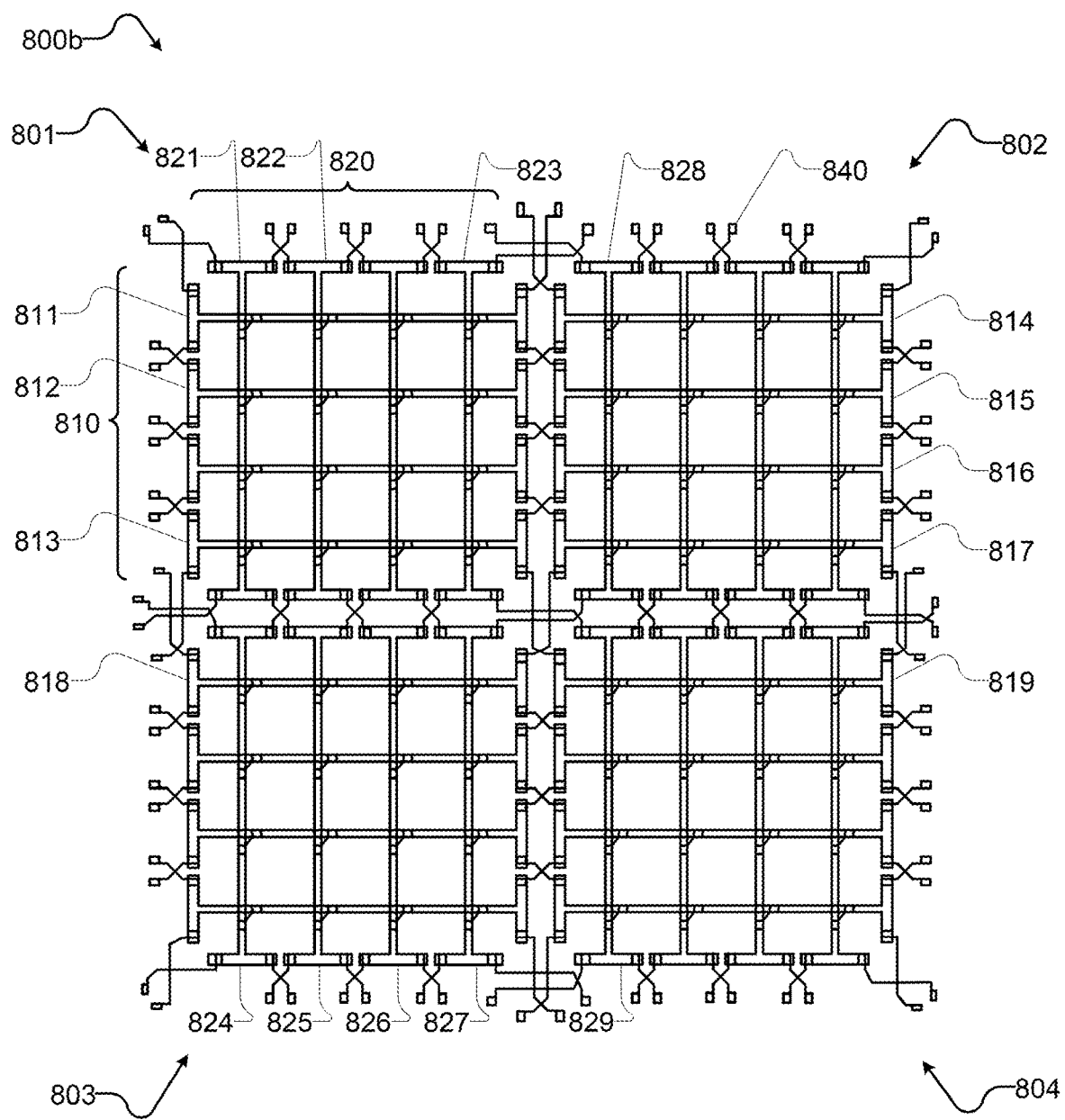
FIG. 8B is a schematic diagram of an exemplary topology of a quantum processor.
Figure 8C:
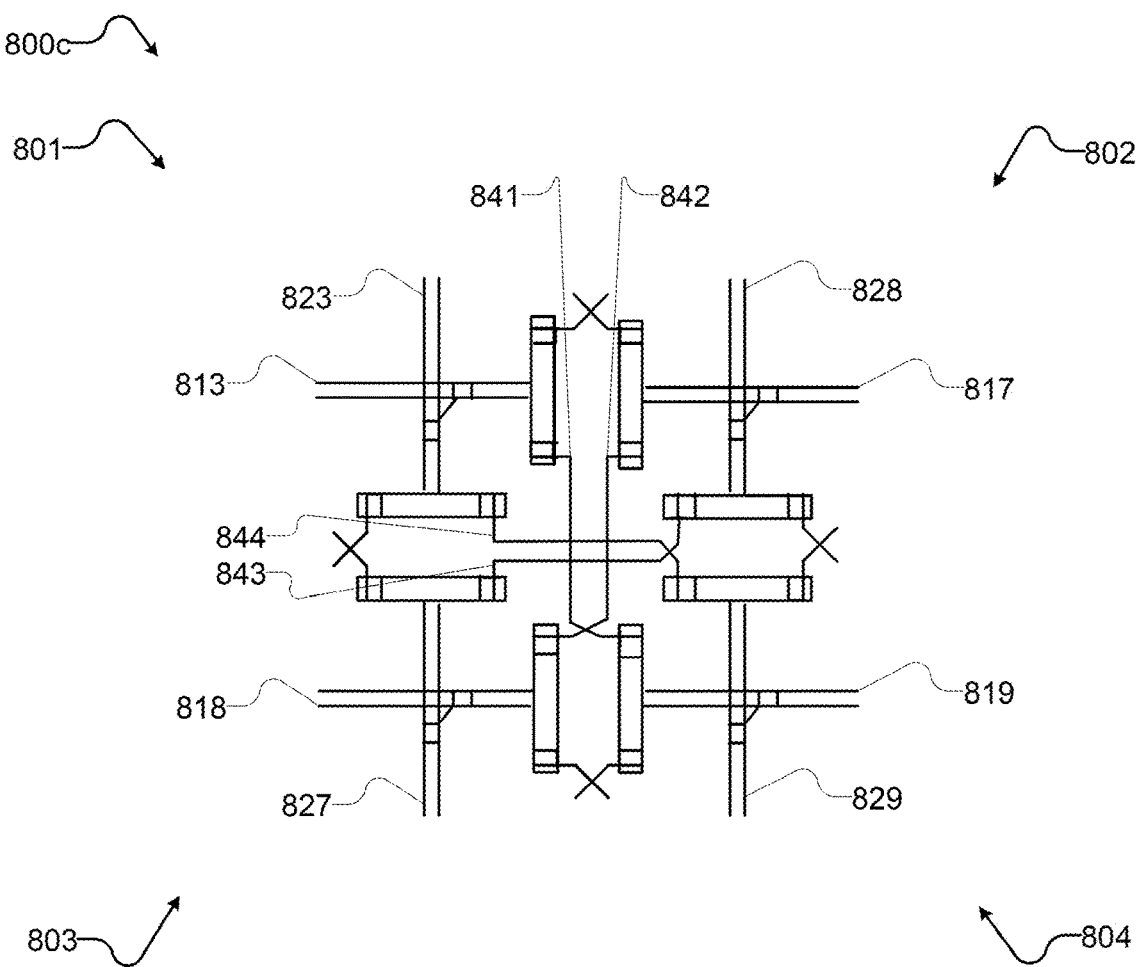
FIG. 8C is a schematic diagram of the topology of FIG. 8B showing the connectivity between four cells.

Similarly, qubits that are at the four corners of example cell 800a (i.e., qubits 821, 824, 811 and 814) have inter-cell couplers that cross each other and can provide tunable communicative coupling to diagonally adjacent cells, as shown in more details in FIG. 8B and FIG. 8C. In some implementations, where qubits 810 and 820 have two or more major or longitudinal axes, example cell 800a may have more than four corners.

FIG. 8B shows a schematic diagram of a portion of an example topology 800b of a quantum processor according to the present systems, methods and apparatus. Example topology 800b has four cells with communicative coupling between diagonally adjacent cells. Example topology 800b shows four cells 801, 802, 803 and 804, where each cell is an implementation of example cell 800a of FIG. 8.

As mentioned above, inter-cell couplers 840 (only one called out in FIG. 8B) connect pairs of vertical and pairs of horizontal qubits in adjacent cells. With reference to FIG. 8B, a second horizontal qubit 812 of cell 801 is communicatively coupled to first horizontal qubit 814 and third horizontal qubit 816 of cell 802. Similarly second vertical qubit 822 of cell 801 is communicatively coupled to first vertical qubit 824 and to third vertical qubit 826 of cell 803.

FIG. 8C is a schematic diagram illustrating a portion 800c of the inter-cell connectivity of example topology 800b. FIG. 8C shows portion 800c of cells 801, 802, 803 and 804 where pairs of cells laid out diagonally adjacent in the plane of the page of FIG. 8C are communicatively coupled.

Inter-cell coupler 841 can provide tunable communicative coupling between fourth horizontal qubit 813 of cell 801 and first horizontal qubit 819 of diagonally laid out unit tile 804. Inter-cell coupler 842 can provide tunable communicative coupling between first horizontal qubit 818 of cell 803 and fourth horizontal qubit 817 of diagonally laid out unit tile 802. Inter-cell coupler 843 can provide tunable communicative coupling between fourth vertical qubit 827 of cell 803 and first vertical qubit 828 of diagonally laid out unit tile 802. Inter-cell coupler 844 can provide tunable communicative coupling between fourth vertical qubit 823 of cell 801 and first vertical qubit 829 of diagonally laid out unit tile 804.

Inter-cell couplers that can provide tunable communicative coupling between pairs of diagonally adjacent cells cross each other. In some implementations, inter-cell couplers may cross three other inter-cell couplers.

Figure 9A:
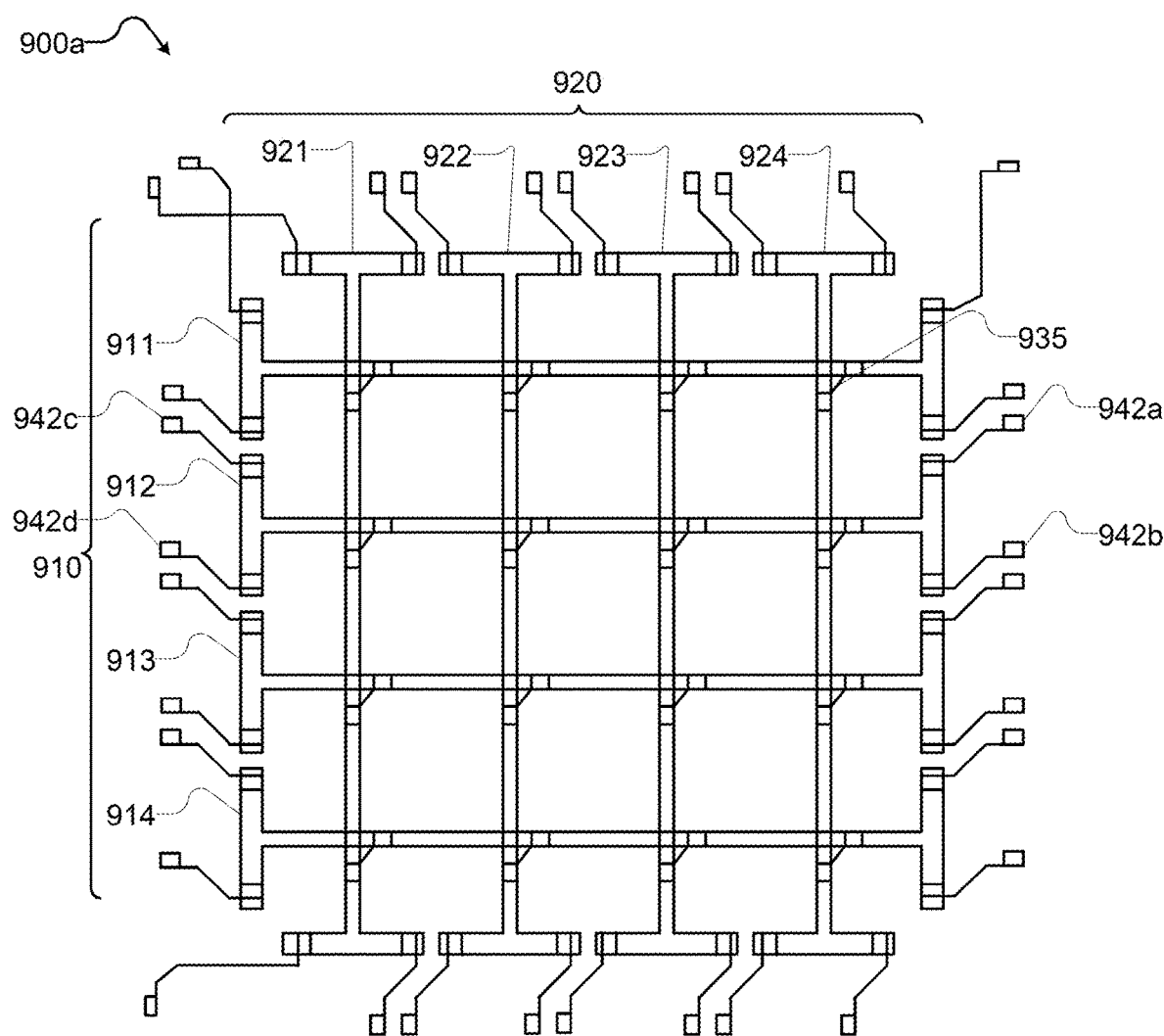
FIG. 9A is a schematic diagram of an exemplary cell in a quantum processor with H-shaped qubits and couplers to external qubits.

FIG. 9A is a schematic diagram of an example cell 900a in a quantum processor according to the present systems, method and apparatus. Each qubit in example cell 800a can be communicatively coupled to two other qubits on each side. Example cell 900a has two sets of qubits where each qubits is a superconducting loop in an H-shape or I-shape. Each qubit in example cell 900a can be communicatively coupled to two other qubits on each side and the couplers do not cross each other. Example cell 900a has a first set of qubits 911 to 914 (collectively 910) and a second set of qubits 921 to 924 (collectively 920).

While each set of qubits is illustrated as having four qubits, such is not limiting. In other implementations, each set of qubits in a cell may have a larger or smaller number of qubits. In some implementations, the number of qubits in first set 910 does not equal the number of qubits in second set 920.

Qubits in cell 900a are shown as having a superconducting loop forming an H-shape or I-shape, however, such is not limiting and qubits may have other form such as, but not limiting to, rectangular or discorectangular loops. In some implementations an H-shape or I-shape loop may represent a segment of a qubit. Each qubit 910-920 may be interrupted by at least one respective Josephson junction (not shown).

Qubits of first set of qubits 910 in example cell 900a are substantially parallel to one another and may be laid out generally horizontally in the plane of the page of FIG. 9A and may be referred in this specifications and appended claims as horizontal qubits. Qubits of second set of qubits 920 in example cell 900a are substantially parallel to one another and may be laid out generally vertically in the plane of the page of FIG. 9A and may be referred in this specifications and appended claims as vertical qubits. Qubits in the first set of qubits 910 are substantially non-parallel (e.g., meet at 90 degree) to qubits in the second set of qubits 920. While qubits in the first set 910 and qubits in the second set 920 are illustrated in FIG. 9A as having one longitudinal or major axis (not shown), such is not limiting and in other implementations qubits from the first set 910 and/or the second set 920 may have two or more longitudinal or major axes.

While example cell 900a is illustrated as having two sets of qubits, such is not limiting. In other implementations example cell 900a may have a larger number of sets (e.g., three sets) of qubits.

Couplers such as couplers 935 (only one called out) may provide pair-wise communicative coupling between respective pairs of qubits where one qubit of the pair is selected from one of the first set of qubits 910 or the second set of qubits 920, and the other qubit of the pair selected from a different one of first set of qubits 910 or the second set of qubits 920.

Couplers 935 can provide tunable communicative coupling between qubits of the first set of qubits 910 and the second set of qubits 920. The couplers are located at regions proximate where the qubits of the first set 910 meet qubits of the second set 920. In some implementations couplers may be located at some distance from the regions where the qubits of the first set 810 meet qubits of the second set 820.

Each qubit in unit tile 900a presents at least 2 inter-cell couplers, such as couplers 942a and 942b (only four called out in FIG. 9A, collectively 940) connecting a qubit in example cell 900a with at least two qubits in neighboring cells.

In some implementations horizontal qubits in a cell are communicatively coupled to horizontal qubits in a neighboring cell via inter-cell couplers 940. Likewise, inter-cell couplers 940 can provide tunable communicative coupling between pairs of vertical qubits in adjacent cells. As shown in FIG. 9A, a qubit 912 has inter-cell couplers 942a, 942b, 942c and 942d. Qubit 912 is depicted as the second horizontal qubit, from the upper edge of example cell 900a. This numbering is arbitrary and for illustration purposes only and not limiting the scope of the present specification and appended claims.

Each inter-cell coupler 940 provides tunable communicative coupling between a horizontal or vertical qubit in example cell 900a and a first horizontal or vertical qubit in a different position in a neighboring cell and a second horizontal or vertical qubit in the same position in a neighboring cell.

For example, inter-cell coupler 942a provides tunable communicative coupling between second horizontal qubit 912 and a first horizontal qubit in a neighboring cell, and inter-cell coupler 942b provides tunable communicative coupling between second horizontal qubit 912 and a second horizontal qubit in a neighboring cell. Likewise inter-cell coupler 942c provides tunable communicative coupling between second horizontal qubit 912 and a first horizontal qubit in a neighboring cell and inter-cell coupler 942d provides tunable communicative coupling between second horizontal qubit 812 and a second horizontal qubit in a neighboring cell.

Figure 9B:
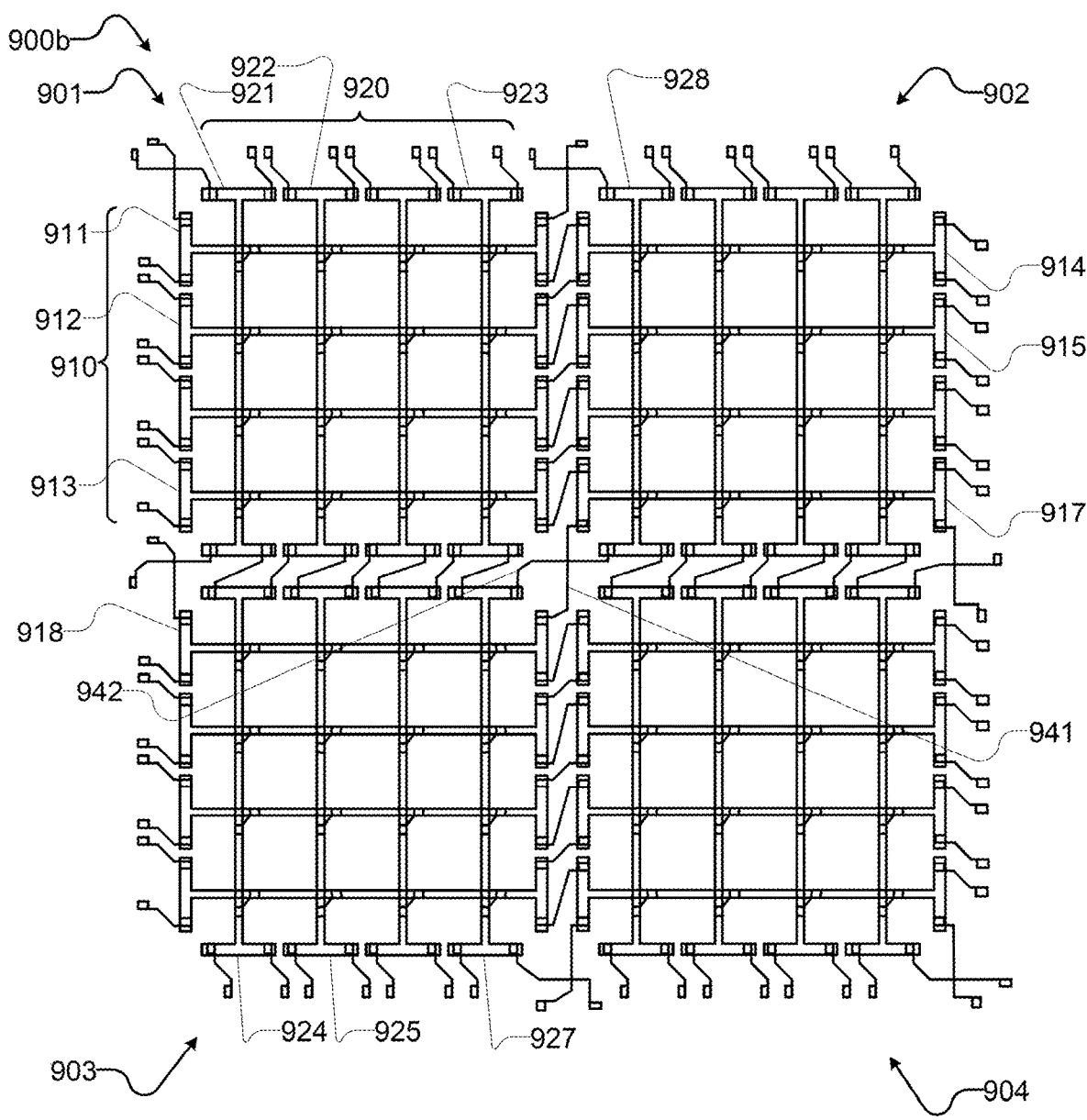
FIG. 9B is a schematic diagram of an exemplary topology of a quantum processor.

Inter-cell couplers 940 do not cross each other when providing communicative coupling between pairs of horizontal and pairs of vertical qubits in adjacent cells, with the exception of inter-cell couplers between diagonally adjacent cells, as shown in more details in FIG. 9B. In some implementations, inter-cell couplers 940 may cross each other when providing communicative coupling between pairs of horizontal and pairs of vertical qubits in adjacent cells.

FIG. 9B shows a schematic diagram of a portion an exemplary topology 900b of a quantum processor according to the present systems, methods and apparatus. Example topology 900a has four cells and communicative coupling between two diagonally adjacent cells. Example topology 900b shows four cells 901, 902, 903 and 904, where each cell is an implementation of example cell 900a of FIG. 9A.

As mentioned above, inter-cell couplers 940 connect pairs of vertical and pairs of horizontal qubits in adjacent cells. With reference to FIG. 9B, a second horizontal qubit 912 of cell 901 is communicatively coupled to first horizontal qubit 914 and second horizontal qubit 915 of cell 902. Similarly second vertical qubit 922 of cell 901 is communicatively coupled to first vertical qubit 924 and to second vertical qubit 925 of cell 903.

Inter-cell couplers also can provide tunable communicative coupling between diagonally adjacent cells. As shown in FIG. 9B, inter-cell coupler 941 provides tunable communicative coupling between first horizontal qubit 918 of cell 903 and fourth horizontal qubit 917 of diagonally adjacent cell 902 and inter-cell coupler 942 provides tunable communicative coupling between fourth vertical qubit 927 of cell 903 and first vertical qubit 928 of diagonally adjacent cell 902.

In some implementations inter-cell couplers 941 and 942 cross each other in the space between cells 902 and 903. In some implementations inter-cell couplers 941 and 942 cross may each other over or under or within the surface one of the cells 901, 902, 903 or 904.

Figure 10:
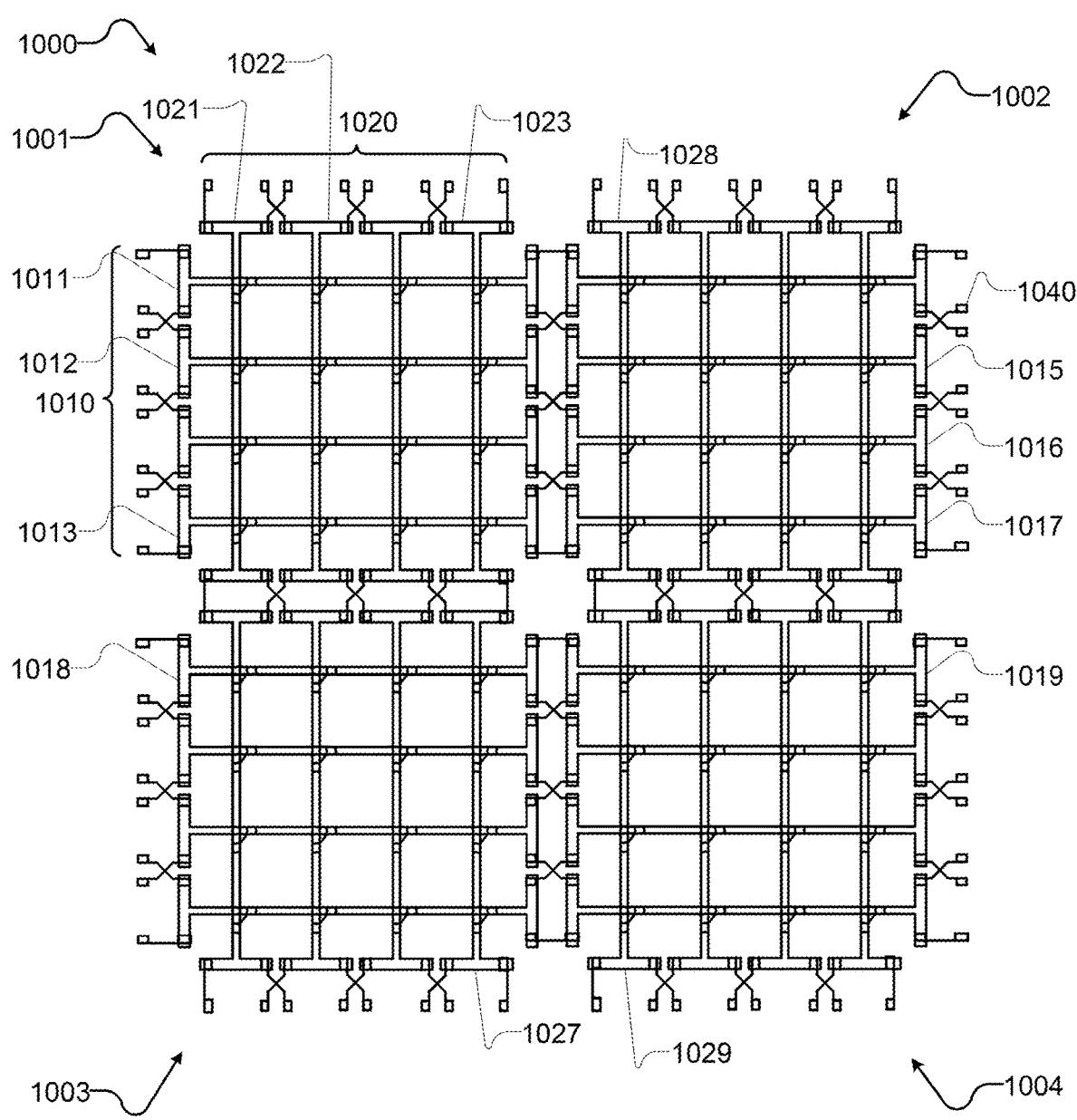
FIG. 10 is a schematic diagram of an exemplary topology of a quantum processor.

FIG. 10 shows a schematic diagram of a portion of an example topology 1000 of a quantum processor according to the present systems, methods and apparatus. Example topology has four cells and no communicative coupling between diagonally adjacent cells. The additional space between diagonally adjacent cells may be occupied by other electronic components. Example topology 1000 has four cells 1001, 1002, 1003 and 1004.

Cells 1001 to 1004 have a set of horizontal qubits 1010 (only one called out in FIG. 10) and a set of vertical qubits 1020 (only one called out in FIG. 10). While qubits of the set of horizontal qubits 1010 and of the set of vertical qubits 1020 are illustrated in FIG. 10 as having one longitudinal or major axis (not shown), such is not limiting and in other implementations qubits of the set of horizontal qubits 1010 and/or of the set of vertical qubits 1020 may have two or more longitudinal or major axes. While each set is illustrated as having four qubits, such is not limiting. In other implementations, each set of qubits in a cell may have a larger or smaller number of qubits. In some implementations, the number of qubits in first or horizontal set 1010 does not equal the number of qubits in second or vertical set 1020. While in FIG. 10 each cell in example topology 1000 is illustrated as having two sets of qubits, such is not limiting and each cell in example topology 1000 may have a larger (e.g. three sets) number of sets of qubits.

Qubits in example topology 1000 are shown as having a superconducting loop forming an H-shape or I-shape, however, such is not limiting and qubits may have other form such as, but not limiting to, rectangular or discorectangular loops. In some implementations an H-shape or I-shape loop may represent a segment of a qubit. Each qubit of the set of horizontal qubits 1010 and/or of the set of vertical qubits 1020 may be interrupted by at least one respective Josephson junction (not shown).

Similarly to example topology 800b, in example topology 1000 inter-cell couplers 1040 (only one called out in FIG. 10) connect pairs of vertical and pairs of horizontal qubits in adjacent cells. Unlike example topology 800b, diagonally adjacent cells are not communicatively coupled with inter-cell couplers.

As shown in FIG. 10, cell 1001 and cell 1004 are laid out diagonally adjacent to each other in the plane of the page of FIG. 10. Similarly cells 1002 and 1003 are laid out diagonally adjacent to each other. This arrangement is shown in FIG. 10 for illustration purposes and it is not limiting.

Unlike example topology 800b, in example topology 1000 fourth horizontal qubit 1013 of cell 1001 is communicatively coupled to fourth horizontal qubit 1017 of adjacent cell 1002 and fourth vertical qubit 1023 is communicatively coupled to fourth vertical qubit 1027 of adjacent cell 1003. First horizontal qubit 1018 of cell 1003 is communicatively coupled to first horizontal qubit 1019 of adjacent cell 1004 and first vertical qubit 1028 of cell 1002 is communicatively coupled to first vertical qubit 1029 of adjacent cell 1004.

Figure 11:
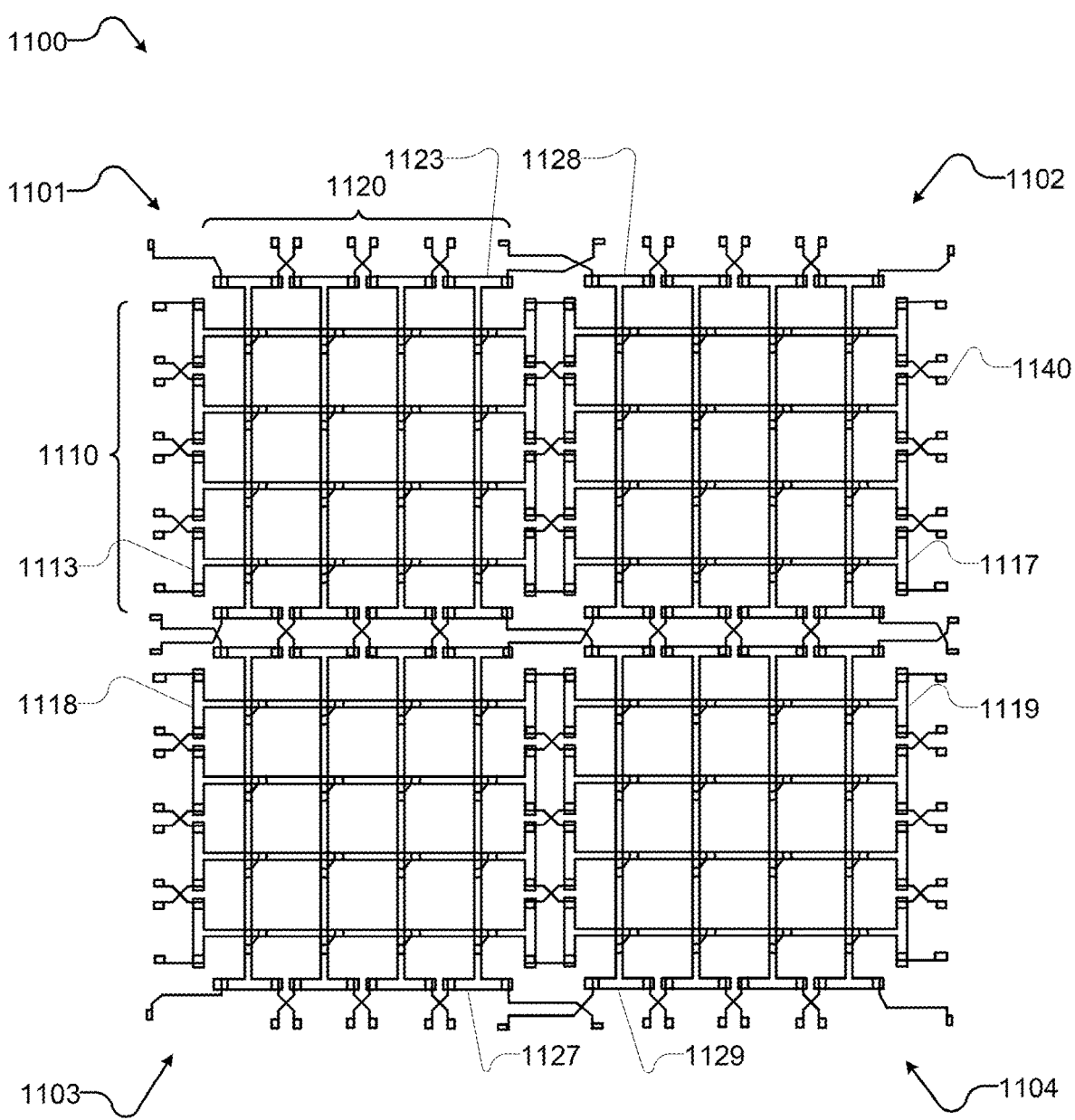
FIG. 11 is a schematic diagram of an exemplary topology of a quantum processor.

FIG. 11 is a schematic diagram of a portion of an example topology 1100 of a quantum processor according to the present systems, methods and apparatus. Example topology 1100 has four cells and communicative coupling between two diagonally adjacent cells. Example topology 1100 has four cells 1101, 1102, 1103 and 1104.

Cells 1101 to 1104 have a set of horizontal qubits 1110 (only one called out in FIG. 11) and a set of vertical qubits 1120 (only one called out in FIG. 11). While qubits of the set of horizontal qubits 1110 and of the set of vertical qubits 1120 are illustrated in FIG. 11 as having one longitudinal or major axis (not shown), such is not limiting and in other implementations qubits of the set of horizontal qubits 1110 and/or of the set of vertical qubits 1120 may have two or more longitudinal or major axes. While each set is illustrated as having four qubits, such is not limiting. In other implementations, each set of qubits in a cell may have a larger or smaller number of qubits. In some implementations, the number of qubits in first or horizontal set 1110 does not equal the number of qubits in second or vertical set 1120. While in FIG. 11 each cell in example topology 1100 is illustrated as having two sets of qubits, such is not limiting and each cell in example topology 1100 may have a larger (e.g. three sets) number of sets of qubits.

Qubits in example topology 1100 are shown as having a superconducting loop forming an H-shape or I-shape; however, such is not limiting and qubits may have other form such as, but not limiting to, rectangular or discorectangular loops. In some implementations an H-shape or I-shape loop may represent a segment of a qubit. Each qubit 1110-1120 may be interrupted by at least one respective Josephson junction (not shown).

Similarly to example topology 800b, in example topology 1100 inter-cell couplers 1140 (only one called out in FIG. 11) connect pairs of vertical and pairs of horizontal qubits in adjacent cells. Unlike example topology 1000, diagonally adjacent cells are communicatively coupled to each other but, unlike topology 800b, only two diagonally adjacent cells are communicatively coupled. In topology 1100 couplers may cross when providing communicative coupling between diagonally adjacent cells.

Referring to FIG. 11, fourth horizontal qubit 1113 of cell 1101 is communicatively coupled to fourth horizontal qubit 1117 of adjacent cell 1102 and first horizontal qubit 1118 of cell 1103 is communicatively coupled to first horizontal qubit 1119 of adjacent cell 1104. Fourth vertical qubit 1123 of cell 1101 is communicatively coupled to first vertical qubit 1129 of diagonally adjacent cell 1104 and fourth vertical qubit 1127 of cell 1103 is communicatively coupled to first vertical qubit 1128 of diagonally adjacent cell 1102.

With respect to the plane of the page of FIG. 11, connectivity between horizontally adjacent cells in example topology 1100 is similar to the connectivity between horizontally adjacent cells in example topology 1000. Connectivity between vertically adjacent cells in example topology 1100 is similar to the connectivity between vertically adjacent cells in example topology 800b.

A person skilled in the art will understand the opposite is also possible and example topology 1100 can be implemented with connectivity similar to example topology 1000 between vertically adjacent cells and connectivity similar to example topology 800b between horizontally adjacent cells. In some implementations where qubits 1110 and 1120 have two or more major or longitudinal axes, inter-cell couplers 1140 can provide tunable communicative coupling between substantially parallel qubits in adjacent cells.

Figure 12:
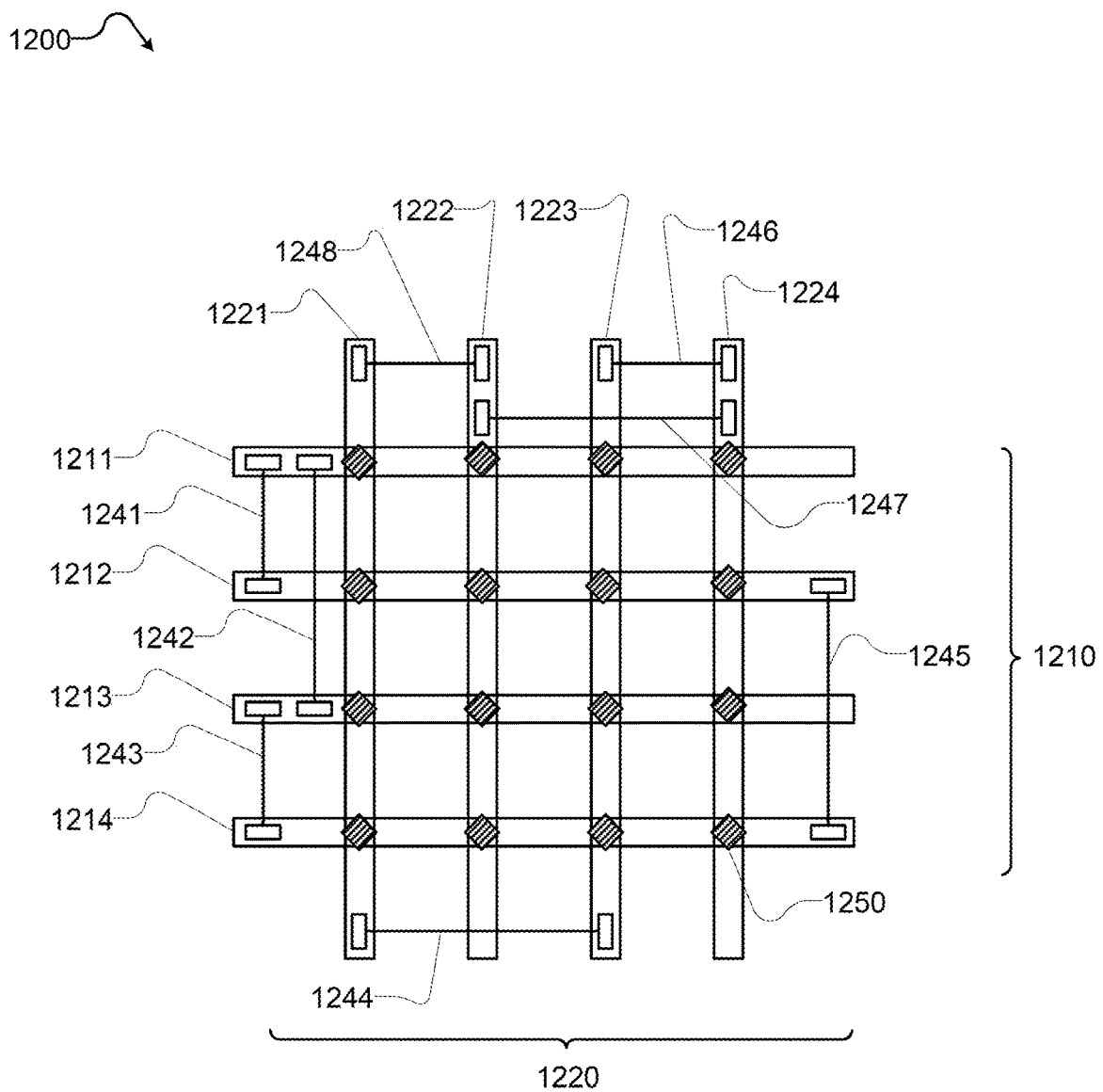
FIG. 12 is a schematic diagram of an exemplary cell in a quantum processor.

FIG. 12 is a schematic diagram illustrating an example cell 1200 in a quantum processor according to the present systems, method and apparatus. Example cell 1200 has two sets of qubits and couplers between qubits of the same set. Couplers may provide communicative coupling between qubits that are substantially parallel. Example cell 1200 has a first set of qubits 1211 to 1214 (collectively 1210) and a second set of qubits 1221 to 1224 (collectively 1220). While in FIG. 12 example cell 1200 is illustrated as having two sets of qubits, such is not limiting and example cell 1200 may have a larger number of sets of qubits (e.g. three sets).

While each set is illustrated as having four qubits, such is not limiting. In other implementations, each set of qubits in a cell may have a larger or smaller number of qubits. In some implementations, the number of qubits in first set 1210 does not equal the number of qubits in second set 1220.

Qubits in example cell 1200 are shown as having a superconducting loop in a rectangular shape, however, such is not limiting and qubits may have other form such as, but not limiting to, discorectangular or oval loops. In some implementations a rectangular loop may represent a segment of a qubit. In one implementation, each qubit 1210-1220 is interrupted by at least one respective Josephson junction (not shown in FIG. 12).

Qubits in first set of qubits 1210 in example cell 1200 are substantially parallel to one another and may be laid out generally horizontally in the plane of the page of FIG. 12 and may be referred in this specification and appended claims as horizontal qubits. Qubits in second set of qubits 1220 in example cell 1200 are substantially parallel to one another and may be laid out generally vertically in the plane of the page of FIG. 12 and may be referred in this specification and appended claims as vertical qubits. Qubits of the set of horizontal qubits 1210 and qubits of the set of vertical qubits 1220 are substantially non-parallel (e.g. meet at 90 degree). While qubits of the set of horizontal qubits 1210 and of the set of vertical qubits 1220 are illustrated in FIG. 12 as having one longitudinal or major axis (not shown), such is not limiting and in other implementations qubits of the set of horizontal qubits 1210 and/or of the set of vertical qubits 1220 may have two or more longitudinal or major axes.

Couplers such as couplers 1250 (only one called out in FIG. 12) may provide pair-wise communicative coupling between respective pairs of qubits where one qubit of the pair is selected from one of qubits of the set of horizontal qubits 1210 or one of the qubits of the set of vertical qubits 1220, and the other qubit of the pair selected from a different one of qubits of the set of horizontal qubits 1210 or qubits of the set of vertical qubits 1220.

Couplers 1250 may provide tunable communicative coupling between qubits 1210 and qubits 1220. The couplers may be located at regions proximate where qubits 1210 meet qubits 1220. In some implementations couplers 1250 are located at some distance from the region where qubits 1210 meet qubits 1220.

Example cell 1200 has eight couplers 1241 to 1248 (collectively 1240) providing tunable communicative coupling between pairs of horizontal qubits and between pairs of vertical qubits. Some couplers 1240 can communicatively couple non-adjacent qubits (e.g., qubits 1222 and 1224). Other couplers 1240 can communicatively couple adjacent qubits (e.g., qubits 1223 and 1224). In some implementations where qubits 1210 and 1220 have two or more longitudinal or major axes couplers 1240 communicatively couple pairs of substantially parallel qubits.

When communicatively coupling non-adjacent qubits, couplers 1240 may cross over or under other qubits and/or couplers and/or other electronic components in example cell 1200 and are substantially electrically isolated from them. For example, when coupler 1247 communicatively couples non-adjacent qubits 1222 and 1224, coupler 1247 does not communicatively couple to qubit 1223 or any other qubits, nor does it interfere with the normal operation of other electronic components of example cell 1200.

When communicatively coupling adjacent qubits, couplers 1240 may cross over or under other qubits and/or couplers and/or other electronic components that may be present between horizontal or between vertical qubits in example cell 1200 and are substantially electrically isolated from them. For example, when coupler 1248 communicatively couples adjacent qubits 1221 and 1222, coupler 1248 does not communicatively couple to any other qubit in example cell 1200, nor does it interfere with the normal operation of other electronic components of example cell 1200.

As shown in example cell 1200, each qubit has a connectivity of six. For example, qubit 1211 is communicatively coupled to each vertical qubit 1221 to 1224 through couplers 1250, to horizontal qubit 1212 through coupler 1241 and to horizontal qubit 1213 through coupler 1242.

In other implementations, qubits in example cell 1200 have couplers 1240 that communicatively couple each horizontal qubit 1210 to each of another of the horizontal qubits 1210 and/or each vertical qubit 1220 to each of another of the vertical qubits 1220, in addition to couplers 1250, thereby implementing a connectivity of seven.

In addition, couplers 1240 may provide inter-cell communicative coupling from example cell 1200 to adjacent or non-adjacent cells. Examples of couplers implementing inter-cell connectivity can be found in U.S. Patent application No. 62/288,719.

Figure 13:
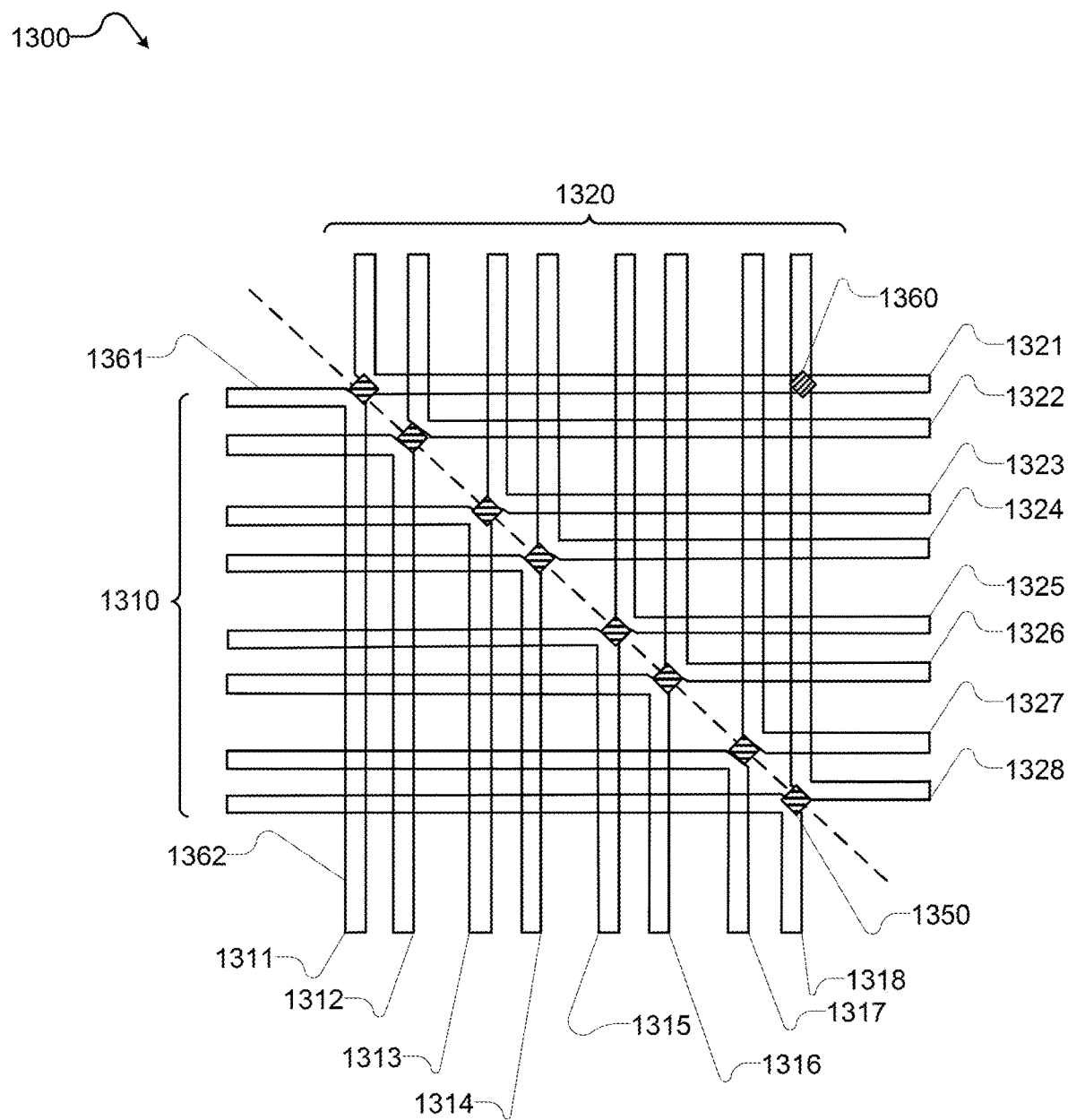
FIG. 13 is a schematic diagram of an exemplary cell in a quantum processor with L-shaped qubits.

FIG. 13 is a schematic diagram illustrating an example cell 1300 in a quantum processor according to the present systems, methods and apparatus. Example cell 1300 comprises two sets of qubit, each qubit having L-shape. Qubits in one set are substantially symmetric to the qubits in the other set with respect to an axis of symmetry. Couplers between the two sets of qubits may be located proximate the regions where the qubits change direction. Example cell 1300 has a first set of qubits 1311 to 1318 (collectively 1310) and a second set of qubits 1321 to 1328 (collectively 1320). While in FIG. 13 example cell 1300 is illustrated as having two sets of qubits, such is not limiting and example cell 1300 may have a larger (e.g. three) number of sets of qubits.

While each set is illustrated as having eight qubits, such is not limiting. In other implementations, each set of qubits in a cell may have a larger or smaller number of qubits. In some implementations, the number of qubits in first set 1310 does not equal the number of qubits in second set 1320.

Qubits in example cell 1300 are shown as having a superconducting loop forming an L-shape; however, such is not limiting and qubits may have other form such as, but not limiting to, rectangular, oval or discorectangular loops. An L-shape is defined as having two adjacent segments or portions which are substantially non-parallel (e.g., they meet at 90 degrees). In some implementations an L-shape loop may represent a segment of a qubit. Each qubit 1310-1320 is interrupted by at least one respective Josephson junction (not shown).

Qubits in example cell 1300 have a first segment 1361 (only one called out in FIG. 13) horizontal in the plane of the page of FIG. 13 and a second segment 1362 (only one called out in FIG. 13) vertical in the plane of the page of FIG. 13, where each qubit bends between first segment 1361 and second segment 1362, and each qubit has substantially similar length. In some implementations some or all of the qubits in example cell 1300 may form an included angle or bend at an angle between first segment 1361 and second segment 1362 such that first segment 1361 and second segment 1362 are non-orthogonal.

In other implementations qubits in example cell 1300 have more than two segments (e.g., three segments) and adjacent segments (e.g., first segment 1361 and second segment 1362) are substantially parallel to two different axes.

Qubits 1310 are so arranged in example cell 1300 so that they bend between the first and the second segment in a different place along their respective lengths so that first qubit 1311 has the shortest first segment 1361 and longest second segment 1362 and eighth qubit 1318 having the longest first segment 1361 and shortest second segment 1362.

Qubits 1320 are so arranged in example cell 1300 so that they have an included angle or bend between the first and the second segment in a different place along their length so that first qubit 1321 has the longest first segment 1361 and the shortest second segment 1362 and eighth qubit 1328 has the shortest first segment 1361 and the longest second segment 1362.

Couplers such as couplers 1360 (only one called out in FIG. 13) provide pair-wise tunable communicative coupling between respective pairs of qubits where one qubit of the pair is selected from one of the first set of qubits 1310 and the other qubit of the pair selected from a different one of the first set of qubits 1310, and/or where one of qubits is selected from one of the qubits of the second set of qubits 1320 and the other qubit is selected from a different one of qubits of the second set of qubits 1320. The couplers may be located at regions proximate where qubits of the first set 1310 meet a different one of the qubits of the first set 1310 and where qubits of the second set 1320 meet a different one of qubits of the second set 1320. For example coupler 1360 provides tunable communicative coupling between qubit 1321 and qubit 1328. In some implementations couplers 1360 may be located at some distance from the region where qubits of the first set 1310 meet a different one of qubits of the first set 1310 and where qubits of the second set 1320 meet a different one of the qubits of the second set 1320.

Couplers such as couplers 1350 (only one called out in FIG. 13) provide tunable communicative coupling between one of the qubits of the first set 1310 and one of the qubits of the second set 1320 such that each qubit of the first set 1310 is communicatively coupled to one qubit of the second set 1320 and each qubit of the second set 1320 is communicatively coupled to one qubit of the first set 1310. For example, coupler 1350 provides tunable communicative coupling between qubit 1318 and qubit 1328. In example cell 1300 there are eight couplers 1350.

In example cell 1300, each qubit has a connectivity of eight. For example qubit 1321 is communicatively coupled to qubit 1311 through coupler 1350 and is communicatively coupled to qubits 1322 to 1328 through couplers 1360. While in FIG. 13 each qubit is illustrated as having a connectivity of eight such is not limiting and in other implementations qubits in example cell 1300 may have a smaller or larger connectivity.

Figure 14:
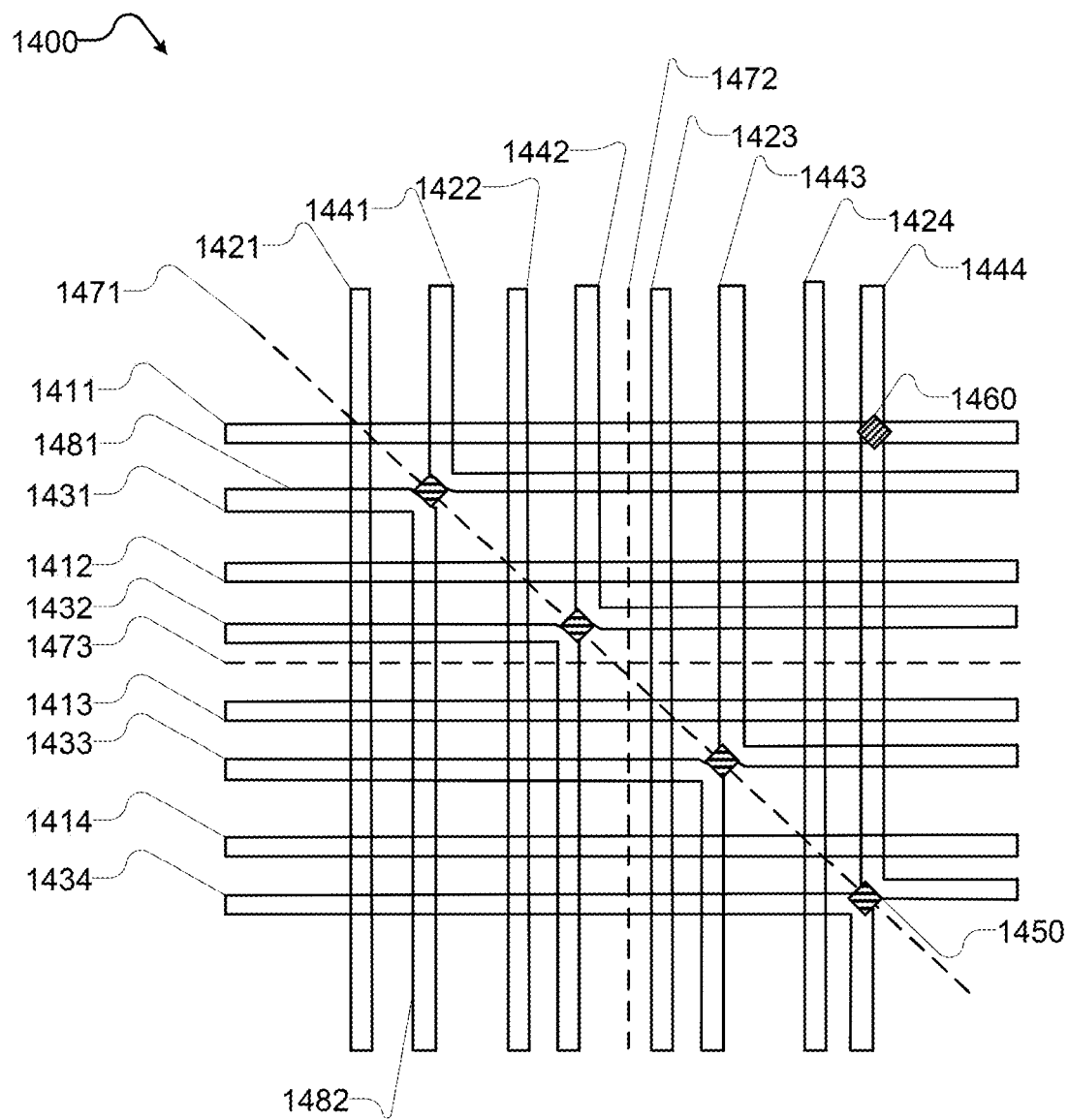
FIG. 14 is a schematic diagram of an exemplary cell in a quantum processor with L-shaped qubits and straight qubits.

FIG. 14 shows a schematic diagram of an example cell 1400 in a quantum processor according to the present systems, methods and apparatus. Example cell 1400 comprises four sets of qubits. Two sets of qubits have substantially rectangular shape and the other two set of qubits have a substantially L-shape. Similarly to example cell 1300, one set of L-shaped qubits is symmetric to the other set of L-shaped qubits with respect to an axis of symmetry and couplers may be present proximate the regions where the L-shape qubits change direction. Unlike example cell 1300, rectangular qubits may be coupled to L-shaped qubits. Example cell 1400 has a first set of qubits 1411 to 1414 (collectively 1410), a second set of qubits 1421 to 1424 (collectively 1420), a third set of qubits 1431 to 1434 (collectively 1430) and a fourth set of qubits 1441 to 1444 (collectively 1440). While in FIG. 14 example cell 1400 is illustrated as having four sets of qubits, such is not limiting and example cell 1400 may have a larger (e.g. five sets) number of sets of qubits.

While each set is illustrated as having four qubits, such is not limiting. In other implementations, each set of qubits in a cell may have a larger or smaller number of qubits. In some implementations, the number of qubits in one set (e.g. the first set) does not equal the number of qubits in another set (e.g. the third set). Each qubit in the first, the second, the third and/or the fourth set of qubits 1410-1440 may be interrupted by at least one respective Josephson junction (not shown). In some implementations some or all of qubits in the first, the second, the third and/or the fourth set of qubits 1410-1440 may represent a segment of a qubit.

Qubits of first set of qubits 1410 in example cell 1400 are substantially parallel to one another and may be laid out generally horizontally in the plane of the page of FIG. 14 and may be referred in this specification and appended claims as horizontal qubits. Qubits of second set of qubits 1420 in example cell 1400 are substantially parallel to one another and may be laid out generally vertically in the plane of the page of FIG. 14 and may be referred in this specification and appended claims as vertical qubits. Qubits in the first set 1410 are substantially non-parallel (e.g. meet at 90 degree) to qubits in the second set 1420.

Qubits of the first set 1410 each have a respective longitudinal or major axis 1473, (only one called out in FIG. 14) along which the superconductive paths or loops of the respective qubits of the first set 1410 extend in a lengthwise direction of the qubit. Likewise, the qubits of the second set 1420 each have a respective longitudinal or major axis 1472 (only one called out in FIG. 14) along which the superconductive paths or loops of the qubits of the second set 1420 extend in a lengthwise direction of the qubit.

While each of the qubits 1410 and 1420 is illustrated in FIG. 14 as having one longitudinal or major axis (1473 and 1474, respectively) such is not limiting and in other implementations, some or all of the qubits of the first set 1410 and/or the second set 1420 may have two or more longitudinal or major axes.

Qubits 1430 of third set and qubits 1440 of fourth set are shown as having a superconducting loop forming an L-shape; however, such is not limiting and qubits may have other form such as, but not limiting to, rectangular, oval or discorectangular loops. An L-shape is defines as having two adjacent segments or portions which are substantially non-parallel (e.g., they meet at 90 degrees).

Qubits of third set 1430 and qubits of fourth set 1440 have a first segment 1481 (only one called out in FIG. 14) horizontal in the plane of the page of FIG. 14 and a second segment 1482 (only one called out in FIG. 14) vertical in the plane of the page of FIG. 14, where each qubit forms an included angle or bends between first segment 1481 and second segment 1482, and each qubit has substantially similar length. In some implementations some or all of the qubits of the third set 1430 and the fourth set 1440 in example cell 1400 may form an included angle or bend at an angle between first segment 1481 and second segment 1482 such that first segment 1481 and second segment 1482 are non-orthogonal.

In other implementations qubits of the third set 1430 and the fourth set 1440 in example cell 1400 have more than two segments (e.g. three segments) and adjacent segments (e.g. first segment 1481 and second segment 1482) are substantially parallel to two different axes.

Qubits in the third set 1430 are so arranged in example cell 1400 so that they form an included angle or bend between the first and the second segment in a different place along their length so that first qubit 1431 has the shortest first segment 1481 and longest second segment 1482 and fourth qubit 1434 having the longest first segment 1481 and shortest second segment 1482; therefore, qubits of the first set, the second set, the third set and the fourth set 1410-1440 are substantially equal in length.

Qubits of the fourth set 1440 are so arranged in example cell 1400 so that they bend between the first and the second segment in a different place along their length so that first qubit 1441 has the longest first segment 1481 and the shortest second segment 1482 and fourth qubit 1444 has the shortest first segment 1481 and the longest second segment 1482.

Qubits of the third set 1430 and the fourth set 1440 are symmetric along axis 1471, e.g., first segment 1481 of qubit 1431 and second segment 1482 of qubit 1441 are substantially equal in length.

Couplers such as couplers 1460 (only one called out in FIG. 14) may provide pair-wise tunable communicative coupling between respective pairs of qubits where one qubit of the pair is selected from one set of qubits (e.g. the fourth set 1440) and the other qubit of the pair selected from a different one of the same set of qubits (e.g. the fourth set 1440) or a different set of qubits (e.g. the first set 1410). The couplers may be located at regions proximate where qubits in example cell 1400 meet another qubit. In some implementations, couplers may be located at some distance from the region where qubits in example cell 1400 meet another qubit. For example coupler 1460 provides tunable communicative coupling between qubit 1411 and qubit 1444.

Couplers such as couplers 1450 (only one called out in FIG. 14) may provide tunable communicative coupling between one of the qubits of the third set 1430 and one of the qubits of the fourth set 1440 such that each qubit in the third set 1430 is communicatively coupled to one qubit in the fourth set 1440 and each qubit in the fourth set 1440 is communicatively coupled to one qubit the third set 1430. For example, coupler 1450 provides tunable communicative coupling between qubit 1434 and qubit 1444. In example cell 1400 there are four couplers 1450. Couplers 1450 may be located where qubits 1430 and 1440 come closest to each other; however, in other implementations couplers 1450 may be located at some distance from the region where qubits 1430 and 1440 come closest to each other.

In example cell 1400, each qubit has a connectivity of eight. For example qubit 1434 is communicatively coupled to qubit 1444 through coupler 1450 and is communicatively coupled to qubits 1421 to 1424 and to qubits 1431 to 1433 through couplers 1460. While in FIG. 14 each qubit is illustrated as having a connectivity of eight such is not limiting and in other implementations qubits in example cell 1400 may have a smaller or larger connectivity.

Figure 15:
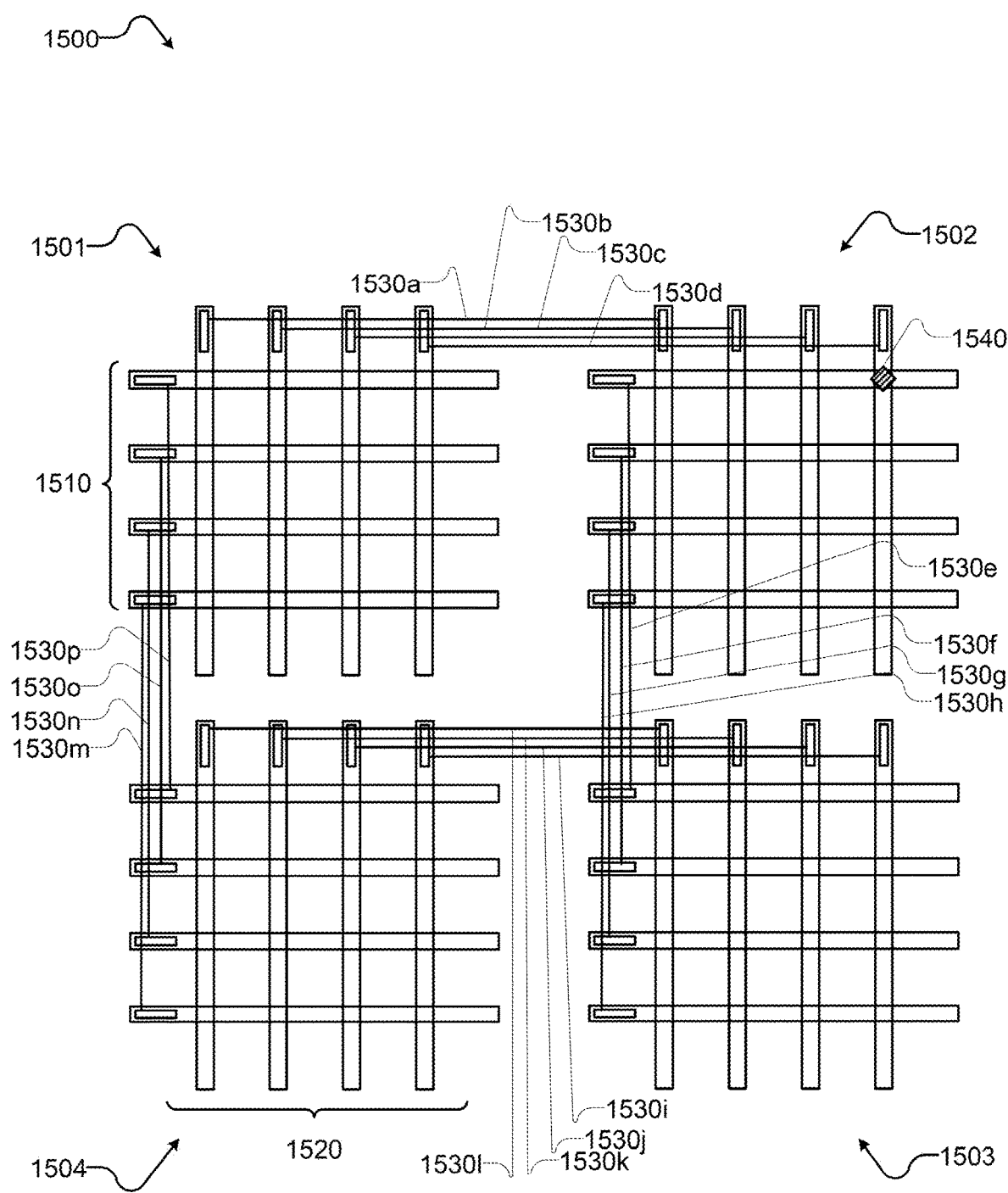
FIG. 15 is a schematic diagram of an exemplary topology of a quantum processor.

FIG. 15 shows a schematic diagram of an example topology 1500 of a quantum processor according to the present systems, methods and apparatus. Example topology 1500 comprises four cells. Couplers may provide communicative coupling between vertical qubits and between horizontal qubits in adjacent cells. Vertical qubits are communicatively coupled between cells tiled horizontally in the plane of the page of FIG. 15 and horizontal qubits are communicatively coupled between cells tiled vertically in the plane of the page of FIG. 15. Example topology 1500 has four cells 1501 to 1504; however such is not limiting and example topology 1500 may have a greater or smaller number of cells.

Each cell in example topology 1500 has a first set of qubits 1510 (only one called out in FIG. 15) and a second set of qubits 1520 (only one called out in FIG. 15). While each set is illustrated as having four qubits, such is not limiting.

In other implementations, each set of qubits in a cell may have a larger or smaller number of qubits. In some implementations, the number of qubits in first set 1510 does not equal the number of qubits in second set 1520. While in FIG. 15 each cell in example topology 1500 is illustrated as having two sets of qubits, such is not limiting and each cell in example topology 1500 may have a larger (e.g. three sets) number of sets of qubits.

Qubits in example topology 1500 are shown as having a rectangular superconducting loop; however, such is not limiting and qubits may have other form such as, but not limiting to, discorectangular or oval loops. In some implementations, a rectangular loop may represent a segment of a qubit. Each qubit 1510-1520 may be interrupted by at least one respective Josephson junction (not shown).

Qubits of first set of qubits 1510c in example topology 1500 are substantially parallel to one another and may be laid out generally horizontally in the plane of the page of FIG. 15 and may be referred in this specification and appended claims as horizontal qubits. Qubits of second set of qubits 1520 in example cell 1500 are substantially parallel to one another and may be laid out generally vertically in the plane of the page of FIG. 15 and may be referred in this specification and appended claims as vertical qubits. Qubits in the first or horizontal set 1510 and qubits in the second or vertical set 1520 are substantially non-parallel (e.g. meet at 90 degree).

While qubits in the first set 1510 and the second set 1520 are illustrated in FIG. 15 as having one longitudinal or major axis (not shown), such is not limiting and in other implementations qubits of the first set 1510 and/or the second set 1520 may have two or more longitudinal or major axes.

Couplers such as couplers 1540 (only one called out in FIG. 15) provide pair-wise tunable communicative coupling between respective pairs of qubits where one qubit of the pair is selected from the first set 1510 and the other qubit of the pair selected from the second set 1520.

Couplers 1540 may provide tunable communicative coupling between qubits of the first set 1510 and qubits of the second set 1520. The couplers may be located at regions proximate where the qubits of the first set 1510 meet qubits of the second set 1520. In some implementations the qubits are located at some distance from the regions where qubits of the first set 1510 meet qubits of the second set 1520.

Long-range couplers may directly couple over a greater physical distance than inter-cell couplers, and so may communicatively couple with qubits in a way which provides greater coupling strength. Long-range couplers 1530a to 1530p (collectively 1530) provide tunable communicative coupling between qubits of the first set of qubits 1510 in one cell (e.g., cell 1501) and qubits of the first set of qubits 1510 in an adjacent cell (e.g., cell 1504) and between qubits of the second set of qubits 1520 in one cell (e.g., cell 1501) and qubits of the second set of qubits 1520 in an adjacent cell (e.g., cell 1502). Each qubit in FIG. 15 is illustrated as having one long-range coupler 1530; however such is not limiting. In other implementations each qubit may have two or more long-range coupler 1530. Alternatively or in addition, each qubit may have one or more long-range coupler that is different from long-range couplers 1530. For example, couplers 1240 may be employed in addition or instead of long-range couplers 1530.

When long-range couplers 1530 provide tunable communicative coupling between horizontal qubits, they provide tunable communicative coupling between cells that are positioned vertically in the plane of the page of FIG. 15 and when long-range couplers 1530 provide tunable communicative coupling between vertical qubits, they provide tunable communicative coupling between cells that are positioned horizontally in the plane of the page of FIG. 15.

In other implementations, long-range couplers 1530 may provide tunable communicative coupling between horizontally or vertically positioned cells that are not adjacent to each other.

Figure 16:
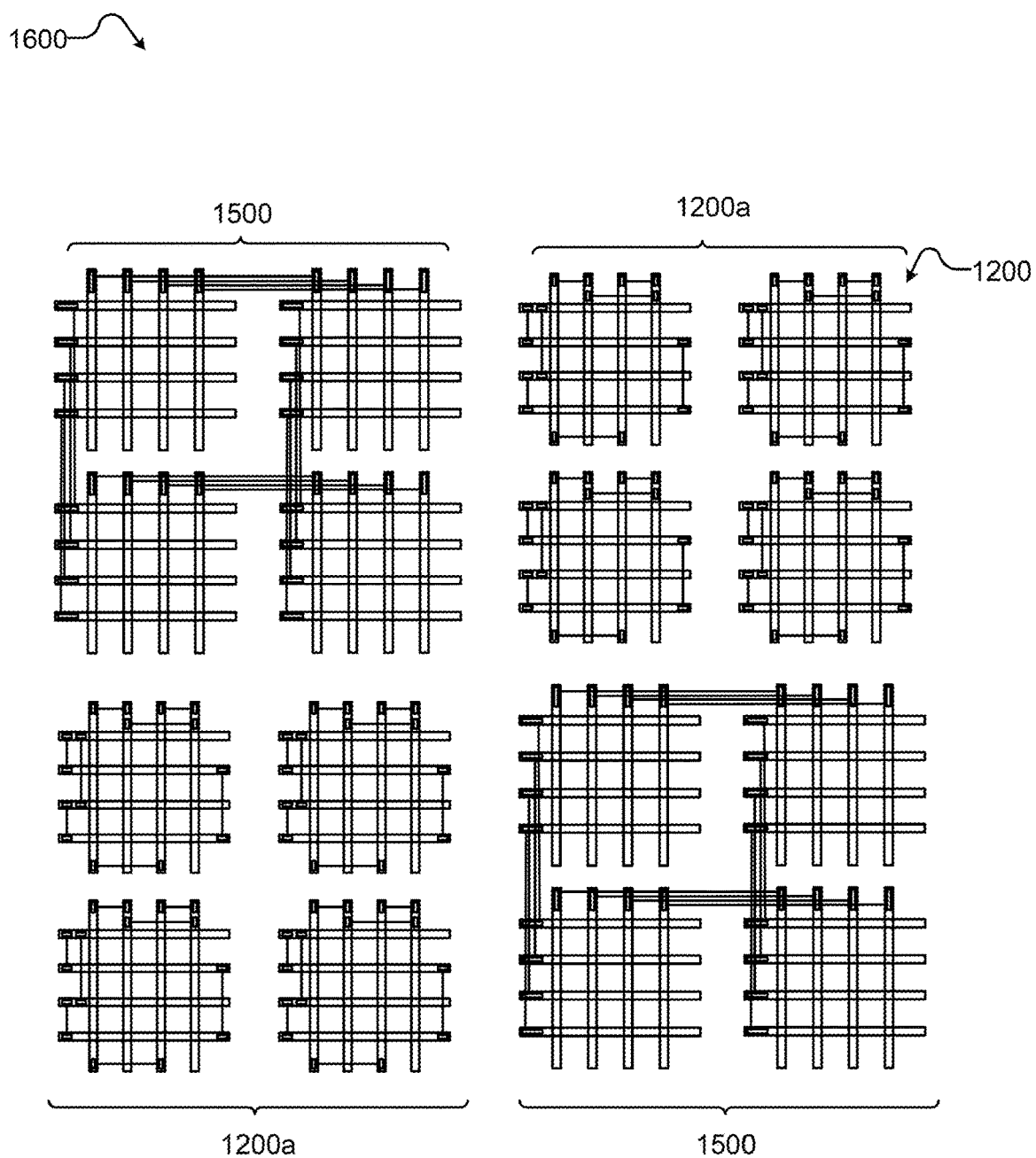
FIG. 16 is a schematic diagram of an exemplary topology of a quantum processor with two different sub-topologies.

FIG. 16 shows a schematic diagram of an example topology 1600 of a quantum processor according to the current systems, methods and apparatus. Example topology 1600 comprises two sub-topologies of equal size tiled over the plane of the page of FIG. 16. In some implementations, example topology 1600 is comprised of example topology 1500 and a second topology 1200a, where topology 1200a is comprised of four example cells 1200, while in other implementations example topology 1600 is comprised of sub-topologies that are substantially different from sub-topologies 1200a and 1500.

While in FIG. 16 example topology 1600 is illustrated as having two sub-topologies, this is not limiting and in other implementations example topology 1600 may have three or more sub-topologies.

In example topology 1600, each sub-topology is comprised of four cells; however, such is not meant to be limiting and each sub-topology may have a larger or smaller number of cells.

In example topology 1600 each sub-topology is comprised of the same number (i.e., four) cells; however, such is not limiting and the number of cells in one sub-topology (e.g., topology 1500) may not be equal the number of cells in another sub-topology (e.g., topology 1200a) in example topology 1600.

Couplers (not shown in FIG. 16) provide tunable communicative coupling between pairs of adjacent sub-topologies. In some implementations couplers provide tunable communicative coupling between pairs of non-adjacent sub-topologies.

Figure 17:
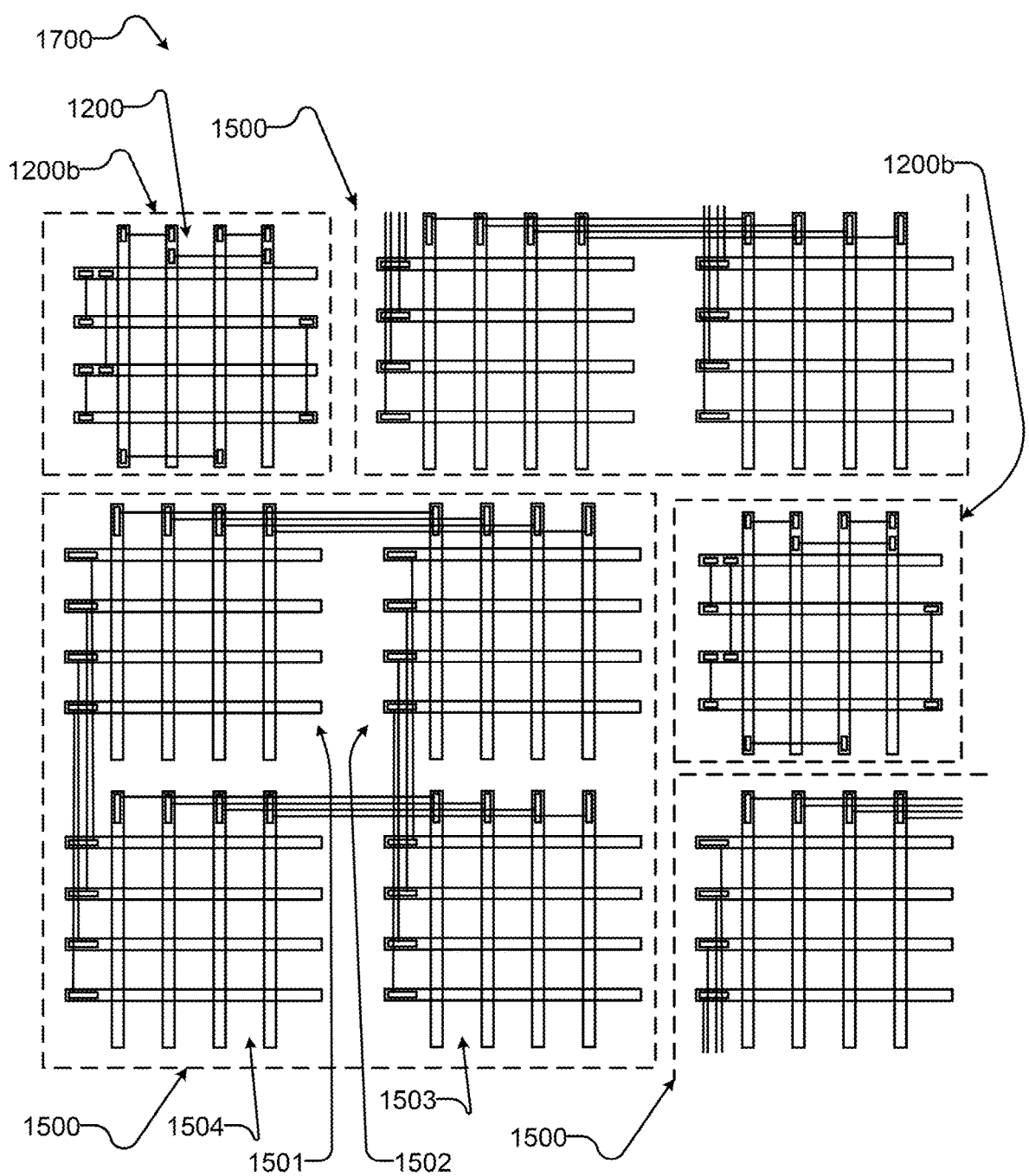
FIG. 17 is a schematic diagram of an exemplary topology of a quantum processor with two sub-topologies or different sizes.

FIG. 17 shows a schematic diagram of an example topology 1700 of a quantum processor according to the present systems, methods and apparatus. Example topology 1700 comprises two sub-topologies of different size tiled over the plane of the page of FIG. 17. In some implementations example topology 1700 comprises example topology 1500 and topology 1200b, where the number of cells in one sub-topology (e.g., topology 1500) does not equal the number of cells in another sub-topology (e.g., 1200b) and topology 1500 is substantially different from topology 1200b. Topology 1200b is comprised of one or more example cells 1200.

While in FIG. 17 topology 1200b is illustrated as having one cell and topology 1500 is illustrated as having four cells 1501 to 1504 (only one called out in FIG. 17), such is not limiting. In other implementations topologies 1500 and 1200b may have a smaller or larger number of cells.

The outline of example topology 1500 and topology 1200b are shown in a dashed outline for clarity and are not intended to imply any physical structure.

In other implementations, example topology 1700 is comprised of sub-topologies that are substantially different from topology 1500 and 1200b. In other implementations, example topology 1700 may have a larger number (e.g. three) of sub-topologies.

Couplers (not shown in FIG. 17) provide tunable communicative coupling between pairs of adjacent sub-topologies. In some implementations couplers provide tunable communicative coupling between pairs of non-adjacent sub-topologies.

Figure 18:
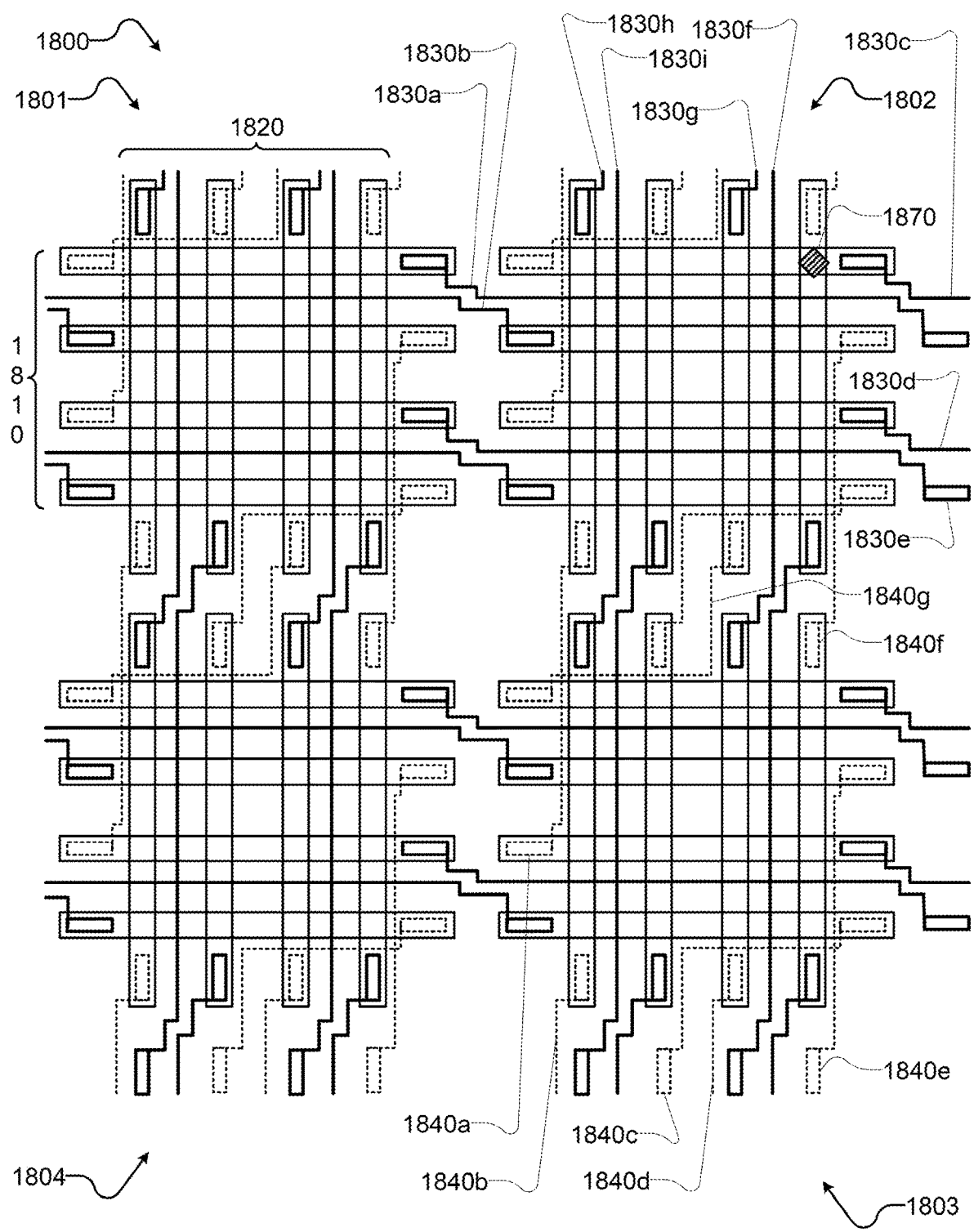
FIG. 18 is a schematic diagram of an exemplary topology of a quantum processor with long-range couplers.

FIG. 18 shows a schematic diagram of an example topology 1800 of a quantum processor according to the present systems, methods and apparatus. Example topology 1800 comprises four cells of qubits. Couplers may provide communicative coupling between qubits in adjacent cells and between qubits in non-adjacent cells. Couplers that communicatively couple qubits in adjacent cell may communicatively couple a vertical qubit to a horizontal qubit in adjacent cells or a horizontal qubit to a vertical qubit in adjacent cells. Couplers that provide communicative coupling between qubits in non-adjacent cells may cross one or more cells. Such couplers may be long-range couplers. Example topology 1800 comprises four cells 1801 to 1804; however, such is not limiting and example topology 1800 may have a greater or smaller number of cells.

Each cell in example topology 1800 has a first set of qubits 1810 (only one called out in FIG. 18) and a second set of qubits 1820 (only one called out in FIG. 18). While each set 1810, 1820 is illustrated as having four qubits, such is not limiting. In other implementations, each set of qubits 1810, 1820 in a cell may have a larger or smaller number of qubits. In some implementations, the number of qubits in first set 1810 does not equal the number of qubits in second set 1820. While in FIG. 18 each cell in example topology 1800 is illustrated as having two sets of qubits, such is not limiting and each cell in example topology 1800 may have a larger (e.g., three sets) number of sets of qubits.

Qubits in example topology 1800 are shown as having rectangular superconducting loops; however, such is not limiting and qubits may have other form such as, but not limiting to, discorectangular or oval loops. In some implementations a rectangular loop may represent a segment of a qubit. Each qubit in the first set 1810 and the second set 1820 may be interrupted by at least one respective Josephson junction (not shown).

Qubits of first set of qubits 1810 in example topology 1800 are substantially parallel to one another and may be laid out generally horizontally in the plane of the page of FIG. 18 and may be referred in this specification and appended claims as horizontal qubits. Qubits of second set of qubits 1820 in example cell 1800 are substantially parallel to one another and may be laid out generally vertically in the plane of the page of FIG. 18 and may be referred in this specifications and appended claims as vertical qubits. Qubits in the first or horizontal set 1810 are substantially non-parallel (e.g. meet at 90 degree) to qubits in the second or vertical set 1820.

While qubits in the first set 1810 and second set 1820 are illustrated in FIG. 18 as having one longitudinal or major axis (not shown), such is not limiting and in other implementations qubits in the first set 1810 and/or the second set 1820 may have two or more longitudinal or major axes.

Couplers such as couplers 1870 (only one called out in FIG. 18) provide pair-wise communicative coupling between respective pairs of qubits where one qubit of the pair is selected from one of qubits in the first set 1810 and the other qubit of the pair selected from one of qubits in the second set 1820 in the same cell.

Couplers 1870 provide tunable communicative coupling between qubits in the first set 1810 and qubits in the second set 1820. Couplers 1870 are located at regions proximate where the qubits in the first set 1810 meet qubits in the second set 1820. In some implementations, couplers 1870 are located at some distance from the regions where qubits in the first set 1810 meet qubits in the second set 1820.

Long-range couplers 1830a-1830i (only nine called out in FIG. 18, collectively 1830) providing tunable communicative coupling between qubits of the first set of qubit 1810 in one cell (e.g. cell 1801) and qubits in the first set 1810 in a non-adjacent cell and between qubits in the second set of qubits 1820 in one cell (e.g. cell 1801) and qubits in the second set of qubits 1820 in a non-adjacent cell.

Long-range couplers 1830 provide tunable communicative coupling between horizontal qubits in non-adjacent cells, and between vertical qubits in non-adjacent cells.

For example, long-range coupler 1830e provides tunable communicative coupling between a third horizontal qubit 1810 in cell 1801 and a fourth horizontal qubit in a cell positioned on the right of cell 1802 in the plane of the page of FIG. 18 and long-range coupler 1830i provides tunable communicative coupling between a first vertical qubit 1820 in cell 1803 and a second vertical qubit 1820 in a cell positioned above cell 1802 in the plane of the page of FIG. 18.

While qubits are illustrated in FIG. 18 as having one long-range coupler 1830 such is not limiting and in some implementations qubits in example topology 1800 may have two or more long-range couplers 1830.

Couplers such as long-range couplers 1840a-1840g (only seven called out in FIG. 18, collectively 1840) provide tunable communicative coupling between first set of qubits 1810 in one cell (e.g., cell 1801) and second set of qubits 1820 in an adjacent cell (e.g., cell 1804) and between second set of qubits 1820 in one cell (e.g., cell 1802) and first set of qubits in an adjacent cell (e.g., cell 1803).

Long-range couplers 1840 are shown in FIG. 18 in a dash line for clarity; that depiction is not intended to imply any physical structure.

Long-range couplers 1840 provide tunable communicative coupling between vertical and horizontal qubits in adjacent cells and/or between horizontal and vertical qubits in adjacent cells. For example, long-range coupler 1840a provides tunable communicative coupling between a first vertical qubit 1820 in cell 1802 and a third horizontal qubit 1810 in cell 1803.

While in FIG. 18 qubits are illustrated as having one long-range coupler 1840 such is not limiting and in some implementation qubits in example topology 18 may have two or more long-range couplers 1840.

In some implementations, long-range couplers 1840 may provide tunable communicative coupling between horizontal and vertical qubits in non-adjacent cells.

In some implementations, one or more of long-range couplers 1830 may be replaced in example topology 1800 by one or more of long-range couplers 1840, or one or more long-range couplers 1840 may be replaced by one or more long-range couplers 1830.

Figure 19:
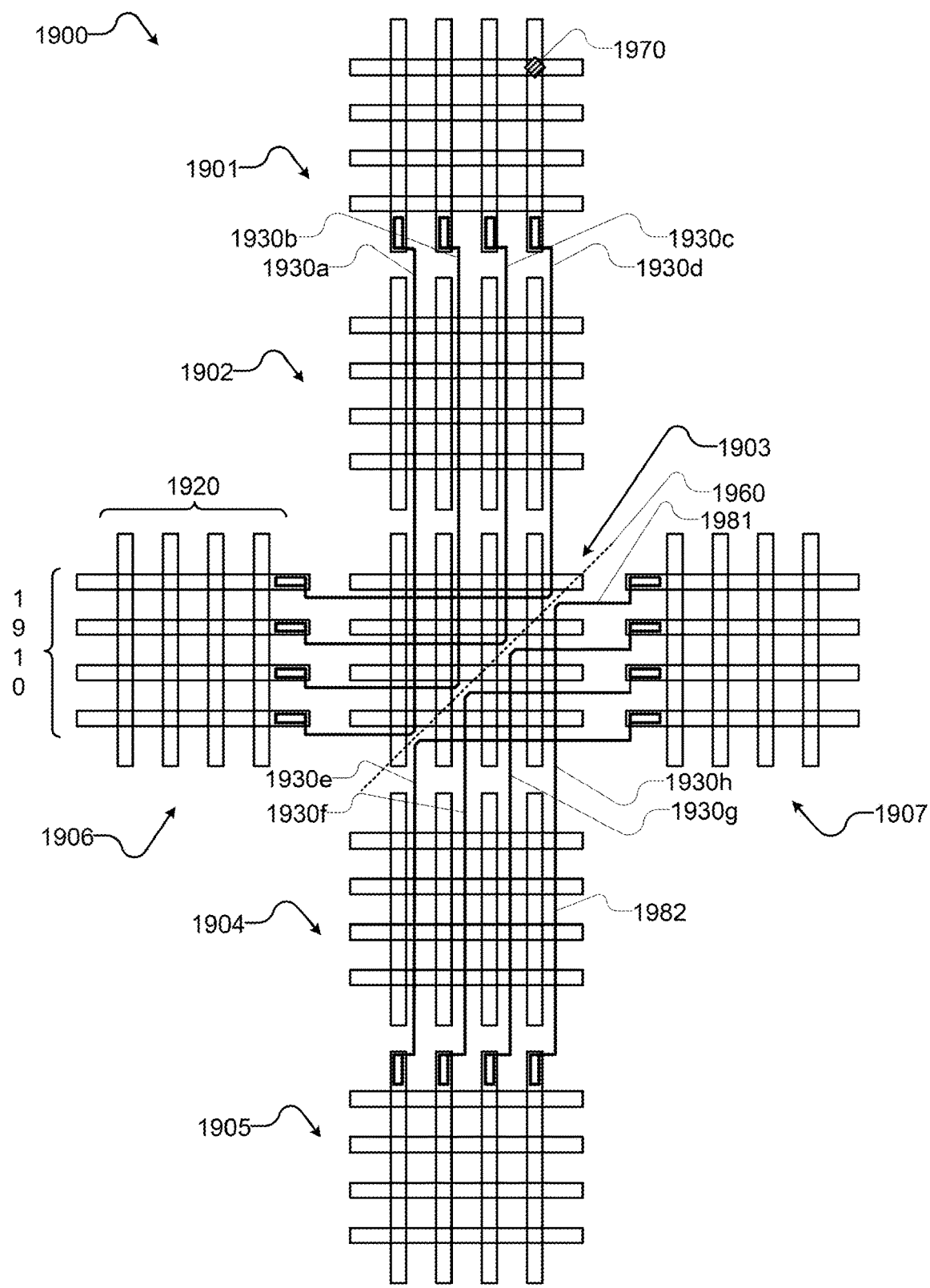
FIG. 19 is a schematic diagram of an exemplary topology of a quantum processor with couplers between horizontal and vertical qubits in non-adjacent cells.

FIG. 19 shows a schematic diagram of an example topology 1900 of a quantum processor according to the present systems, methods and apparatus. Example topology 1900 employs long-range couplers that change direction around an axis of symmetry. Additional space may be available proximate the regions where the long-range couplers change direction for other electronic components of a quantum processor. Example topology 1900 comprises seven cells 1901 to 1907 tiled over the plane of the page of FIG. 19 in the shape of a cross; however such is not limiting and example topology 1900 may have a greater or smaller number of cells. In example topology 1900 a central cell 1903 has a cell on the right (cell 1907) and a cell on the left (cell 1906) in the plane of the page of FIG. 19. Central cell 1903 has two cells (1901 and 1902) above and two cells (1904 and 1905) below in the plane of the page of FIG. 19. In some implementations the cells in example topology 19 can be positioned to form a different shape in the plane of the page of FIG. 19. A full topology of a quantum processor may comprise one or more instances of example topology 1900 tiled over an area. In some implementations, one or more instances of example topology 1900 may overlap over an area.

In example topology 1900 each cell has a first set of qubits 1910 (only one called out in FIG. 19) and a second set of qubits 1920 (only one called out in FIG. 19). While each set is illustrated as having four qubits, such is not limiting. In other implementations, each set of qubits in a cell may have a larger or smaller number of qubits. In some implementations the number of qubits in first set 1910 does not equal the number of qubits in second set 1920. While in FIG. 19 each cell in example topology 1900 is illustrated as having two sets of qubits, such is not limiting and each cell in example topology 1900 may have a larger (e.g. three sets) number of sets of qubits.

Qubits in example topology 1900 are shown as having a rectangular superconducting loop; however, such is not limiting and qubits may have other form such as, but not limiting to, discorectangular or oval loops. In some implementations a rectangular loop may represent a segment of a qubit. Each qubit in the first set 1910 and/or the second set 1920 may be interrupted by at least one respective Josephson junction (not shown).

Qubits of first set of qubits 1910 in example topology 1900 are substantially parallel to one another and may be laid out generally horizontally in the plane of the page of FIG. 19 and may be referred in this specification and appended claims as horizontal qubits. Qubits of second set of qubits 1920 in example cell 1900 are substantially parallel to one another and may be laid out generally vertically in the plane of the page of FIG. 19 and may be referred in this specification and appended claims as vertical qubits. Qubits in the first set 1910 are substantially non-parallel (e.g. meet at 90 degree) to qubits in the second set 1920.

While qubits in the first set 1910 and the second set 1920 are illustrated in FIG. 19 as having one longitudinal or major axis (not shown), such is not limiting and in other implementations qubits in the first set 1910 and/or the second set 1920 may have two or more longitudinal or major axes.

Couplers such as couplers 1970 (only one called out in FIG. 19) may provide pair-wise communicative coupling between respective pairs of qubits where one qubit of the pair is selected from one of qubits of the first set 1910 and the other qubit of the pair selected from one of qubits of the second 1920 in the same cell.

Couplers 1970 provide tunable communicative coupling between qubits of the first set 1910 and qubits of the second set 1920. The couplers are located at regions proximate where the qubits of the first set 1910 meet qubits of the second set 1920. In some implementations the qubits are located at some distance from the respective regions where qubits of the first set 1910 meet qubits of the second set 1920.

Long-range couplers 1930*a*-1930*h* (collectively 1930) provide tunable communicative coupling between qubits of the first set of qubits 1910 in one cell (e.g., cell 1906) and qubits of the second set of qubits 1910 in a non-adjacent cell (e.g., cell 1901) and between qubits of the second set of qubits 1920 in one cell (e.g., cell 1905) and qubits of the first set of qubits 1910 in a non-adjacent cell (e.g., 1907).

Long-range couplers 1930 provide tunable communicative coupling between horizontal and vertical qubits in non-adjacent cells, where the long-range couplers 1930 route around an axis 1960 in center cell 1903, so that no long-range coupler 1930 substantially crosses axis 1960.

Long-range couplers 1930 have a first segment 1981 (only one called out in FIG. 19) and a second segment 1982 (only one called out in FIG. 19). First segment 1981 and second segment 1982 are substantially non-parallel (e.g., they the form an included angle or meet at 90 degrees). First segment 1981 may have different length than second segment 1982. For example, in coupler 1930*h* first segment 1981 is shorter than second segment 1982. Therefore, long-range couplers 1930 or groups of long-range couplers 1930 have substantially similar length.

For example, long-range coupler 1930*a* provides tunable communicative coupling between a first qubit of the second or vertical set of qubits 1920 in cell 1901 and a fourth qubit of the first or horizontal set of qubits 1910 in cell 1906 and long-range coupler 1930*e* provides tunable communicative coupling between a first qubit of the second or vertical set of qubits 1920 in cell 1905 and a fourth qubit of the first or horizontal set qubits 1910 in cell 1907.

While in FIG. 19 qubits in cells 1901, 1906, 1905 and 1907 are illustrated as having one long-range coupler 1930 such is not limiting and in some implementations qubits in cells 1901, 1906, 1905 and 1907 in example topology 1900 may have two or more long-range couplers 1930.

While in FIG. 19 qubits in cells 1902, 1903 and 1904 are illustrated as having no long-range couplers 1930, such is not limiting and in some implementations qubits in cells 1902, 1903 and 1904 in example topology 1900 have one or more long-range coupler 1930. Alternatively or in addition, each qubit may have one or more long-range coupler that is different from long-range couplers 1930. For example, couplers 1240 or 1530 may be employed in addition or instead of long-range couplers 1930.

Figure 20:
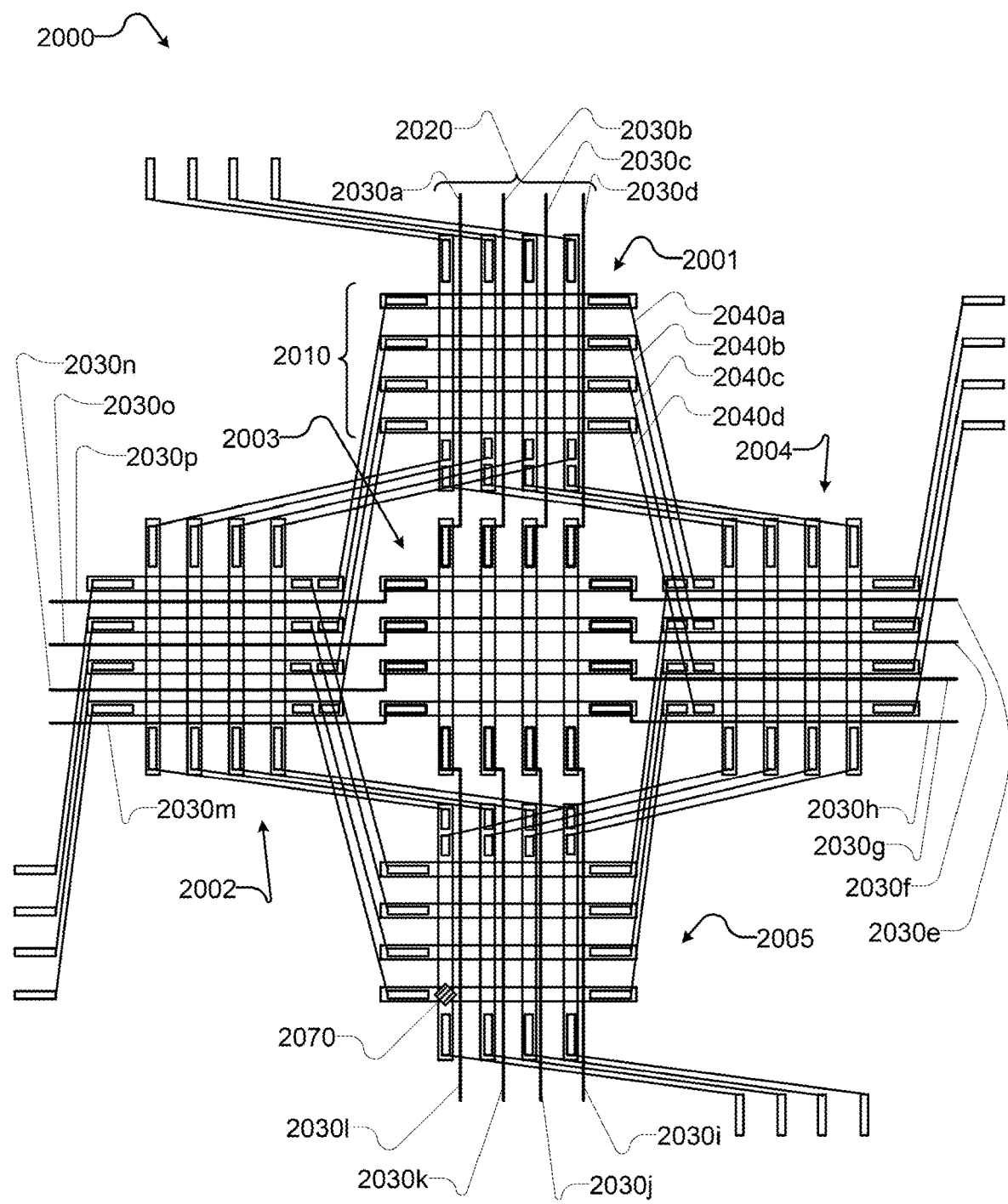
FIG. 20 is a schematic diagram of an exemplary topology of a quantum processor with couplers between qubits in non-adjacent cells.

FIG. 20 shows a schematic diagram of an example topology 2000 of a quantum processor according to the present systems, methods and apparatus. Example topology 2000 employs two different type of couplers to provide communicative coupling between qubits in diagonally adjacent cells and between qubits in non-adjacent cells. Example topology 2000 comprises five cells 2001 to 2005 tiled over the plane of the page of FIG. 20 in the shape of a cross; however, such is not limiting and example topology 2000 may have a greater or smaller number of cells. In example topology 2000 a central cell 2003 has a cell above (i.e., cell 2001), a cell on the right (i.e., cell 2004), a cell below (i.e., cell 2004) and a cell on the left (i.e., cell 2002) in the plane of the page of FIG. 20. In some implementations the cells in example topology 20 can be positioned to form a different shape in the plane of the page of FIG. 20. A full topology of a quantum processor may comprise one or more instances of topology 2000 tiled over an area.

Each cell in example topology 2000 has a first set of qubits 2010 (only one called out in FIG. 20) and a second set of qubits 2020 (only one called out in FIG. 20). While each set is illustrated as having four qubits, such is not limiting. In other implementations, each set of qubits in a cell may have a larger or smaller number of qubits. In some implementations, the number of qubits in first set 2010 does not equal the number of qubits in second set 2020. While in FIG. 20 each cell in example topology 2000 is illustrated as having two sets of qubits, such is not limiting and each cell in example topology 2000 may have a larger (e.g. three sets) number of sets of qubits.

Qubits in example topology 2000 are shown as having a rectangular superconducting loop; however, such is not limiting and qubits may have other form such as, but not limiting to, discorectangular or oval loops. In some implementations a rectangular loop may represent a segment of a qubit. Each qubit in the first set 2010 and the second set 2020 may be interrupted by at least one respective Josephson junction (not shown).

Qubits of first set of qubits 2010 in example topology 2000 are substantially parallel to one another and may be laid out generally horizontally in the plane of the page of FIG. 20 and may be referred in this specification and appended claims as horizontal qubits. Qubits of second set of qubits 2020 in example cell 2000 are substantially parallel to one another and may be laid out generally vertically in the plane of the page of FIG. 20 and may be referred in this specifications and appended claims as vertical qubits. Qubits in the first set 2010 are substantially non-parallel (e.g. meet at 90 degree) to qubits in the second set 2020.

While qubits in the first set 2010 and the second set 2020 are illustrated in FIG. 20 as having one longitudinal or major axis (not shown), such is not limiting and in other implementations qubits in the first set 2010 and/or second set 2020 may have two or more longitudinal or major axes.

Couplers such as couplers 2070 (only one called out in FIG. 20) may provide pair-wise communicative coupling between respective pairs of qubits where one qubit of the pair is selected from one of qubits of the first set 2010 and the other qubit of the pair selected from one of qubits of the second set 2020 in the same cell.

Couplers 2070 may provide tunable communicative coupling between qubits of the first set 2010 and qubits of the second set 2020. The couplers may be located at regions proximate where the qubits of the first set 2010 meet qubits of the second set 2020. In some implementations the qubits are located at some distance from the respective regions where qubits of the first set 2010 meet qubits of the second set 2020.

Long-range couplers 2030a-2030p (collectively 2030) provide tunable communicative coupling between qubits of the first set of qubits 2010 in central cell 2003 and qubits of the first set of qubits 2010 in a non-adjacent cell and between qubits of the second set of qubits 2020 in central cell 2003 and qubits of the second set of qubits 2020 in a non-adjacent cell.

Long-range couplers 2030 provide tunable communicative coupling between horizontal qubits in non-adjacent cells, and between vertical qubits in non-adjacent cells. Long-range couplers 2030 may pass over or under or across the surface area of cells 2001, 2002, 2004, and/or 2005 and are electrically isolated from other electronic components, such that long-range couplers 2030 do not interfere with the operation of other electronic components in cells 2001, 2002, 2003 and 2004.

For example, long-range coupler 2030a provides tunable communicative coupling between a first qubit of the second or vertical set of qubits 2020 in central cell 2003 and a first qubit of the second or vertical set of qubits 2020 in a cell positioned above cell 2001 in the plane of the page of FIG. 20. Long-range coupler 2030e provides tunable communicative coupling between a first qubit of the first or horizontal set of qubits 2010 in central cell 2003 and a first qubit of the first or horizontal set of qubits 2010 in a cell positioned on the right of cell 2004 in the plane of the page of FIG. 20.

While each qubit in central cell 2003 is illustrated in FIG. 20 as having two long-range couplers 2030 such is not limiting. In some implementations each qubit in cell 2003 can have a smaller or larger (e.g., three) number of long-range couplers 2030. Alternatively or additionally, each qubit may have one or more long-range coupler that is different from long-range couplers 2030. For example, couplers 1240 or 1530 may be employed in addition or instead of long-range couplers 2030.

Couplers such as long-range couplers 2040a-2040d (only four called out in FIG. 20, collectively 2040) provide tunable communicative coupling between horizontal qubits in diagonally adjacent cell and between vertical qubits in diagonally adjacent cells.

In example topology 2000 vertical qubits in cells 2001 are communicatively coupled to vertical qubits in cells 2002 and to vertical qubits in cell 2004. Likewise vertical qubits in cell 2005 are communicatively coupled to vertical qubits 2002 and to vertical qubits 2004. Horizontal qubits in cell 2002 are communicatively coupled to horizontal qubits in cell 2001 and to horizontal qubits in cell 2005. Likewise horizontal qubits in cell 2004 are communicatively coupled to horizontal qubits in cell 2001 and to horizontal qubits in cell 2005.

While vertical qubits in cells 2001 and 2005 are illustrated in FIG. 20 as having a connectivity of three (i.e., are communicatively coupled to three other qubits), such is not limiting and vertical qubits in cells 2001 and 2005 may have a smaller or a larger number of long-range couplers 2040. While horizontal qubits in cells 2002 and 2004 are illustrated as having a connectivity of three (i.e., are communicatively coupled to three other qubits) such is not limiting and horizontal qubits in cells 2002 and 2004 may have a smaller or a larger number of long-range couplers 2040. Alternatively or in addition, each qubit may have one or more long-range coupler that is different from long-range couplers 2040. For example, couplers 1240 or 1530 may be employed in addition or instead of long-range couplers 2040.

Figure 21A:
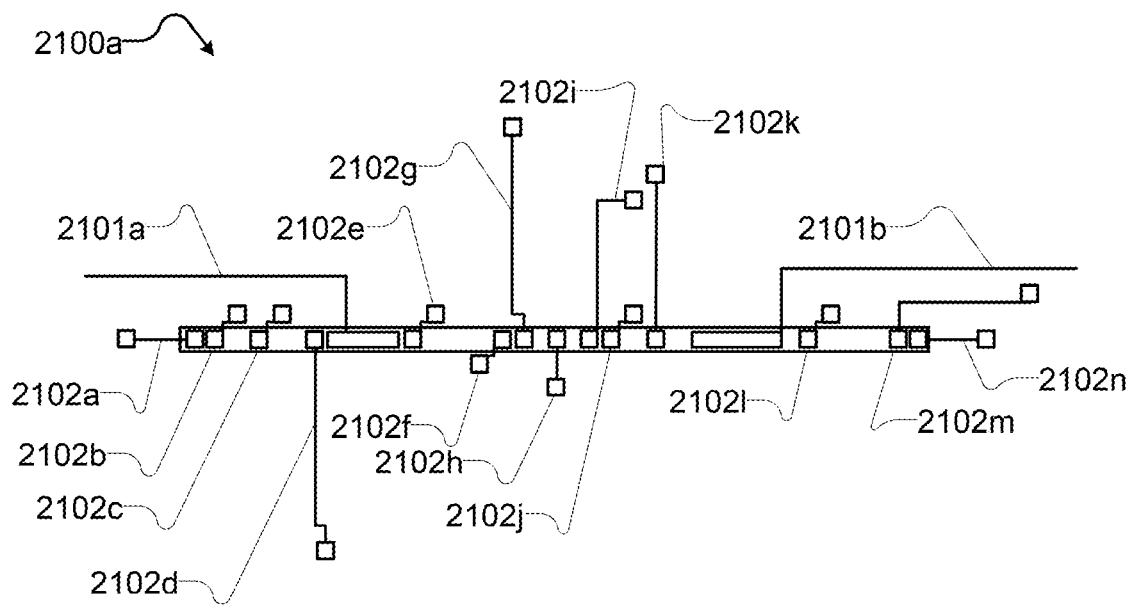
FIG. 21A is a schematic diagram of an exemplary qubit in a quantum processor.

FIG. 21A shows a schematic diagram of an example qubit 2100a in a quantum processor according to the present systems, methods and apparatus. Example qubit 2100a may form the basis of a topology of a quantum processor. Example qubits 2100a has one or more coupling devices to communicatively couple to adjacent qubits and qubits in the same cell and one or more long-range couplers to communicatively couple to qubits in other regions of the quantum processor.

Example qubit 2100a is illustrated in FIG. 21A as having a superconductive loop in an elongated rectangular shape; however, such is not limiting and other forms, such as, but not limiting to, oval or discorectangular are also possible. In some implementations a rectangular loop may represent a segment of a qubit. Example qubit 2100a may be interrupted by at least one respective Josephson junction (not shown).

Example qubit 2100a has two long-range couplers 2101a and 2101b (collectively, 2101) that provide tunable communicative coupling between example qubit 2100a and a qubit in a non-adjacent cell. In FIG. 21A long-range couplers 2101 are illustrated as placed approximately symmetrically from the middle of the length of example qubit 2100a; however, such is not limiting and in other implementations long-range couplers 2101 may be placed at other regions on a length of example qubit 2100a.

In some implementations, example qubit 2100a may have a larger or a smaller number of long-range couplers 2101. In some implementations, long-range couplers 2101 provide tunable communicative coupling between example qubit 2100a and a qubit in a non-adjacent cell.

Couplers such as couplers 2102a to 2102n (collectively, 2102) provide tunable communicative coupling between qubit 2100a and a qubit in the same cell or a qubit in an adjacent cell.

Example qubit 2100a is illustrated in FIG. 21A as having fourteen couplers 2102; however such is not limiting and in other implementations example qubit 2100a may have a larger or a smaller number of couplers. With reference to FIG. 21A, couplers 2102d, 2102g, 2102i, 2102k and 2102m may provide tunable communicative coupling between qubit 2100a and a non-adjacent qubit. With reference to FIG. 21A, couplers 2102a to 2102c, 2102e, 2102f, 2102j and 2102l to 2102n provide tunable communicative coupling between qubit 2100a and an adjacent qubit.

FIG. 2100B shows a schematic diagram of a group 2100b of example qubits 2100a in a quantum processor according to the present systems, methods and apparatus. Group 2100b is comprised of a first qubit 2100a-1 and second qubit 2100a-2, where each qubit is substantially similar to example qubit 2100a of FIG. 21A.

Figure 21B:
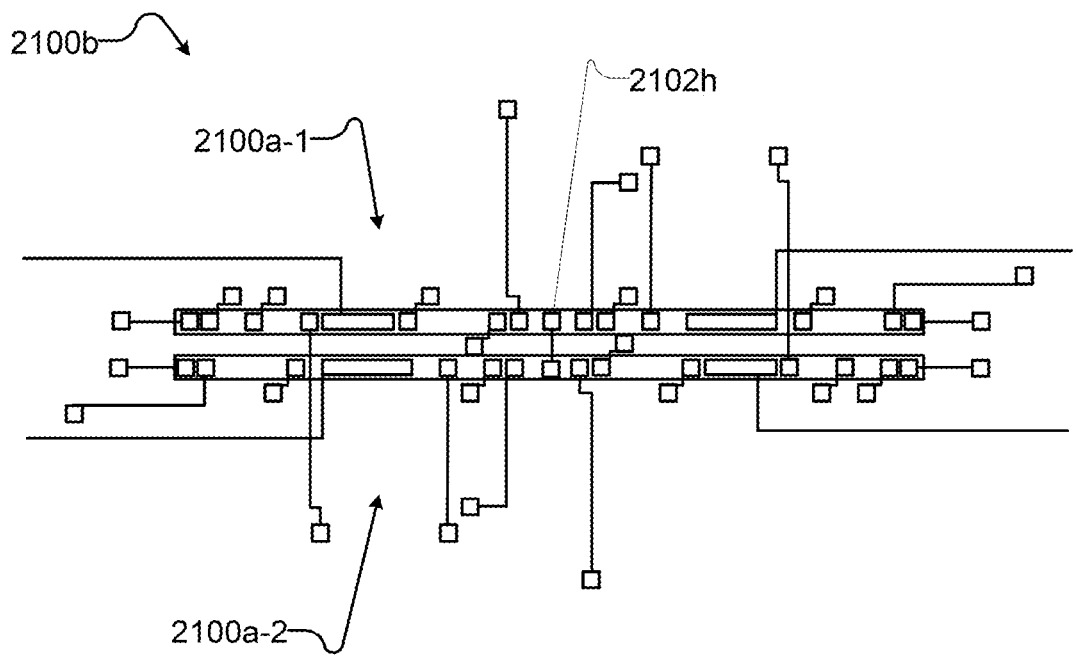
FIG. 21B is a schematic diagram of a group of qubits from FIG. 21A.

Qubits in group 2100b are positioned respective to each other so that they are substantially parallel to each other in the plane of the page of FIG. 21B and one qubit (e.g., qubit 2100a-2) is rotated with respect to the other qubit (e.g., 2100a-1). In some implementations qubit 2100a-2 is rotated 180 degrees with respect to qubit 2100a-1.

Group 2100b is illustrated in FIG. 21B as having two qubits 2100a-1 and 2100a-2; however, such is not limiting and group 2100b may have a larger number of qubits.

At least one coupler 2102 provides tunable communicative coupling between qubit 2100a-1 and qubit 2100a-2. In FIG. 21B, coupler 2102h communicatively couples qubits 2100a-1 and 2100a-2. In other implementations another one of couplers 2102 (e.g., coupler 2102f) may communicative couple qubits 2100a-1 and 2100a-2.

Figure 21C:
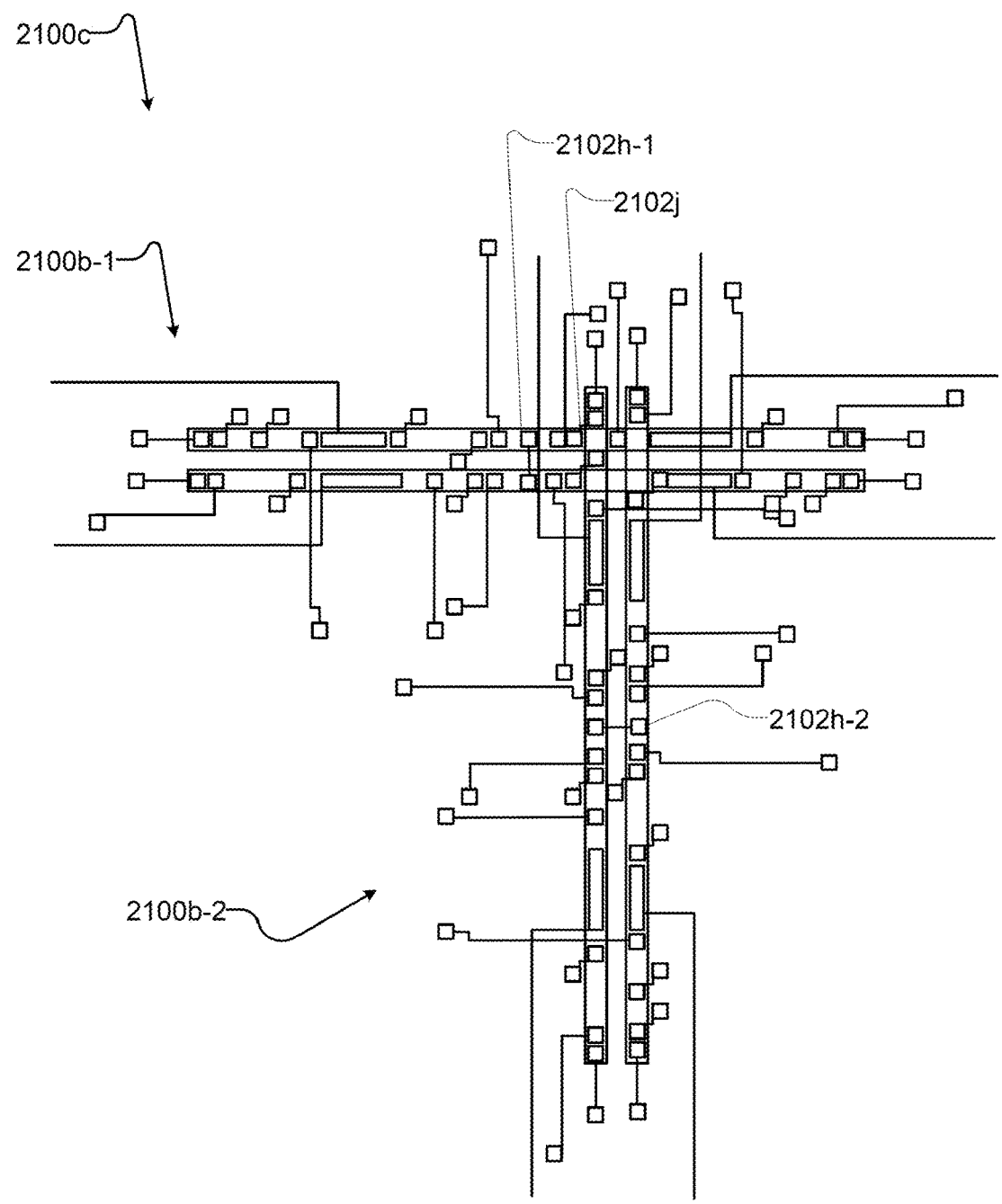
FIG. 21C is a schematic diagram of an example cell in a quantum processor with groups of qubits from FIG. 21B.

FIG. 21C shows a schematic diagram of an example cell 2100c of a quantum processor according to the present systems, methods and apparatus. Example cell 2100c is illustrated in FIG. 21C as having two groups 2100b-1 and 2100b-2 of qubits; however, in some implementations example cell 2100c may have a larger number of groups of qubits. Example cell 2100c has two groups of two qubits tiled to form an L-shape, with one group of qubits (e.g., the vertically tiled group) turned over with respect with the other group of qubits (e.g., the horizontally tiled group).

Groups 2100b-1 and 2100b-2 are positioned in the plane of the page of FIG. 21C such that they are substantially non-parallel (e.g., they form an included angle or meet at 90 degree). In some implementations one group of qubits (e.g., group 2100b-2) is rotated according to an axis of symmetry at the mid-point of coupler 2102h-2, such that the region the group that faced toward the inside of the page in FIG. 21C faces towards the outside of the page of FIG. 21C.

At least one of couplers 2102 (e.g., 2102j) provides tunable communicative coupling between pairs of qubits were one qubit of the pair is selected from a group (e.g., group 2100b-1) and the other qubit is selected from a qubit in a different group (e.g., group 2100b-2).

Example cell 2100c may for the basis of a topology of a quantum processor where cells are tiled over the surface of an area.

Figure 22:
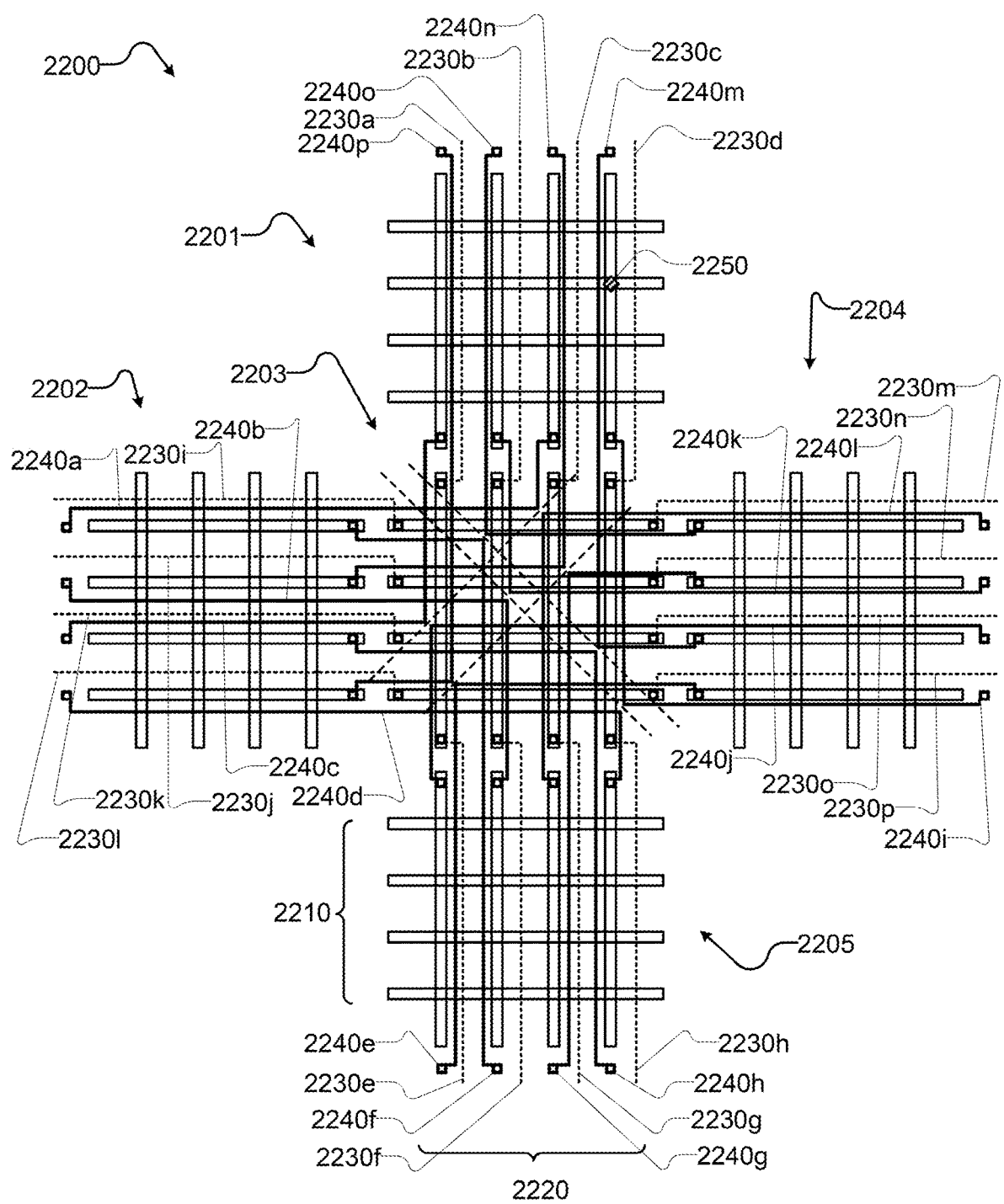
FIG. 22 is a schematic diagram of an exemplary topology in a quantum processor with long-range couplers.

FIG. 22 shows a schematic diagram of an example topology 2200 of a quantum processor according to the present systems, methods and apparatus. Example topology 2200 employs two different couplers to provide communicative coupling between qubits in non-adjacent cells. Some of the couplers may be long-range couplers that change direction over the region of a central cell, thereby allowing space for additional electronic components that may be present in a quantum processor. Example topology 2200 has five cells 2201 to 2205; however, such is not limiting and in other implementations example topology 2200 may have a larger or smaller number of cells.

In example topology 2200, a central cell 2203 has a cell 2201 above and a cell 2205 below in the plane of the page of FIG. 22, and a cell 2202 on the left and a cell 2204 on the right in the plane of the page of FIG. 22.

Each cell in example topology 2200 has a first set of qubits 2210 and a second set of qubits 2220. While each set is illustrated as having four qubits such is not limiting. In other implementations each set of qubits in a cell may have a larger or smaller number of qubits. In some implementations the number of qubits in one set (e.g., set 2210) does not equal the number of qubits in another set (e.g., set 2220). In some implementations, cells in example topology 2200 may have more than two sets of qubits.

Qubits in example topology 2200 are shown as having a superconducting loop in a rectangular shape; however, such is not limiting. In other implementations qubits in example topology 2200 may have other forms such as, but not limited to, discorectangular or oval. In some implementations, a rectangular loop may represent a segment of a qubit. Each qubit in the first set 2210 and the second set 2220 may be interrupted by at least one respective Josephson junction (not shown).

Qubits in first set of qubits 2210 in cells in example topology 2200 are substantially parallel to one another and may be laid out generally horizontally in the plane of the page of FIG. 22 and may be referred in this specification and appended claims as horizontal qubits. Qubits in second set of qubits 2220 in cells in example topology 2200 are substantially parallel to one another and may be laid out generally vertically in the plane of the page of FIG. 22 and may be referred in this specification and appended claims as vertical qubits. Qubits 2210 are substantially non-parallel (e.g., have an included angle or meet at 90 degree) to qubits 2220.

While qubits in the first or horizontal set 2210 and the second or vertical set 2220 are illustrated in FIG. 22 as having one longitudinal or major axis (not shown), such is not limiting and in other implementations qubits of the first or horizontal set 2210 and/or qubits of the second or vertical set 2220 may have two or more longitudinal or major axes.

Couplers such as couplers 2250 (only one called out in FIG. 22) may provide pair-wise communicative coupling between respective pairs of qubits where one qubit of the pair is selected from one of qubits of the first set 2210 or qubits of the second set 2220 in a cell (e.g. cell 2202 in example topology 2200), and the other qubit of the pair selected from a different one of the qubits of the second set of qubits 2220 or qubits of the first set of qubits 2210 in the same cell, respectively.

Couplers 2250 may provide tunable communicative coupling between qubits of the first set 2210 and qubits of the second set 2220 within the same cell. The couplers are located at regions proximate where qubits of the first set 2210 meet qubits of the second set 2220. In some implementations couplers 2250 are located at some distance from the respective regions where qubits of the first set 2210 meet qubits of the second set 2220.

Central cell 2203 has sixteen long-range couplers 2230a to 2230p (collectively, 2230) that provide tunable communicative coupling between a qubit in central cell 2203 and qubit in a non-adjacent cell. For example long-range coupler 2230p provides tunable communicative coupling between a fourth qubit of the first or horizontal set of qubits 2210 in central cell 2203 and a fourth qubit of the first or horizontal set of qubits 2210 in a cell on the right of cell 2204 in the plane of the page of FIG. 22. Alternatively, or in additionally, long-range coupler 2230p may communicatively couple to a central cell in a non-adjacent example topology 2200 on the right of cell 2204 in the plane of the page of FIG. 22.

While in FIG. 22 each qubit in central cell is illustrated as having two long-range couplers 2230, such is not limiting. In other implementations qubits in central cell 2203 may have a larger or smaller number of long-range couplers 2230, such that central cell 2203 may have a larger or a smaller number of long-range couplers. Alternatively or in addition, each qubit may have one or more long-range coupler that is different from long-range couplers 2230. For example, couplers 1240 or 1530 may be employed in addition or instead of long-range couplers 2230.

Qubits in cells 2201, 2202, 2204 and 2205 have couplers such as couplers 2240a to 2240p (collectively, 2240) providing tunable communicative coupling between pairs of horizontal qubits and vertical qubits in non-adjacent cells. For example, coupler 2240c provides tunable communicative coupling between first qubit of the second or vertical set of qubits 2220 in cell 2201 and a third qubit of the first or horizontal set of qubits in a cell on the left of cell 2202 in the plane of the page of FIG. 22.

With reference to cell 2201 in FIG. 22, two couplers 2240 communicatively couple vertical qubits 2220 to horizontal qubits in a cell on the left of cell 2202 and two couplers 2240 communicatively couple vertical qubits 2220 to horizontal qubits in a cell on the right of cell 2204 in the plane of the page of FIG. 22. Therefore, one or more of couplers 2240 in cell 2201 bends toward the right of cell 2204 and/or one or more of couplers 2240 bends toward the left of cell 2202.

With reference to cell 2202 in FIG. 22, two couplers 2240 communicatively couple horizontal qubits 2210 to vertical qubits in a cell below cell 2205 and two couplers 2240 communicatively couple horizontal qubits 2210 to vertical qubits in a cell above cell 2201 in the plane of the page of FIG. 22. Therefore, one or more of couplers 2240 in cell 2202 bends or is angled toward the top of cell 2201 and/or one or more of couplers 2240 bends or is angled toward the bottom of cell 2205.

With reference to cell 2204 in FIG. 22, two couplers 2240 communicatively couple horizontal qubits 2210 to vertical qubits in a cell below cell 2205 and two couplers 2240 communicatively couple horizontal qubits 2210 to vertical qubits in a cell above cell 2201 in the plane of the page of FIG. 22. Therefore, one or more of couplers 2240 in cell 2204 bends or is angled toward the top of cell 2201 and/or one or more of couplers 2240 bends or is angled toward the bottom of cell 2205.

With reference to cell 2205 in FIG. 22, two couplers 2240 communicatively couple vertical qubits 2220 to horizontal qubits in a cell on the left of cell 2202 and two couplers 2240 communicatively couple vertical qubits 2220 to horizontal qubits in a cell on the right of cell 2204 in the plane of the page of FIG. 22. Therefore, one or more of couplers 2240 in cell 2205 bends or is angled toward the right of cell 2240 and/or one or more of couplers 2240 bends or is angled toward the left of cell 2202.

In some implementations some cell may have a larger or smaller number of couplers 2240. In some implementations couplers 2240 communicatively couple qubits in diagonally-adjacent cells. Alternatively or in addition, each qubit may have one or more coupler that is different from couplers 2240. For example, couplers 1240 or 1530 may be employed in addition or instead of couplers 2240.

Couplers 2240 may cross over or under other qubits or other electronic components in example topology 2200 and are substantially electrically isolated from them. For example, when long-range coupler 22401 communicatively couple non-adjacent qubits from cell 2205 to a cell on the right of cell 2204 in the plane of the page of FIG. 22, coupler 22401 does not communicatively couple to any other qubits, nor does it interfere with the normal operation of other electronic components of example topology 2200.

Figure 23A:
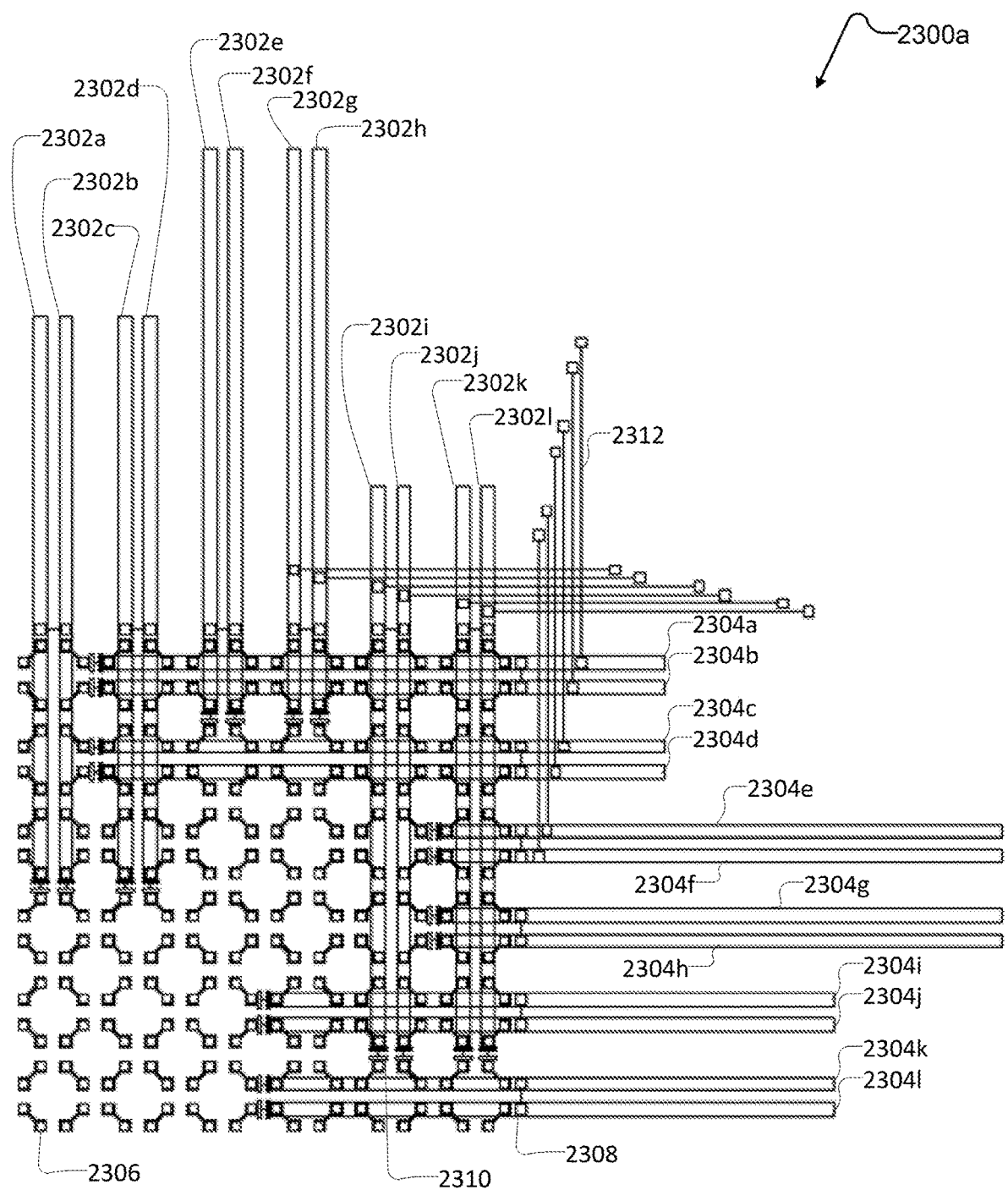
FIG. 23A is a schematic diagram of a cell in a quantum processor with shifted qubits and multiple type of couplers.

FIG. 23A is a schematic diagram of an example cell 2300a of a quantum processor according to the present systems, methods and apparatus. Example cell 2300a comprises four types of couplers and shifted qubits. In example cell 2300a, the physical position of at least some of the qubits is shifted with respect to some of the other qubits so that a portion of some of the qubits may cross at least a portion of another qubit in an adjacent cell.

Example cell 2300a has a larger connectivity than a $K_{4,4}$ cell in a Chimera topology—a description of Chimera topologies can be found in U.S. Pat. No. 9,170,278. Example cell 2300a may therefore be suitable for solving larger problems and reducing the need for employing embedding techniques—and therefore more software resources—to overcome a limited connectivity.

In one implementation, example cell 2300a may have a connectivity of up to sixteen, or fifteen if example cell 2300a is positioned at the edge of a quantum processor, although a lower number of connections is also possible.

In one implementation, example cell 2300a comprises twelve qubits 2302a-23021 (collectively 2302) in a first set of qubits and twelve qubits 2304a-23041 (collectively 2304) in a second set of qubits, although in other implementations the number of qubits can be lower or higher than twelve in each set or the number of qubits in one set (e.g., the first set) may be different from the number of qubits in the other set (e.g., he second set). Qubits 2302 of the first set have loops that are substantially parallel with one another and qubits 2304 of the second set have loops that are substantially parallel with one another. Qubits 2302 in the first set of qubits are non-parallel (e.g. orthogonal) to qubits 2304 of the second set of qubits. Without loss of generality and for the purpose of this specification and the appended claims, qubits 2302 in the first set of qubits may be referred to as vertical qubits 2302 and qubits 2304 in the second set of qubits may be referred to as horizontal qubits 2304.

At least one of the vertical qubits 2302 is shifted longitudinally with respect to other vertical qubits and at least one of the horizontal qubits 2304 is shifted with respect to other horizontal qubits. Therefore, a portion of at least one of vertical qubits 2302 and a portion of at least one of horizontal qubits 2304 extends in an adjacent cell, crossing a portion of at least one horizontal or vertical qubit in an adjacent cell, respectively. In FIG. 23A, qubits 2302a-2302d are shifted longitudinally with respect to other qubits 2302 and similarly, qubits 2304a-2304d are shifted longitudinally with respect to other qubits 2304.

The description of which qubit is longitudinally shifted with respect to other qubits may be arbitrary and is used in its relative sense. When a first qubit is longitudinally shifted with respect to a second qubit it is understood that the second qubits may be considered shifted with respect to the first qubit. Similarly, a first group of qubits may be shifted with respect to a second group of qubits within the same set of qubits.

The amount by which each qubit is shifted with respect to other qubits may influence the communicative coupling with other qubits and therefore influence the topology of a quantum processor. In FIG. 23A, a group of qubits (e.g., qubits 2302a-2302d) are shifted by the same amount (approximately 50% of their total length), however in other implementations, the amount of shift and the number of qubits that are shifted by the same amount may vary. Alternatively, or in addition, one or more qubits may be shifted by a different amount than another one or more qubits within the same cell (e.g., qubits 2302a-2302d are shifted by 50% of their length and qubits 2302e-2302h are shifted by more than 50% of their length in example cell 2300a).

Each qubit may be a loop of superconducting material and may be interrupted by at least one respective Josephson junction (not shown).

Example cell 2300a has a grid of twelve by twelve couplers 2306 (only one called out in FIG. 2300a) that provide tunable communicative coupling between pairs of orthogonal qubits. For example, vertical qubit 2302d is communicatively coupled via one of couplers 2306 to horizontal qubit 2304a. In one implementation, each qubit in example cell 2300a is communicatively coupled to an orthogonal qubit via exactly ten couplers 2306. Where example cell 2300a is located at one of the edges of a quantum processor the number of couplers 2306 per qubit may be lower.

Figure 23B:
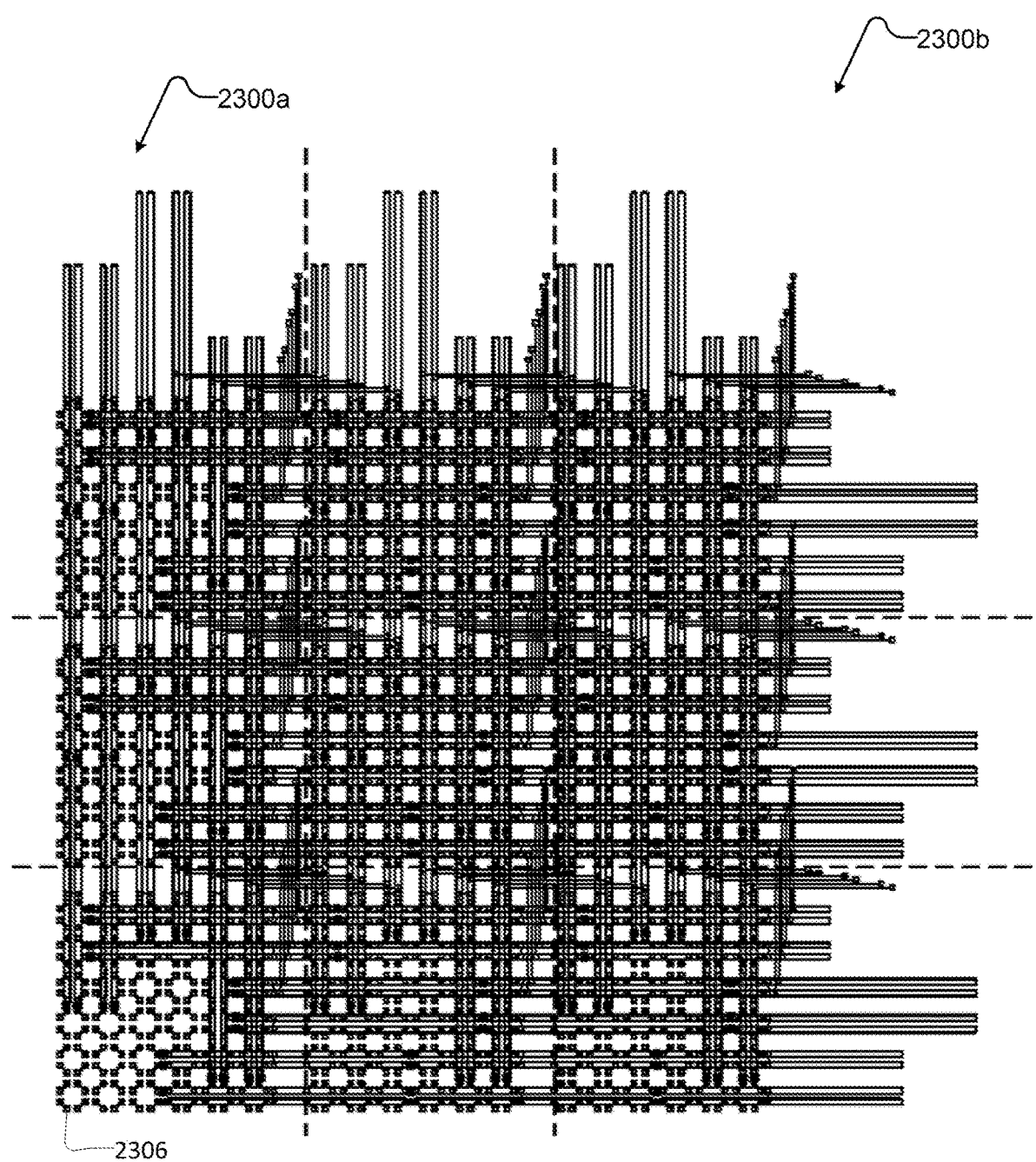
FIG. 23B is a schematic diagram of an example topology comprising the cell of FIG. 23A.

Given that some horizontal and some vertical qubits are shifted in example cell 2300a, some of couplers 2306 may communicatively couple pairs of orthogonal qubits that are not in the same cell, as better illustrated in FIG. 23B.

Example cell 2300a has twelve couplers 2308 (only one called out in FIG. 23A to reduce clutter), six aligned at the right edge of example cell 2300a and six at the top edge of cell 2300a. Couplers 2308 provide tunable communicative coupling between two adjacent horizontal qubits (e.g., horizontal qubits 2304k and 2304j) or two adjacent vertical qubits (e.g., vertical qubits 2302a and 2302b) within example cell 2300a. In one implementation of example cell 2300a, there is exactly one coupler 2308 per qubit, although in other implementations the number of couplers 2308 per qubit may be higher than one.

Example cell 2300a comprises twelve couplers 2310 (only one called out in FIG. 23A), six that provide direct tunable communicative coupling between pairs of vertically aligned qubits in vertically adjacent cells and six that provide tunable direct communicative coupling between pairs of horizontally aligned qubits in horizontally adjacent cells. Example cell 2300a comprises exactly one coupler 2310 per qubit, so that each vertical qubit 2302 not at the edge of a quantum processor is communicatively coupled to two vertical qubits in vertically adjacent cells (i.e., one above and one below with respect to the plane of the page of FIG. 23A) and each horizontal qubit 2304 not at the edge of a quantum processor is communicatively coupled to two horizontal qubits in horizontally adjacent cells (i.e., one at the right and one at the left with respect to the plane of the page of FIG. 23A). Where example cell 2300a is located at one of the edges of a quantum processor some of the qubits may be coupled to only one other qubit via coupler 2310.

Example cell 2300a may comprise up to twelve long-range couplers 2312, where six long-range couplers 2312 provide tunable direct communicative coupling between two non-adjacent vertical qubits 2302 in horizontally adjacent cells and six long-range couplers 2312 that provide tunable direct communicative coupling between two non-adjacent horizontal qubits 2304 in vertically adjacent cells. In some implementations, example cell 2300a may have no long-range couplers 2312 or less than twelve long-range couplers 2312.

In alternative implementations where example cell 2300a has less than twelve horizontal and twelve vertical qubits, the number of couplers 2306, 2308, 2310 and 2312 is reduced accordingly. For example, if one implementation of example cell 2300a comprises six horizontal and six vertical qubits, example cell 2300a may comprise a grid of six by six couplers 2306, six couplers 2308 (three at the top edge of example cell 2300a and three at the right edge of example cell 2300a), six couplers 2310 and at the most six long-range couplers 2312 (for example three horizontal and three vertical).

Similarly, in alternative implementations where example cell 2300a has more than twelve horizontal and twelve vertical qubits, the number of couplers 2306, 2308, 2310 and 2312 is increased accordingly. For example, if one implementation of example cell 2300a comprises twenty-four horizontal and twenty-four vertical qubits, example cell 2300a may comprises a grid of twenty-four by twenty-four couplers 2306, twenty-four couplers 2308 (twelve at the top edge of example cell 2300a and twelve at the right edge of example cell 2300a), twenty-four couplers 2310 and at the most twenty-four long-range couplers 2312 (for example twelve horizontal and twelve vertical).

FIG. 23B is a schematic diagram of a portion of an example topology 2300b comprising a grid of example cells 2300a of FIG. 23A (only one called out in FIG. 23A). In the implementation shown in FIG. 23B, example topology 2300b comprises a grid of three by three example cells 2300a (the dashed lines shows the approximate outline of the cells and are for illustration purposes only given that some horizontal and some vertical qubits may be shifted and therefore extend into an adjacent cell), although a different arrangement of cells is also possible.

In topology 2300b couplers 2306 (only one called out in FIG. 23B to reduce clutter) in cells not at the bottom or the left edge of the processor are used to tunably communicatively couple one horizontal and one vertical qubits from two different cells, thereby increasing the overall connectivity of a quantum processor with topology 2300b.

Many techniques for using quantum processors to solve computational problems involve finding ways to directly map a representation of a problem to the quantum processor itself. Given the generally fixed topology and/or fixed connectivity of a hardware processor, some classes of problem may benefit from embedding techniques. Examples of embedding techniques are described in U.S. Pat. Nos. 7,984,012, 8,244,662 and US Patent Publication 2014/0250288. One example of a fixed topology is the Chimera topology. Examples of quantum processor topologies, including Chimera topologies, are described in greater detail in International Patent Application WO2006066415, U.S. Pat. Nos. 9,170,278 and 9,178,154.

A clique embedding can be defined as embedding a clique in a graph representing the structure of a hardware processor. Methods and algorithms exist for finding clique embeddings in Chimera graphs. An example of a method or algorithm for finding clique embedding is Chimera graph is described in Boothby et al. (see http://arxiv.org/abs/1507.04774). It is possible to employ existing methods to construct clique embeddings topology graphs described in this specification by constructing logical or virtual 'sub-qubits' joined together with logical or virtual couplers to produce Chimera-like graph on which to run existing algorithms. It will be understood that clique embeddings may be found in Chimera graph by employing any suitable method or algorithm and the present specification and appended claims are not restricted to a particular method or algorithm.

On topologies described in this specification, for example topology 800b, 900b, 1000 or 1100 or other topology here described, a digital or classical processor may partition the quantum processor topology so that all the horizontally aligned qubits are grouped into a 'horizontally aligned group' and all the vertically aligned qubits are grouped into a 'vertically aligned group'. Every pair of qubits where one member of the pair is selected from the 'horizontally aligned group' and the other member is selected from the 'vertically aligned group' has the property that either all the qubits in the 'vertically aligned group' are communicatively coupled to all the qubits in the 'horizontally aligned group' or none of the qubits in the 'vertically aligned group' are communicatively coupled to any of the qubits in the 'horizontally aligned group'.

A person skilled in the art will understand that when a quantum processor topology includes more than two sets of qubits (e.g. horizontal qubits, vertical qubits and diagonally oriented qubits) the digital processor may partition the quantum processor topology in more than two sets. Similarly, the digital processor will account for qubits that have two or more longitudinal or major axes.

A digital processor can then partition each qubit in the 'horizontally aligned group' and each qubit in the 'vertically aligned group' into 'horizontally aligned sub-qubits groups' and 'vertically aligned sub-qubits groups'. Each sub-qubit in a 'horizontally aligned sub-qubits group' is communicatively coupled to all the sub-qubit in exactly one 'vertically aligned sub-qubit group'. Likewise, each sub-qubit in a 'vertically aligned sub-qubits group' is communicatively coupled to all the sub-qubit in exactly one 'horizontally aligned sub-qubit group'. Some sub-qubits may not be communicatively coupled to orthogonal qubits if they are on the boundary of the processor or disabled.

The digital processor may then add virtual or fictional couplers between sub-qubits such that physically adjacent qubits are communicatively coupled by virtual or fictional couplers to construct a Chimera graph on a non-Chimera topology. The digital processor may then run any suitable embedding methods or algorithms on the constructed Chimera graph to find clique embeddings.

The various embodiments described above can be combined to provide further embodiments. To the extent that they are not inconsistent with the specific teachings and definitions herein, all of the U.S. patents, U.S. patent application publications, U.S. patent applications, referred to in this specification and/or listed in the Application Data Sheet and commonly assigned to D-Wave Systems Inc., including but not limited to U.S. application Ser. No. 62/346,917 filed Jun. 7, 2016; and U.S. application Ser. No. 62/400,990 filed Sep. 28, 2016, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A quantum processor comprising:
a plurality of cells tiled over an area such that each cell is positioned proximately adjacent at least one other cell, each cell comprising:
a first set of qubits;
a second set of qubits, wherein a portion of at least one qubit in the first set of qubits crosses a portion of at least one qubit in the second set of qubits and wherein a portion of at least one qubits in the first set of qubits crosses a portion of at least one of the qubits in the second set of qubits in an adjacent cell;
a first set of inter-cell couplers, wherein each of the inter-cell couplers is located proximate a first end of each of the qubits in the first set of qubits and a first end of each of the qubits in the second set of qubits and wherein each of the inter-cell couplers provides tunable communicative coupling between one of the qubit in the first set of qubits and one of the qubits in the first set of qubits in an adjacent cell or between one of the qubits in the second set of qubits and one of the qubits in the second set of qubits in an adjacent cell;
a first set of intra-cell couplers, wherein each of the intra-cell couplers in the first set of intra-cell couplers is positioned proximate a region where one of the qubit in the first set of qubits crosses one of the qubit in the second set of qubits and provides tunable communicative coupling between one of the qubits in the first set of qubits and one of the qubits in the second set of qubits; and
a second set of intra-set couplers, wherein each of the intra-cell couplers in the second set of intra-set couplers provides tunable communicative coupling between one qubit in the first set of qubits another one of the qubit in the first set of qubits or between one of the qubits in the second set of qubits and another one of the qubits in the second set of qubits.

2. The quantum processor of claim 1, wherein each cell further comprises a second set of inter-cell couplers, each of the inter-cell couplers in the second set of inter-cell couplers providing tunable communicative coupling between one of the qubits in the first set of qubits and one of the qubits in the first set of qubits in an adjacent cell, wherein the adjacent cell is positioned along a first direction respective to the cell and the first direction is non-parallel to a longitudinal axis of the first set of qubits or between one of the qubits in the second set of qubits and one of the qubits in the second set of qubits in an adjacent cell, wherein the adjacent cell is positioned along a second direction respective to the cell and the second direction is non-parallel to a longitudinal axis of the second set of qubits.

3. The quantum processor of claim 1, wherein each of the qubits in the first and the second set of qubits is comprised of a loop of superconducting material interrupted by at least one Josephson junction.

4. The quantum processor of claim 1 wherein the longitudinal axis of each of the qubits in the first set of qubits is parallel to a third direction and the longitudinal axis of each qubit in the second set of qubits is parallel to a fourth direction.

5. The quantum processor of claim 4 wherein the third direction is orthogonal to the fourth direction.

6. The quantum processor of claim 1 wherein each cell comprises twelve qubits in the first set of qubits and twelve qubits in the second set of qubits.

* * * * *